United States Patent
Morita et al.

(10) Patent No.: US 12,340,827 B2
(45) Date of Patent: Jun. 24, 2025

(54) SERVO PATTERN RECORDING APPARATUS, METHOD OF PRODUCING A SERVO PATTERN RECORDING METHOD, AND MAGNETIC TAPE

(71) Applicant: Sony Group Corporation, Tokyo (JP)

(72) Inventors: Hiroshi Morita, Tokyo (JP); Koji Suzuki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/689,358

(22) PCT Filed: Mar. 1, 2022

(86) PCT No.: PCT/JP2022/008608
§ 371 (c)(1),
(2) Date: Mar. 5, 2024

(87) PCT Pub. No.: WO2023/037585
PCT Pub. Date: Mar. 16, 2023

(65) Prior Publication Data
US 2024/0404553 A1     Dec. 5, 2024

(30) Foreign Application Priority Data
Sep. 9, 2021   (JP) ................. 2021-147168

(51) Int. Cl.
*G11B 5/592*   (2006.01)
*G11B 5/008*   (2006.01)

(52) U.S. Cl.
CPC ........ *G11B 5/5926* (2013.01); *G11B 5/00813* (2013.01)

(58) Field of Classification Search
None
See application file for complete search history.

(56) References Cited

U.S. PATENT DOCUMENTS

| | | | |
|---|---|---|---|
| 8,000,056 B2 * | 8/2011 | Bates | G11B 5/584 360/77.12 |
| 2003/0076612 A1 * | 4/2003 | Sacks | G11B 5/00 360/59 |

(Continued)

FOREIGN PATENT DOCUMENTS

| JP | H49044727 A | 4/1974 |
|---|---|---|
| JP | 2003338011 A | 11/2003 |

(Continued)

OTHER PUBLICATIONS

English text of Yamaga et al., JP 6648855 B1, Feb. 14, 2020. (Year: 2020).*

(Continued)

*Primary Examiner* — Peter Vincent Agustin
(74) *Attorney, Agent, or Firm* — K&L Gates LLP

(57) ABSTRACT

A servo pattern recording apparatus according to an embodiment of the present technology is an apparatus that records a plurality of servo patterns adjacent to each other in a tape width direction on a magnetic layer of a magnetic tape, including: a servo write head; and a temperature adjustment unit. The servo write head includes a plurality of recording units arranged corresponding to a plurality of servo bands of the magnetic layer on which the plurality of servo patterns is recorded. The temperature adjustment unit is configured to be capable of individually adjusting temperatures of the plurality of recording units.

13 Claims, 22 Drawing Sheets

(56) References Cited

U.S. PATENT DOCUMENTS

| | | | |
|---|---|---|---|
| 2003/0214745 A1 | 11/2003 | Lau | |
| 2005/0052780 A1* | 3/2005 | Kira | G11B 15/602 |
| 2009/0231752 A1 | 9/2009 | Kudo et al. | |
| 2011/0051283 A1* | 3/2011 | Harper | G11B 5/584 |
| 2015/0043101 A1* | 2/2015 | Biskeborn | G11B 5/4893 |
| | | | 360/71 |
| 2018/0286444 A1* | 10/2018 | Kasada | G11B 5/70626 |
| 2019/0267035 A1* | 8/2019 | Bui | G11B 5/00813 |
| 2019/0362743 A1* | 11/2019 | Kaneko | G11B 5/00813 |
| 2020/0005822 A1* | 1/2020 | Kasada | G11B 5/00817 |
| 2020/0098390 A1* | 3/2020 | Terakawa | G11B 5/70 |
| 2020/0143831 A1* | 5/2020 | Judd | G11B 5/00813 |
| 2020/0321033 A1* | 10/2020 | Nakashio | G11B 23/04 |
| 2020/0357437 A1* | 11/2020 | Yamaga | G11B 5/00813 |
| 2021/0241786 A1 | 8/2021 | Kasada et al. | |
| 2022/0270642 A1 | 8/2022 | Yamaga et al. | |
| 2023/0206946 A1* | 6/2023 | Yamasaki | G11B 5/56 |
| | | | 360/75 |
| 2023/0317108 A1* | 10/2023 | Nakao | G11B 5/584 |
| | | | 360/76 |

FOREIGN PATENT DOCUMENTS

| | | |
|---|---|---|
| JP | 2005285268 A | 10/2005 |
| JP | 2009223963 A | 10/2009 |
| JP | 2019212354 A | 12/2019 |
| JP | 2021034078 A | 3/2021 |
| JP | 2021064431 A | 4/2021 |
| JP | 2021125271 A | 8/2021 |

OTHER PUBLICATIONS

International Search Report from corresponding PCT application PCT/JP2022/008608, dated May 17, 2022.

* cited by examiner

SERVO PATTERN RECORDING APPARATUS, METHOD OF PRODUCING A SERVO PATTERN RECORDING METHOD, AND MAGNETIC TAPE

TECHNICAL FIELD

The present technology relates to a servo pattern recording apparatus, a servo pattern recording method, a method of producing a magnetic tape, and a magnetic tape.

BACKGROUND ART

In recent years, a magnetic recording medium has been widely used for backing up electronic data, and the like. As one magnetic recording medium, for example, a magnetic tape cartridge has a large capacity and can be preserved for a long time, and thus, the magnetic tape cartridge has attracted increasing attention as a storage medium for big data and the like.

A plurality of data bands parallel to a tape longitudinal direction is provided in a magnetic tape according to the LTO (Linear Tape Open) standard, and data is recorded on a plurality of recording tracks inside the plurality of data bands. Further, a plurality of servo bands parallel to the tape longitudinal direction is provided in the magnetic tape, and each data band is disposed in the magnetic layer so as to be sandwiched between the plurality of servo bands. A servo pattern having a predetermined shape is recorded in each servo band, the servo pattern executing positioning (tracking) control of a recording/reproducing head with respect to each recording track, tape information and servo band identification information for specifying a data band being embedded in the servo pattern.

The magnetic tape is typically produced by applying a magnetic material to a base film, calendering, cutting, processing of recording a servo pattern, and the like. Since these processes are performed while winding up the base film at constant tension, the obtained magnetic tape has internal strain and tends to become wider over time. For this reason, when recording or reproducing data with a tape drive device, even if the magnetic tape is caused to travel at the same tension as that during recording of a servo pattern, the width dimension of the magnetic tape is larger than the width dimension of the magnetic tape during recording of a servo pattern in some cases. In this case, the interval between adjacent servo bands (hereinafter, referred to also as a servo band pitch) changes, making it difficult to perform desired tracking control.

Meanwhile, as a tape drive device, a technology for changing the tension to be applied during travelling of the magnetic tape in order to adapt the change in the servo band pitch is known (see, for example, Patent Literatures 1 and 2). For example, servo signals are read from two servo bands sandwiching one arbitrary data band while causing the magnetic tape to travel at the tension used during recording of a servo pattern. Then, whether the servo band pitch that is the interval between the two servo bands is wider or narrower than the servo band pitch used during recording of a servo pattern is determined from the read servo signals. The tension is adjusted to be high in the case where the servo band pitch is wide, and the tension is adjusted to be low in the case where the servo band pitch is narrow. By adjusting the magnitude of the tension in accordance with the change in the servo band pitch in this way, it is possible to stably perform desired tracking control for the data band.

Note that it is also possible to determine the servo band pitch for each data band and then adjust the tension for each data band. However, since the process of obtaining a relationship between the servo band pitch and the tension for each data band takes a lot of time, recording and reproduction of data on the tape cartridge loaded in the tape drive device cannot be quickly performed. For this reason, the current situation is that a relationship between the servo band pitch and tension for one data band is obtained by one round trip of tape travelling and the obtained relationship between the servo band pitch and tension is applied similarly to other data bands, in many cases.

CITATION LIST

Patent Literature

Patent Literature 1: Japanese Patent Application Laid-open No. 2005-285268
Patent Literature 2: Japanese Patent Application Laid-open No. 2021-64431

DISCLOSURE OF INVENTION

Technical Problem

However, the servo band pitches for the respective data bands are not always the same at the same tension. Since the servo band pitch for each data band depends on the tension of the magnetic tape, if the servo band pitch differs between the data bands, it is highly likely that the tension distribution in the width direction of the magnetic tape is related. However, it is difficult to directly measure and understand tension distribution. For this reason, it is desirable to adjust the servo band pitch by a method other than tension adjustment in the tape drive device.

In view of the circumstances as described above, it is an object of the present technology to provide a servo pattern recording apparatus, a servo pattern recording method, a method of producing a magnetic tape, and a magnetic tape that are capable of adjusting the servo band pitch by a method other than tension adjustment.

Solution to Problem

A servo pattern recording apparatus according to an embodiment of the present technology is an apparatus that records a plurality of servo patterns adjacent to each other in a tape width direction on a magnetic layer of a magnetic tape, including: a servo write head; and a temperature adjustment unit.

The servo write head includes a plurality of recording units arranged corresponding to a plurality of servo bands of the magnetic layer on which the plurality of servo patterns is recorded.

The temperature adjustment unit is configured to be capable of individually adjusting temperatures of the plurality of recording units.

Since the servo pattern recording apparatus includes the temperature adjustment unit, it is possible to adjust, by using thermal expansion or contraction of the recording unit, the arrangement pitch of servo patterns recorded on the magnetic layer of the magnetic tape by the recording unit.

The temperature adjustment unit may be configured to individually adjust the temperatures of the plurality of recording units such that an average value of differences in a servo band pitch between two adjacent servo bands, of the plurality of servo bands, over an entire tape length is equal to or less than a predetermined value.

The predetermined value is, for example, 100 nm.

The temperature adjustment unit may include a heating mechanism that is capable of individually raising the temperatures of the plurality of recording units.

In this case, the plurality of recording units may include a plurality of magnetic cores having a magnetic gap and a plurality of coils wound around the plurality of magnetic cores, and the heating mechanism may include a power adjustment unit that is capable of individually adjusting currents flowing through the plurality of coils.

Alternatively, the temperature adjustment unit may include a cooling mechanism that is capable of individually cooling the plurality of recording units.

In this case, the plurality of recording units may include a plurality of magnetic cores having a magnetic gap and a plurality of coils wound around the plurality of magnetic cores, and the cooling mechanism may include an air blower unit that is capable of individually supplying cooling gas to the plurality of coils.

The servo write head may have a recording surface that records the servo pattern on the magnetic tape by the magnetic gap. The recording surface has a first region and a second region, the first region corresponding to a position where the magnetic gap is provided in a length direction, the second region corresponding to a position where the magnetic gap is not provided in the length direction, a plurality of groove portions being provided in the second region, the plurality of groove portions extending across from one end in a width direction perpendicular to the length direction to the other end in the width direction.

A servo pattern recording method according to an embodiment of the present technology is a method of recording a plurality of servo patterns adjacent to each other in a tape width direction on a magnetic layer of a magnetic tape, including:
  causing the magnetic tape to travel;
  individually adjusting temperatures of a plurality of recording units of a servo write head; and
  recording the plurality of servo patterns on the magnetic layer by the plurality of recording units.

The temperatures of the plurality of recording units may be individually adjusted such that an average value of differences in a servo band pitch between two adjacent servo bands, of a plurality of servo bands of the magnetic layer on which the plurality of servo patterns is recorded, over an entire tape length is equal to or less than a predetermined value.

The plurality of recording units may include a plurality of magnetic cores having a magnetic gap and a plurality of coils wound around the plurality of magnetic cores, and
  the step of individually adjusting temperatures of a plurality of recording units may include making electric power to be supplied to at least one coil of the plurality of coils larger than electric power to be supplied to the other coils.

The plurality of recording units may include a plurality of magnetic cores having a magnetic gap and a plurality of coils wound around the plurality of magnetic cores, and
  the step of individually adjusting temperatures of a plurality of recording units may include supplying cooling gas to at least one coil of the plurality of coils at a flow rate larger than those of the other coils.

A method of producing a magnetic tape according to an embodiment of the present technology is a method of producing a magnetic tape in which a plurality of servo patterns adjacent to each other in a tape width direction is recorded on a magnetic layer of the magnetic tape, including:
  causing the magnetic tape to travel;
  individually adjusting temperatures of a plurality of recording units of a servo write head; and
  recording the plurality of servo patterns on the magnetic layer by the plurality of recording units.

A magnetic tape according to an embodiment of the present technology is a magnetic tape in which a plurality of servo patterns adjacent to each other in a tape width direction is recorded on a magnetic layer of the magnetic tape, in which
  an average value of differences in a servo band pitch between two adjacent servo bands, of the plurality of servo bands, over an entire tape length is 100 nm or less.

The magnetic tape has, for example, a Young's modulus of 8 GPa or less.

MODE(S) FOR CARRYING OUT THE INVENTION

An embodiment according to the present technology will be described below with reference to the drawings.
<Overall Configuration of System and Configurations of Respective Units>
[Tape Cartridge]

Figure 1:
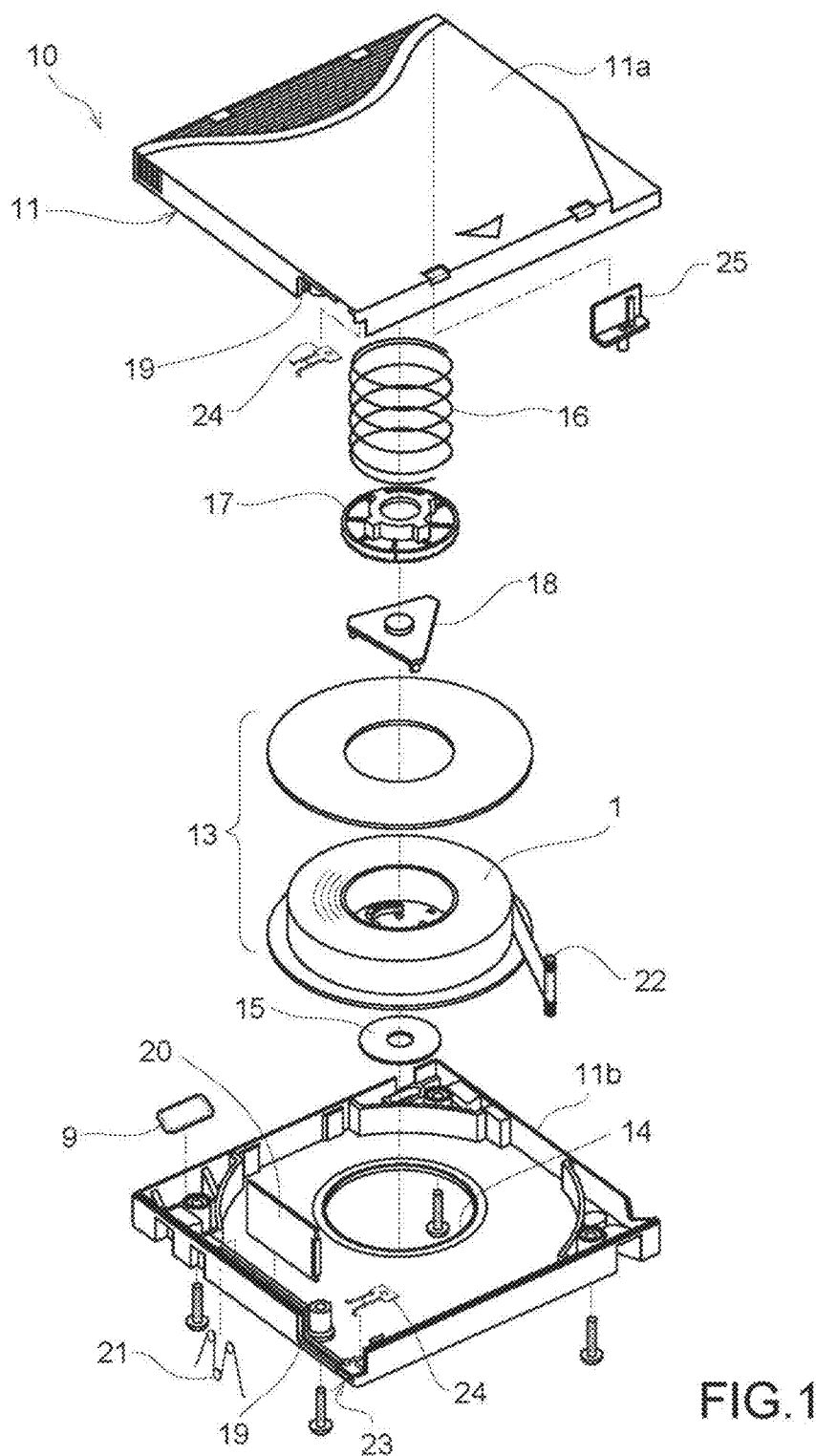
FIG. 1 is an exploded perspective view showing a tape cartridge according to an embodiment of the present technology.

FIG. 1 is an exploded perspective view showing a tape cartridge 10 according to an embodiment of the present technology. In the description of this embodiment, a tape cartridge conforming to the LTO standard will be described as an example of the tape cartridge 10.

As shown in FIG. 1, the tape cartridge 10 includes a cartridge case 11, a tape reel 13, and a magnetic tape 1. The cartridge case 11 is formed by connecting an upper shell 11a and a lower shell 11b to each other with a plurality of screw members. The single tape reel 13 on which the magnetic tape 1 is wound is rotatably housed inside the cartridge case 11.

A chucking gear (illustration omitted) that engages with a spindle 31 (see FIG. 6) of a tape drive device 30 is annularly formed in the center of the bottom portion of the tape reel 13. This chucking gear is exposed to the outside via an opening 14 formed in the center of the lower shell 11b. An annular metal plate 15 that is magnetically attracted to the spindle 31 is fixed to the inner peripheral side of this chucking gear.

A reel spring 16, a reel lock member 17, and a spider 18 are disposed between the inner surface of the upper shell 11a and the tape reel 13. These constitute a reel locking mechanism that prevents the tape reel 13 from rotating when the cartridge 10 is not in use.

A tape outlet 19 for drawing out one end of the magnetic tape 1 to the outside is provided on one side wall portion of the cartridge case 11. A slide door 20 for opening and closing the tape outlet 19 is disposed on the inner side of this side wall portion. The slide door 20 is configured to slide in the direction of opening the tape outlet 19 against the biasing force of a torsion spring 21 by engaging with a tape loading mechanism (not shown) of the tape drive device 30.

A leader pin 22 is fixed to one end portion of the magnetic tape 1. The leader pin 22 is configured to be attachable/detachable to/from a pin holding portion 23 provided on the inner side of the tape outlet 19. The pin holding portion 23 includes elastic holders 24 for elastically holding the upper end portion and the lower end portion of the leader pin 22 on the upper wall inner surface of the cartridge case 11 (inner surface of the upper shell 11a) and the bottom wall inner surface (inner surface of the lower shell 11b), respectively.

Then, a safety tab 25 for preventing erroneous erasure of information recorded on the magnetic tape 1 as well as a cartridge memory 9 from/to which the content regarding the data recorded on the magnetic tape 1 and information regarding the magnetic tape 1 can be read/written in a non-contact manner are disposed on the inner side of the other side wall of the cartridge case 11.

Figure 2:
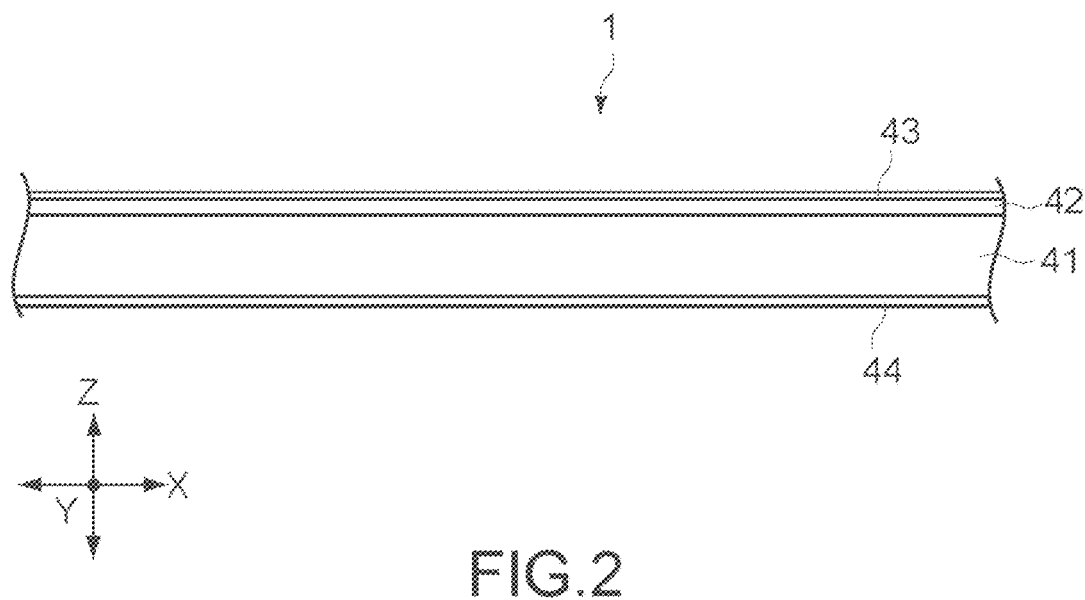
FIG. 2 is a schematic diagram of a magnetic tape as viewed from the side.
Figure 3:
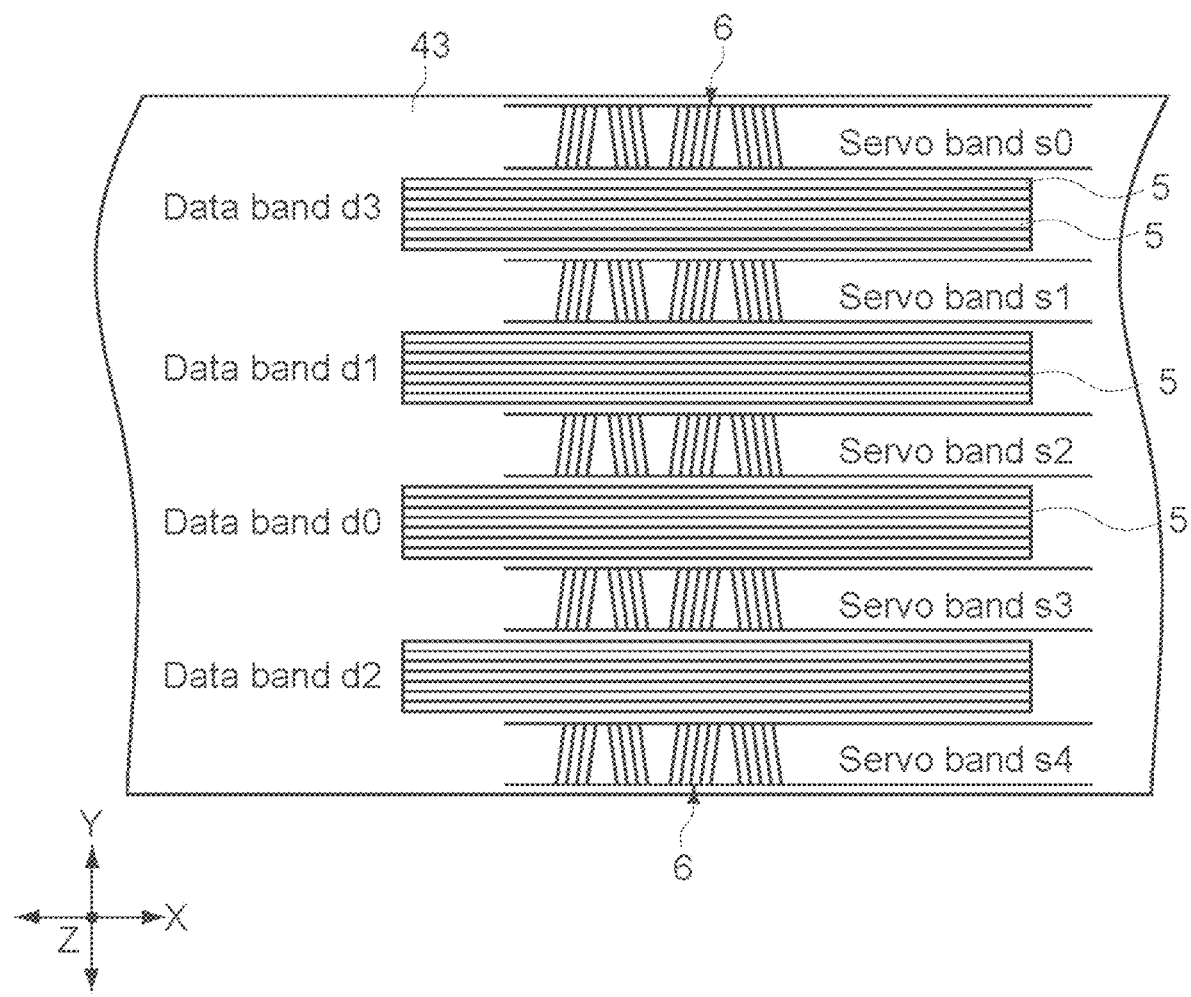
FIG. 3 is a schematic diagram of the magnetic tape as viewed from above (magnetic layer side).

FIG. 2 is a schematic diagram of the magnetic tape 1 as viewed from the side, and FIG. 3 is a schematic diagram of the magnetic tape 1 as viewed from above (the side of the magnetic layer 43). As shown in FIG. 2 and FIG. 3, the magnetic tape 1 is formed to have a tape shape that is long in the longitudinal direction (X-axis direction), short in the width direction (Y-axis direction), and thin in the thickness direction (Z-axis direction).

The magnetic tape 1 includes a base material 41 having a tape shape that is long in the longitudinal direction (X-axis direction), an underlayer (non-magnetic layer) 42 provided on one main surface of the base material 41, a magnetic layer 43 provided on the underlayer 42, and a back layer 44 provided on the other main surface of the base material 41. Note that the back layer 44 only needs to be provided as necessary and this back layer 44 may be omitted. The magnetic tape 1 may be a magnetic recording medium of a perpendicular recording type or may be a magnetic recording medium of a longitudinal recording type. Further, the magnetic layer 43 may be a coated film of a magnetic material or may be a deposition film or a sputtering film of a magnetic material.

Note that details of the respective layers constituting the magnetic tape 1 will be described below.

As shown in FIG. 3, the magnetic layer 43 includes a plurality of data bands d (data bands d0 to d3) that is long in the longitudinal direction (X-axis direction), to which data is written, and a plurality of servo bands s (servo bands s0 to s4) that is long in the longitudinal direction, to which a servo pattern 6 is written. The servo bands s are disposed at positions sandwiching the respective data bands d in the width direction (Y-axis direction).

In the present technology, the ratio of the area of the servo band s to the area of the entire surface of the magnetic layer 43 is typically 4.0% or less. Note that the width of the servo band s is, for example, 96 μm or less in the case of a tape width of ½ inch. The ratio of the area of the servo band s to the area of the entire surface of the magnetic layer 43 can be measured by, for example, developing the magnetic tape 1 using a developer such as a ferricolloid developer and then observing the developed magnetic tape 1 with an optical microscope.

In the example shown in FIG. 3, the number of data bands d is four and the number of servo bands s is five. Note that the number of data bands d and the number of servo bands s can be changed as appropriate.

The data band d includes a plurality of recording tracks 5 that is long in the longitudinal direction and aligned in the width direction. The number of recording tracks 5 included in one data band d is, for example, approximately 1000 to 2500. Data is recorded in the recording track 5 along this recording track 5. The 1-bit length in the longitudinal direction of data recorded in the data band d is, for example, 48 nm or less. The servo band s includes the servo pattern 6 having a predetermined shape recorded by a servo pattern recording apparatus (see FIG. 14) described below.

Here, in the magnetic tape 1 according to the LTO standard, the number of recording tracks 5 increases with each generation and the recording capacity is dramatically improved. For example, although the number of recording tracks 5 was 384 in the first LTO-1, the number of recording tracks 5 increased to 512, 704, 896, 1280, 2176, 3584, and 6656 in the LTO-2 to LTO8, respectively. Similarly, although the recording capacity of data was 100 GB (gigabytes) in the LTO-1, the recording capacity of data increased to 200 GB, 400 GB, 800 GB, 1.5 TB (terabytes), 2.5 TB, 6.0 TB, and 12 TB in the LTO-2 to LTO-8, respectively.

In this embodiment, the number of recording tracks 5 and the recording capacity are not particularly limited and can be changed as appropriate. However, for example, it is advantageous to apply the present technology to the magnetic tape 1 that has a large number of recording tracks 5 and high recording capacity (e.g., 6656 or more, 12 TB or more: LTO8 and subsequent LTOs) and is easily affected by fluctuations of the width of the magnetic tape 1. For example, as the magnetic tape 1, a magnetic tape having a Young's modulus of the entire tape (Young's modulus in the tape longitudinal direction) of 8 GPa or less is applied.

[Data Band and Servo Band]

Figure 4:
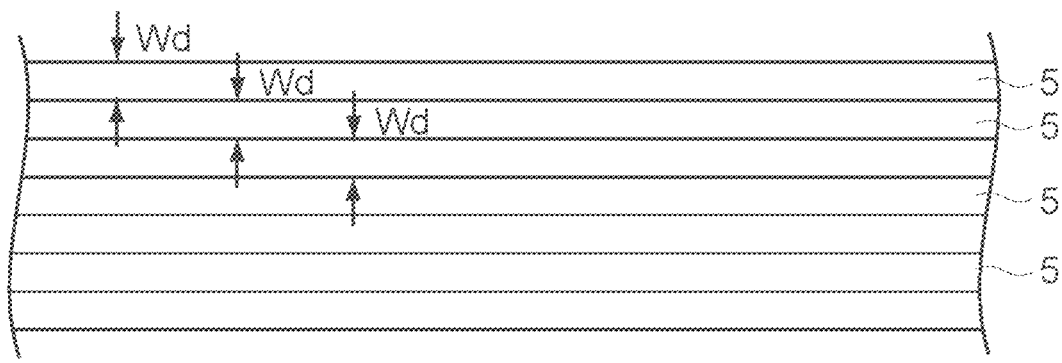
FIG. 4 is an enlarged view showing recording tracks in a data band of the magnetic tape.
Figure 4:
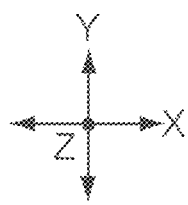

FIG. 4 is an enlarged view showing the recording tracks 5 in the data band d. As shown in FIG. 4, the recording tracks 5 are long in the longitudinal direction and aligned in the width direction and have a predetermined recording track width (track pitch) Wd in the width direction for each track. This recording track width Wd is 2.0 μm or less in the LTO-8.

Note that such a recording track width Wd can be measured by, for example, developing the magnetic layer 43 of the magnetic tape 1 using a developer such as a ferricolloid developer and then observing the magnetic layer 43 of the developed magnetic tape 1 with an optical microscope.

Alternatively, as a measurement method using a drive head, the recording track width Wd can be measured by setting the drive head to a Read While Write state in order to ignore the fluctuations during tape travelling and on the basis of the output change when the Azimuth of the drive head is changed.

(IEEE_Sept1996_Crosstrack Profiles of Thin Film MR Tape Heads Using the Azimuth Displacement Method)

Figure 5:
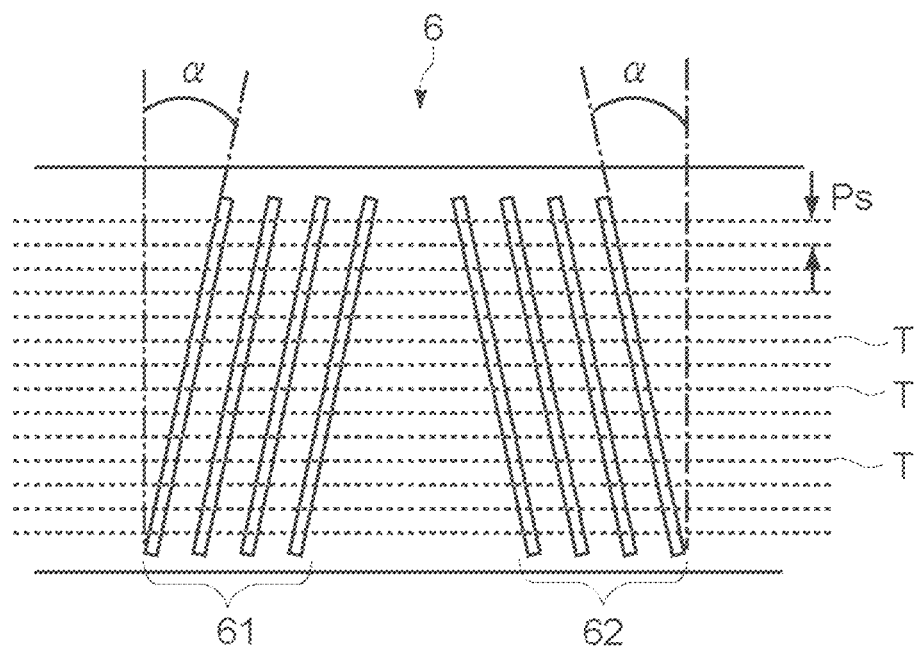
FIG. 5 is an enlarged view showing part of a servo pattern written to a servo band of the magnetic tape.

FIG. 5 is an enlarged view showing part of the servo pattern 6 written in the servo band s. As shown in FIG. 5, the servo pattern 6 includes a plurality of stripes inclined at a predetermined azimuth angle α with respect to the width direction (Y-axis direction), which will be described below in detail. The plurality of stripes is classified into a first stripe group 61 inclined clockwise with respect to the width direction (Y-axis direction) and a second stripe group 62 inclined counterclockwise with respect to the width direction. Each of the first stripe group 61 and the second stripe group 62 typically includes four or five stripes. Note that the shape and the like of the servo pattern 6 can be measured by, for example, developing the magnetic layer 43 of the magnetic tape 1 using a developer such as a ferricolloid developer and then observing the magnetic layer 43 of the developed magnetic tape 1 with an optical microscope.

In FIG. 5, servo trace lines T that are lines to be traced on the servo pattern 6 by a servo read head 132 (see FIG. 7) described below are indicated by broken lines. The servo trace lines T are set along the longitudinal direction (X-axis direction) and are set at predetermined intervals Ps in the width direction.

The number of servo trace lines T per servo band s is, for example, approximately 30 to 60. The interval Ps between two adjacent servo trace lines T is the same as the value of the recording track width Wd and is, for example, 2.0 μm or less. Here, the interval Ps between two adjacent servo trace lines T is a value that determines the recording track width Wd. That is, when the interval Ps between the servo trace lines T is narrowed, the recording track width Wd becomes smaller, and the number of recording tracks 5 included in one data band d increases. As a result, the recording capacity of data increases.

[Tape Drive Device]

(Device Configuration)

Figure 6:
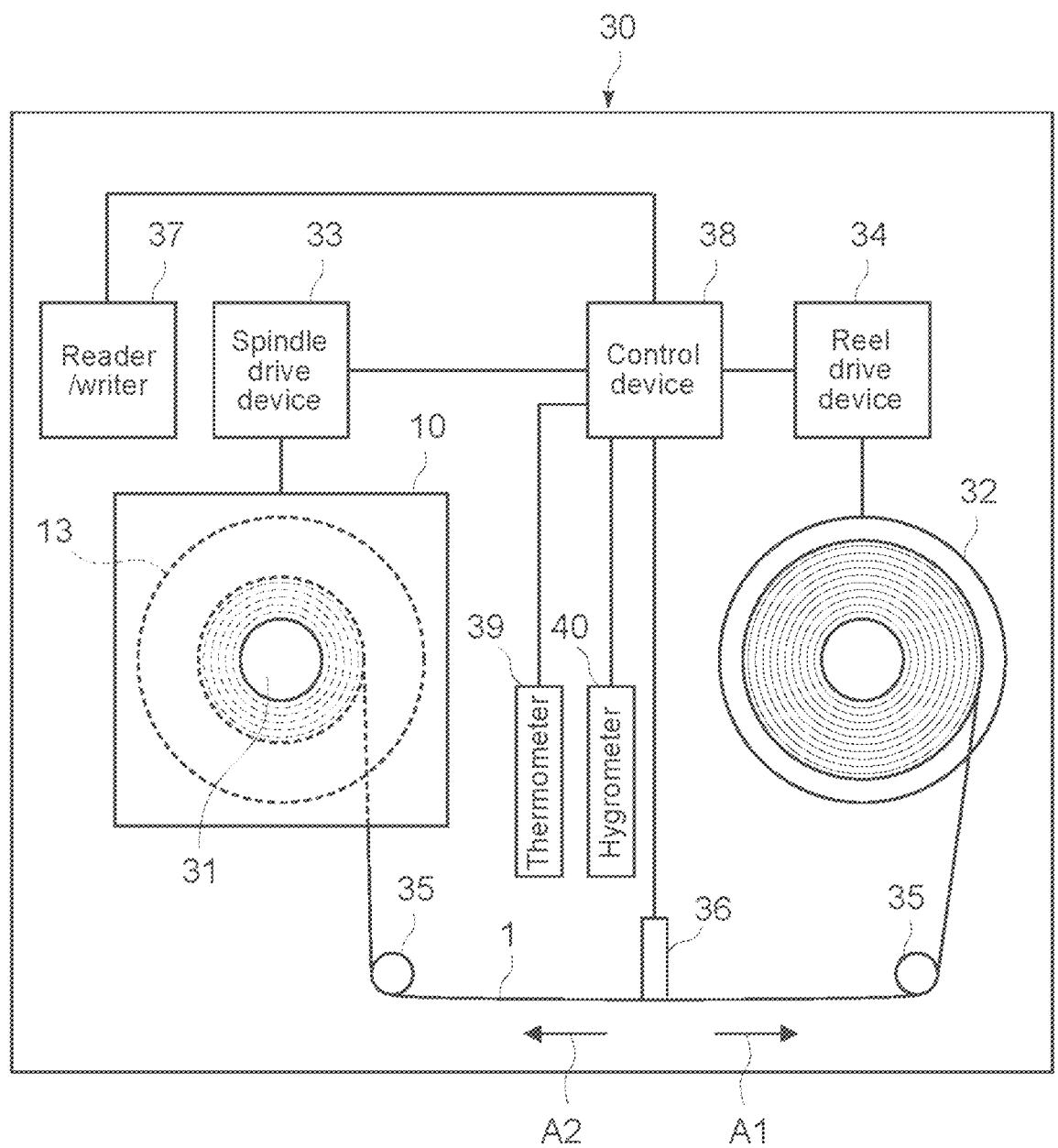
FIG. 6 is a schematic diagram showing an example of a configuration of a tape drive device.

FIG. 6 is a diagram showing the tape drive device 30. The tape drive device 30 is a data recording/reproduction device capable of recording data on the magnetic tape 1 or reproducing data recorded on the magnetic tape 1.

As shown in FIG. 6, the tape drive device 30 is configured to be capable of loading the cartridge 10. The tape drive device 30 is configured to be capable of loading one cartridge 10 but may be configured to be capable of simultaneously loading a plurality of cartridges 10.

The tape drive device 30 includes the spindle 31, a take-up reel 32, a spindle drive device 33, a reel drive device 34, a plurality of guide rollers 35, a drive head 36, a reader/writer 37, and a control device 38. The tape drive device 30 may further include a thermometer 39, a hygrometer 40, and the like.

The spindle 31 includes a head portion that engages with the chucking gear of the tape reel 13 via the opening 14 formed in the lower shell 11b of the cartridge 10. The spindle 31 raises the tape reel 13 by a predetermined distance against the biasing force of the reel spring 16 to release the reel lock function of the reel lock member 17. As a result, the tape reel 13 is rotatably supported inside the cartridge case 11 by the spindle 31.

The spindle drive device 33 causes the spindle 31 to rotate in accordance with a command from the control device 38. The take-up reel 32 is configured to be capable of fixing the tip (leader pin 22) of the magnetic tape 1 drawn out from the cartridge 10 via the tape loading mechanism (not shown).

The plurality of guide rollers 35 guides the travelling of the magnetic tape 1 such that the tape path formed between the cartridge 10 and the take-up reel 32 has a predetermined relative positional relationship with the drive head 36. The reel drive device 34 causes the take-up reel 32 to rotate in accordance with a command from the control device 38.

When data is recorded/reproduced on the magnetic tape 1, the spindle 31 and the take-up reel 32 are caused to rotate by the spindle drive device 33 and the reel drive device 34 and the magnetic tape 1 travels. Regarding the travelling direction of the magnetic tape 1, the magnetic tape 1 can be reciprocated in the forward direction indicated by an arrow A1 in FIG. 6 (direction of unwinding from the side of the tape reel 13 to the side of the take-up reel 32) and the reverse direction indicated by an arrow A2 (direction of rewinding from the side of the take-up reel 32 to the side of the tape reel 13).

Note that in this embodiment, by controlling the rotation of the spindle 31 by the spindle drive device 33 and the rotation of the take-up reel 32 by the reel drive device 34, the tension in the longitudinal direction (X-axis direction) of the magnetic tape 1 during data recording/reproduction can be adjusted. The tension of the magnetic tape 1 may be adjusted by controlling the movement of the guide roller 35, a tension control unit including a dancer roller, or the like instead of the control of the rotation of the spindle 31 and the take-up reel 32 (or in addition to the control).

The tension of the magnetic tape 1 during travelling is typically set to the same value as that of the tension when the servo pattern 6 is recorded on the magnetic tape 1 by a servo pattern recording apparatus 100 described below (hereinafter, referred to also as the reference tension). Further, since the tape drive device 30 is configured to adjust the tension, it is possible to adapt changes in the width dimension of the magnetic tape 1 due to internal strain of the magnetic tape 1 or changes over time. Specifically, the tension is adjusted to be higher than the reference tension in the case where the width dimension of the magnetic tape 1 has changed in the direction of increasing, and the tension is adjusted to be lower than the reference tension in the case where the servo band pitch has changed in the direction of decreasing. Pieces of information regarding the reference tension during recording of a servo pattern, the width dimension of the magnetic tape 1 at the time of the reference tension, and the like are stored in the cartridge memory 9.

The reader/writer 37 is configured to be capable of recording management information on the cartridge memory 9 in accordance with a command from the control device 38. Further, the reader/writer 37 is configured to be capable of reading management information from the cartridge memory 9 in accordance with a command from the control device 38. Examples of the management information include product information of the tape cartridge 10 and the magnetic tape 1, usage history information, and an overview of information recorded on the magnetic tape 1. The product information includes manufacturing information, the number of recording tracks 5 of the magnetic tape 1, and unique information such as an ID. The usage history information includes access date and time, address information, communication history with the reader/writer 37, the presence or absence of abnormalities during loading/unloading of the tape drive device 30, and the like. As the communication method between the reader/writer 37 and the cartridge memory 9, for example, the ISO14443 method is adopted.

The control device 38 includes, for example, a control unit, a storage unit, a communication unit, and the like. The control unit includes a CPU (Central Processing Unit) or the like, and integrally controls the respective units of the tape drive device 30 in accordance with a program stored in the storage unit.

The storage unit includes a non-volatile memory on which various types of data and various programs are to be recorded, and a volatile memory used as a work area of the control unit. The various programs described above may be read from a portable recording medium such as an optical disc and a semiconductor memory, or may be downloaded from a server apparatus in a network. The storage unit temporarily or non-temporarily stores information of the cartridge memory 9 read from the reader/writer 37, the output of the thermometer 39 and the hygrometer 40, and the like. The communication unit is configured to be capable of communicating with other devices such as a PC (Personal Computer) and a server apparatus.

The drive head 36 is configured to be capable of recording data on the magnetic tape 1 in accordance with a command from the control device 38. Further, the drive head 36 is configured to be capable of reproducing data written to the magnetic tape 1 in accordance with a command from the control device 38.

Figure 7:
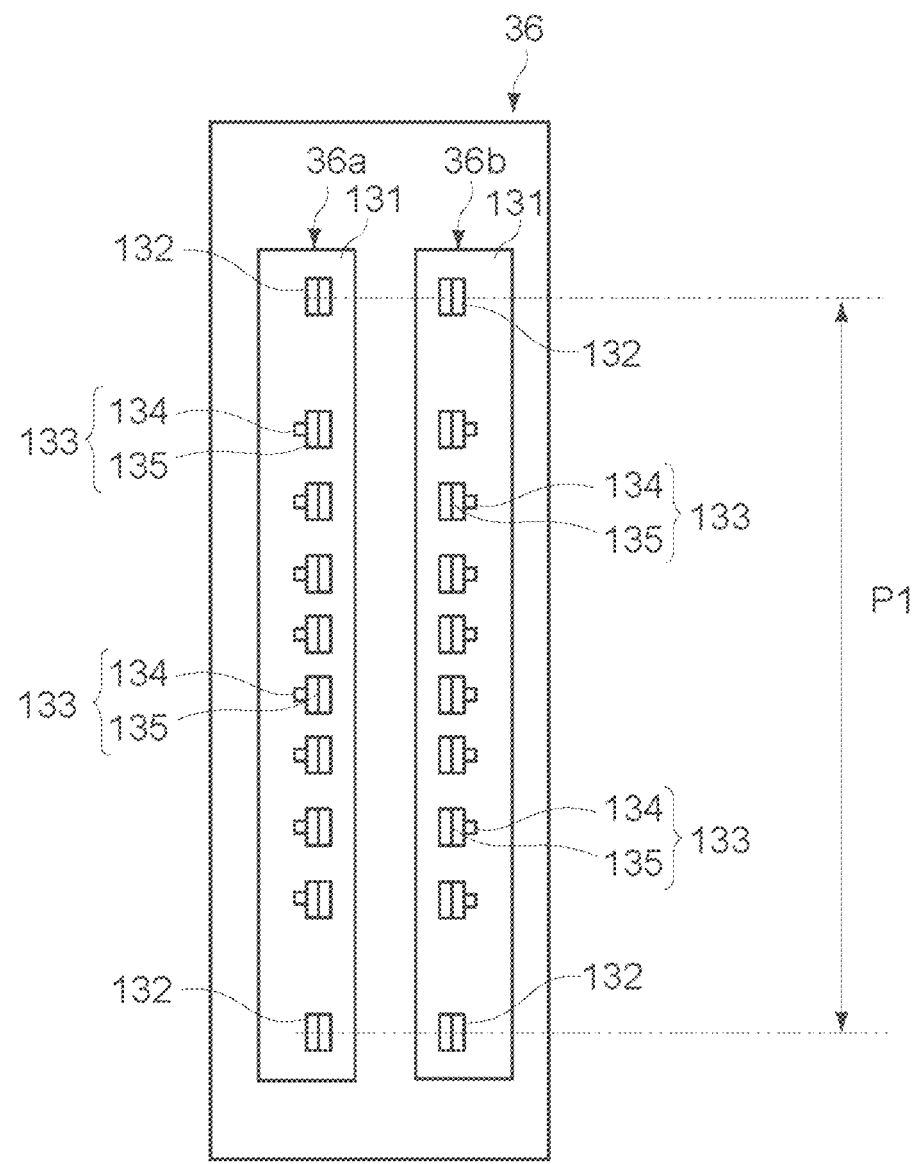
FIG. 7 is a schematic diagram of a drive head in the tape drive device as viewed from below (tape travelling surface).

The drive head 36 includes, for example, a head unit including two servo read heads, a plurality of data write/read heads, and the like. FIG. 7 is a schematic diagram of the drive head 36 as viewed from below (tape travelling surface).

As shown in FIG. 7, the drive head 36 includes a first drive head unit 36a and a second drive head unit 36b. The first drive head unit 36a and the second drive head unit 36b are configured symmetrically in an X'-axis direction (travelling direction of the magnetic tape 1 (X-axis direction in FIG. 3)). The first drive head unit 36a and the second drive head unit 36b are configured to be movable in a Y'-axis direction (in the width direction of the magnetic tape 1 (Y-axis direction in FIG. 3).

The first drive head unit 36a is a drive head used when the magnetic tape 1 travels in the forward direction (A1 direction in FIG. 6). Meanwhile, the second drive head unit 36b is a drive head used when the magnetic tape 1 travels in the reverse direction (A2 direction in FIG. 6). Since the first drive head unit 36a and the second drive head unit 36b have basically the same configuration, the first drive head unit 36a will be described as a representative.

The first drive head unit 36a includes a head body 131, two servo read heads 132, and a plurality of data write/read heads 133.

The servo read head 132 is configured to be capable of reproducing a servo signal by reading, by an MR element (MR: Magneto Resistive effect) or the like, the magnetic flux generated from the magnetic information recorded in the servo band s of the magnetic tape 1. That is, the servo signal is reproduced by reading, by the servo read head 132, the servo pattern 6 recorded on the servo band s.

The servo read head 132 is provided on each of both ends of the head body 131 in the width direction (Y'-axis direction in FIG. 7). Examples of the MR element include an anisotropic magneto resistive effect (AMR) element, a giant magneto resistive effect (GMR) element, and a tunnel magneto resistive effect (TMR) element. The servo read head pitch P1 that is an interval between the two servo read heads 132 in the width direction (Y'-axis direction) is set to the center value (2858.8 µm) of the standard value of the distance between two adjacent servo bands s in the magnetic tape 1 (servo band pitch).

The data write/read heads 133 are arranged at regular intervals along the width direction (Y'-axis direction). Further, the data write/read heads 133 are arranged at positions sandwiched between the two servo read heads 132. The number of the data write/read heads 133 is, for example, approximately 20 to 40. However, this number is not particularly limited and is 32 (32 channels) in this embodiment.

The data write/read head 133 includes a data write head 134 and a data read head 135. The data write head 134 is configured to be capable of recording a data signal on the data band d of the magnetic tape 1 by the magnetic field generated from the magnetic gap. Further, the data read head 135 is configured to be capable of reproducing a data signal by reading, by an MR element or the like, the magnetic field generated from the magnetic information recorded in the data band d of the magnetic tape 1. Examples of the MR element include an anisotropic magneto resistive effect (AMR) element, a giant magneto resistive effect (GMR) element, and a tunnel magneto resistive effect (TMR) element.

In the first drive head unit 36a, the data write head 134 is disposed on the left side of the data read head 135 (on the upstream side in the case where the magnetic tape 1 flows in the forward direction). Meanwhile, in the second drive head unit 36b, the data write head 134 is disposed on the right side of the data read head 135 (on the upstream side in the case where the magnetic tape 1 flows in the reverse direction). Note that the data read head 135 is capable of reproducing, immediately after the data write head 134 writes a data signal to the magnetic tape 1, this data signal.

Note that instead of the above, the data signal written by the data write head 134 of the first drive head unit 36a may be reproduced by the data read head 135 of the second drive head unit 36b.

Figure 8:
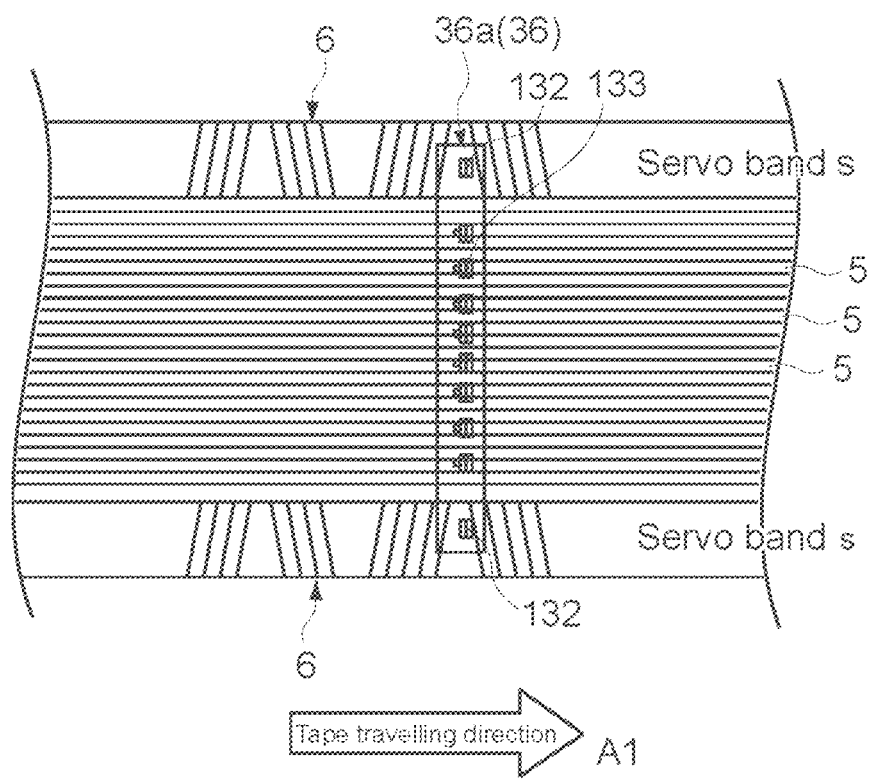
FIG. 8 is a diagram showing how a first drive head unit in the drive head records/reproduces a data signal.
Figure 8:
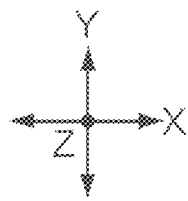

FIG. 8 is a diagram showing how the first drive head unit 36a records/reproduces a data signal. Note that the example shown in FIG. 8 shows the magnetic tape 1 travelling in the forward direction (A1 direction).

As shown in FIG. 8, when the first drive head unit 36a records/reproduces a data signal, one of the two servo read heads 132 is located on one servo band s of two adjacent servo bands s and reads the servo pattern 6 on this servo band s. Further, the other of the two servo read heads 132 is located on the other servo band s of the two adjacent servo bands s and reads the servo pattern 6 on this servo band s.

The control device 38 determines, on the basis of the reproduced waveform of the servo pattern 6, whether or not the servo read head 132 is accurately tracing the target servo trace line T (see FIG. 5).

This principle will be described. As shown in FIG. 5, the first stripe group 61 and the second stripe group 62 in the servo pattern 6 are inclined in opposite directions with respect to the width direction (Y-axis direction). For this reason, in the servo trace line T on the upper side, the distance between the first stripe group 61 and the second stripe group 62 in the longitudinal direction (X-axis direction) is relatively narrow. Meanwhile, on the servo trace line T on the lower side, the distance between the first stripe group 61 and the second stripe group 62 in the longitudinal direction (X-axis direction) is relatively wide. For this reason, by obtaining the difference between the time when the reproduced waveform of the first stripe group 61 was detected and the time when the reproduced waveform of the second stripe group 62 was detected, the current position of the servo read head 132 in the width direction (Y-axis direction) with respect to the magnetic tape 1 can be known.

Therefore, the control device 38 is capable of determining, on the basis of the reproduced waveform of the servo pattern 6, whether or not the servo read head 132 is accurately tracing the target servo trace line T. Then, the control device 38 causes, in the case where the servo read head 132 is not accurately tracing the target servo trace line T, the drive head 36 to move in the width direction (Y'-axis direction) to adjust the position or tracking of the drive head 36. Note that the measurement method of the servo trace line T traced by the servo read head 132 will be described below (see FIGS. 12 and 13).

Returning to FIG. 8, the data write/read head 133 adjusts, in the case where the magnetic tape 1 fluctuates in the width direction during travelling of the magnetic tape 1, the position so as to be along the servo trace line T and records a data signal in the recording track 5.

Here, when the magnetic tape 1 is completely drawn out from the tape cartridge 10, the magnetic tape 1 is caused to travel in the reverse direction (A2 direction). At this time, as the drive head 36, the second drive head unit 36b is used. As the servo trace line T, the servo trace line T adjacent to the previous servo trace line T is used. In this case, the drive head 36 is caused to move in the width direction (Y'-axis direction) by the interval Ps of the servo trace line T (=the recording track width Wd). In this case, a data signal is recorded by the data write head 134 of the second drive head unit 36b on the recording track 5 adjacent to the recording track 5 on which a data signal was previously recorded.

In this way, a data signal is recorded on the recording track 5 while the magnetic tape 1 is reciprocated many times by changing the travelling direction between the forward direction and the reverse direction. For example, assumption is made that the number of servo trace lines T is 100 and the number of data write/read heads 133 included in the first drive head unit 36a (or the second drive head unit 36b) is 32. In this case, the number of recording tracks 5 included in one data band d is 100×32=3200, and it is necessary to reciprocate the magnetic tape 1 50 times in order to record a data signal in all the recording tracks 5.

(Servo Pattern)

Subsequently, details of the servo pattern 6 will be described.

The servo pattern 6 has a data structure conforming to the "ECMA-319 standard". Part (A) of FIG. 9 is a schematic plan view showing an arrangement example of the servo pattern 6 and Part (B) of FIG. 9 is a diagram showing the reproduced waveform.

In a timing-based servo type head tracking servo, the servo pattern includes a plurality of azimuthal slope patterns of two or more different shapes. The position of the servo read head 132 is recognized on the basis of the time interval between reading two inclined patterns with different shapes and the time interval between reading two inclined patterns with the same shape. The position of the drive head 36 in the width direction of the magnetic tape 1 (Y-axis direction) is controlled on the basis of the position of the servo read head 132 thus recognized (see FIGS. 7 and 8).

Figure 9:
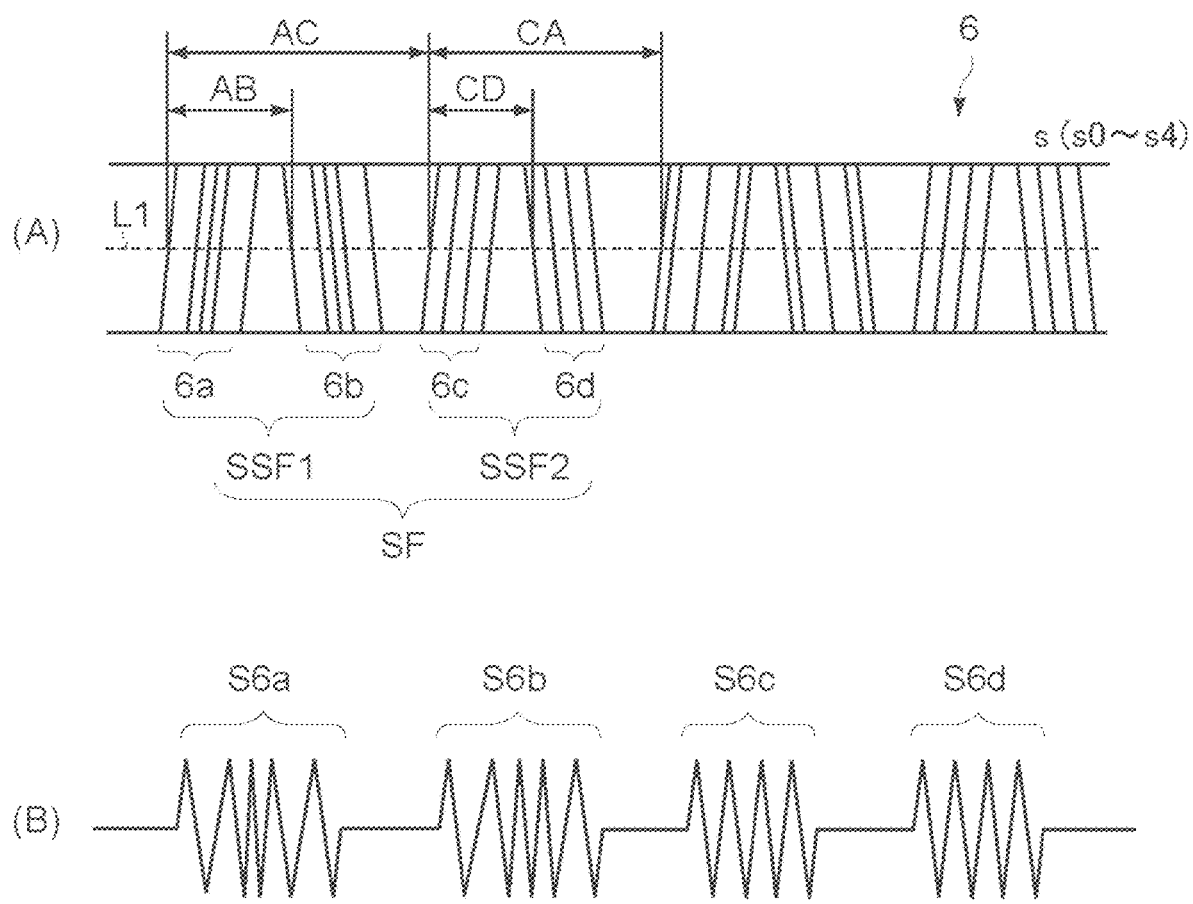
FIG. 9 Part (A) of FIG. 9 is a schematic plan view showing an arrangement example of a servo pattern, and Part (B) of FIG. 9 is a diagram showing a reproduced waveform thereof.

As shown in Part (A) of FIG. 9, the servo pattern 6 forms servo frames SF each including a first servo sub-frame SSF1 and a second servo sub-frame SSF2. The servo frames SF are arranged in the longitudinal direction of the magnetic tape 1 at predetermined intervals along the tape longitudinal direction. Each of the servo frames SF encodes one bit of "1" or "0". That is, one servo frame SF corresponds to one bit.

The first servo sub-frame SSF1 includes an A burst 6a and a B burst 6b. The A burst 6a includes five linear patterns (corresponding to the first stripe group 61 in FIG. 5) inclined in the first direction with respect to the tape longitudinal direction, and the B burst 6b includes five linear patterns (corresponding to the second stripe group 62 in FIG. 5) inclined in the second direction opposite to the first direction with respect to the tape longitudinal direction.

Meanwhile, the second servo sub-frame SSF2 includes a C burst 6c and a D burst 6d. The C burst 6c includes four linear patterns (corresponding to the first stripe group 61 in FIG. 5) inclined in the first direction described above and the D burst 6d includes four linear patterns (corresponding to the second stripe group 62 in FIG. 5) inclined in the second direction.

The lengths of the servo frame SF and each of the servo sub-frames SSF1 and SSF2, the arrangement intervals of the inclined portions inclining the respective bursts 6a to 6d, and the like can be arbitrarily set in accordance with the types, specifications, and the like of the magnetic tape.

The reproduced waveform of the servo pattern 6 typically exhibits a burst waveform as shown in Part (B) of FIG. 6, and a signal S6a, a signal S6b, a signal S6c, and a signal S6d respectively correspond to the A burst 6a, the B burst 6b, the C burst 6c, and the D burst 6d.

In the timing-based servo type head tracking servo, a position error signal (PES) is generated by reading the servo pattern 6 on two servo bands adjacent to one data band, and a recording/reproducing head is suitably positioned with respect to the recording track in the data band. Typically, the servo pattern 6 is read from the magnetic tape 1 travelling at a predetermined speed, a ratio of a distance (time interval) AC between the A burst 6a and the C burst 6c that are an array of inclined patterns having the same shape and a distance (time interval) AB between the A burst 6a and the B burst 6b that are an array of inclined patterns having different shapes (or a ratio of a distance CA between the C burst 6c and the A burst 6a and a distance CD between the C burst 6c and the D burst 6d) is calculated, and the drive head 36 is caused to move in the tape width direction (Y'-axis direction) such that the value equals to a setting value determined for each recording track (see FIG. 8).

[Specification of Data Band]

A different combination of pieces of servo band identification information for each data band is written to each of the servo bands s (s0 to s4). For example, the combination of pieces of servo band identification information obtained from the two servo bands s2 and s3 adjacent to the data band do is different from the combination of pieces of servo band identification information obtained from the servo bands s1 and s2 adjacent to the data band d1, the combination of pieces of servo band identification information obtained from the servo bands s3 and s4 adjacent to the data band d2, and the combination of pieces of servo band identification information obtained from the servo bands s0 and s1 adjacent to the data band d3. By making servo band identification information obtained from two servo bands adjacent to one data band different from servo band identification information obtained from two servo bands adjacent to another data band in this way, it is possible to specify the individual data band.

In this embodiment, two types of servo bands are used to specify the data bands do to d4 to be recorded and reproduced. As described above, servo band identification information is embedded in the servo band. The servo band identification information is information of a plurality of bits, which is typically four bits but may be eight bits or a plurality of bits other than the four bits and eight bits.

In this embodiment, the two types of servo bands described above include a first servo band in which first servo band identification information is recorded and a second servo band in which second servo band identification information is recorded. The first servo band identification information is 4-bit information (e.g., "1001"). The second servo band identification information is 4-bit information (e.g., "0111") different from the first servo band identification information.

The combination of codes "0" and "1" forming the first and second servo band identification information is identified on the basis of the reproduced waveform of the servo pattern 6. That is, the reproduced waveform of the servo pattern 6 corresponds to the modulation waves of the codes "0" and "1", and the first and second servo band identification information is read by demodulating the reproduced waveform and combining four bits, for example. The first and second servo band identification information will be described below with reference to FIG. 10 and FIG. 11.

Figure 10:
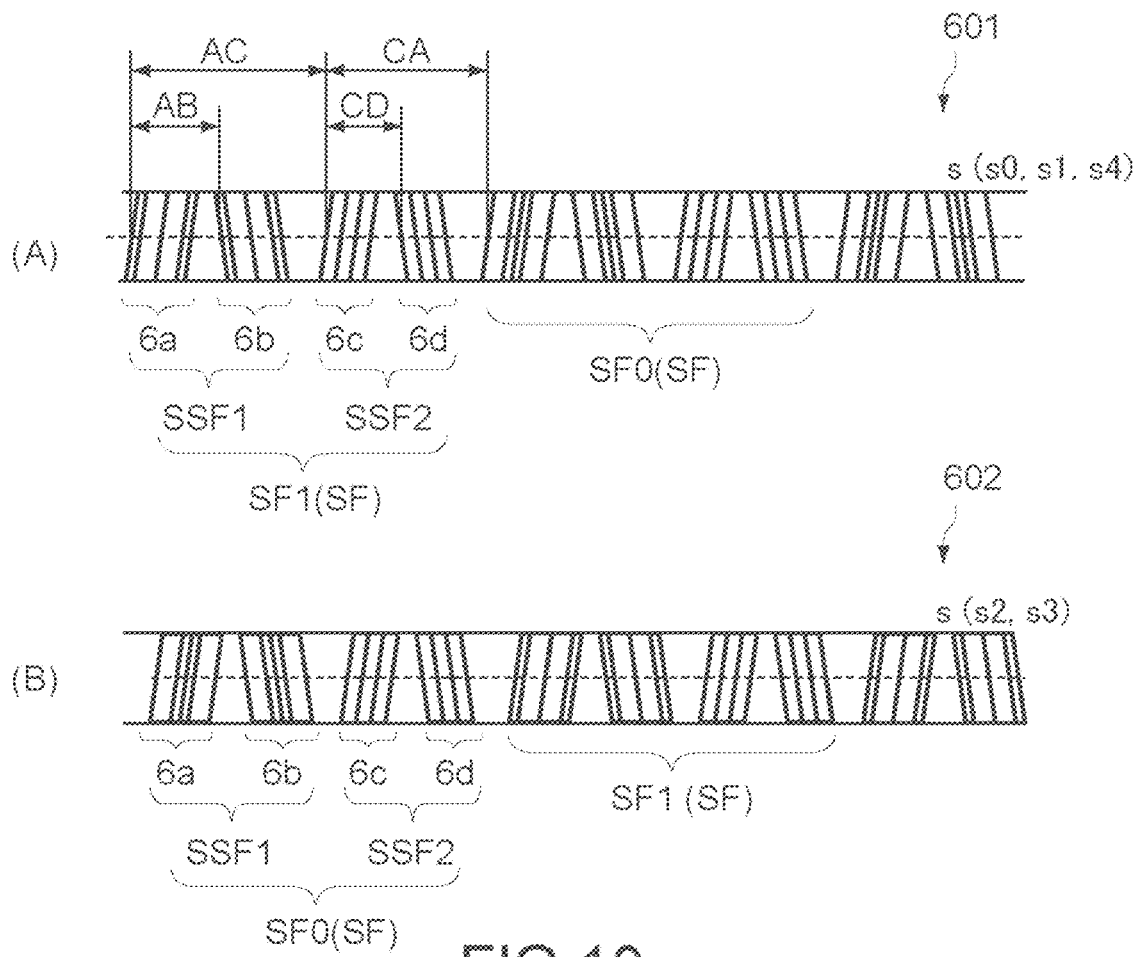
FIG. 10 is a schematic diagram showing configuration examples of a servo pattern in which first servo band identification information is embedded (A) and a servo pattern in which second servo band identification information is embedded (B).

Parts (A) and (B) of FIG. 10 are each a schematic diagram showing a configuration example of a servo pattern in which the first servo band identification information is embedded (hereinafter, referred to also as a first servo pattern 601) and a servo pattern in which the second servo band identification information is embedded (hereinafter, referred to also as a second servo pattern 602). As shown in the figure, both the first servo pattern 601 and the second servo pattern 602 include a combination of two types of servo frames SF including a servo frame SF1 that represents one code (e.g., "1") and a servo frame SF0 that represents the other code (e.g., "0"). The servo frames SF1 and SF0 are common in that the servo frame SF including the first servo sub-frame SSF1 and the second servo sub-frame SSF2 is a constituent unit, but the first servo sub-frames SSF1 (the A burst 6a and the B burst 6b) are different from each other.

As shown in Part (A) of FIG. 10, when five inclined patterns forming each of the A burst 6a and the B burst 6b are defined as a first inclined portion, a second inclined portion, a third inclined portion, a fourth inclined portion, and a fifth inclined portion in the stated order from the left side of the figure in the servo frame SF1 representing the code "1", the second and fourth inclined portions are arranged at positions deviated toward the first and fifth inclined portions, respectively. Meanwhile, as shown in Part (B) of FIG. 10, in the servo frame SF0 representing the code "0", the arrangement intervals of some of the inclined patterns forming the A burst 6a and the B burst 6b are different from those of the servo frame SF1. In the illustrated example, regarding five inclined patterns forming each of the A burst 6a and the B burst 6b, both the second and fourth inclined portions are arranged at positions deviated toward the third inclined portion. For this reason, regarding the A burst 6a and the B burst 6b in the servo frame SF0, the interval between the second inclined portion and the third inclined portion and the interval between the third inclined portion and the fourth inclined portion are the shortest, and the interval between the first inclined portion and the second inclined portion and the interval between the fourth inclined portion and the fifth inclined portion are the longest.

Figure 11:
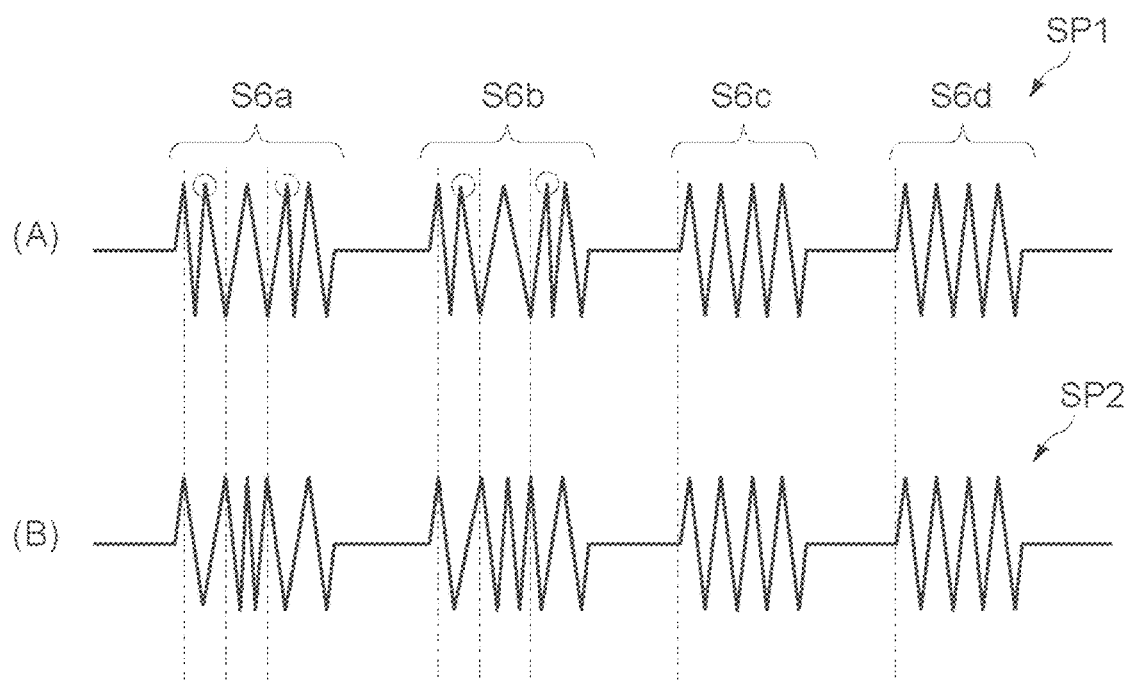
FIG. 11 is a diagram showing a reproduced waveform of a first servo pattern (A) and a reproduced waveform of a second servo pattern (B).

Parts (A) and (B) of FIG. 11 respectively show reproduced waveforms SP1 and SP2 of the first servo pattern 601 and the second servo pattern 602. The reproduced waveform of each of the servo frames SF1 and SF0 includes a burst signal having a peak at a position corresponding to the inclined portion of each of the bursts 6a to 6d. As described above, in the servo frame SF0, since the configurations of the A burst 6a and the B burst 6b are different from those of the A burst 6a and the B burst 6b of the servo frame SF1, the peak positions of the burst signals S6a and S6b are deviated corresponding to the intervals of the different inclined portions. Therefore, information written in the servo frame SF can be read by detecting sites where the peak positions are deviated, the amount of deviation, and the deviation direction. Here, for example, the servo frame SF1 shown in Part (A) of FIG. 11 represents one bit "1", and the servo frame SF0 shown in Part (B) of FIG. 11 represents another one bit "0". The first and second servo band identification information can be configured by arbitrarily combining four bits of the two servo frames SF1 and SF0, for example.

[Measurement Method of Servo Band Pitch]

Subsequently, a measurement method of the servo band pitch of the magnetic tape 1 will be described.

Here, the servo band pitch is an index indicating the distance between two servo bands (servo bands s2 and s3) adjacent to one data band (e.g., data band d0). In more detail, the servo band pitch is the distance between the center of the servo pattern recorded in one of the two servo bands described above and the center of the servo pattern recorded in the other servo band. Further, in the following description, the servo band pitch is used to mean the difference from the servo read head pitch P1 (see FIG. 7) in some cases.

The servo band pitch is measured by the tape drive device 30. Here, as shown in FIG. 12, an example in which the data band do sandwiched between the servo band s2 and the servo band s3 is tracked by the drive head 36 will be described.

In the measurement method of the servo band pitch using the tape drive device 30, the magnetic tape 1 is caused to travel by the tape drive device 30, the servo trace lines T on the respective servo bands of the two servo read heads 132 are measured, and a servo band pitch is measured on the basis of the relative position of each of the measured servo trace lines T with respect to the servo pattern 6, as described above.

Figure 12:
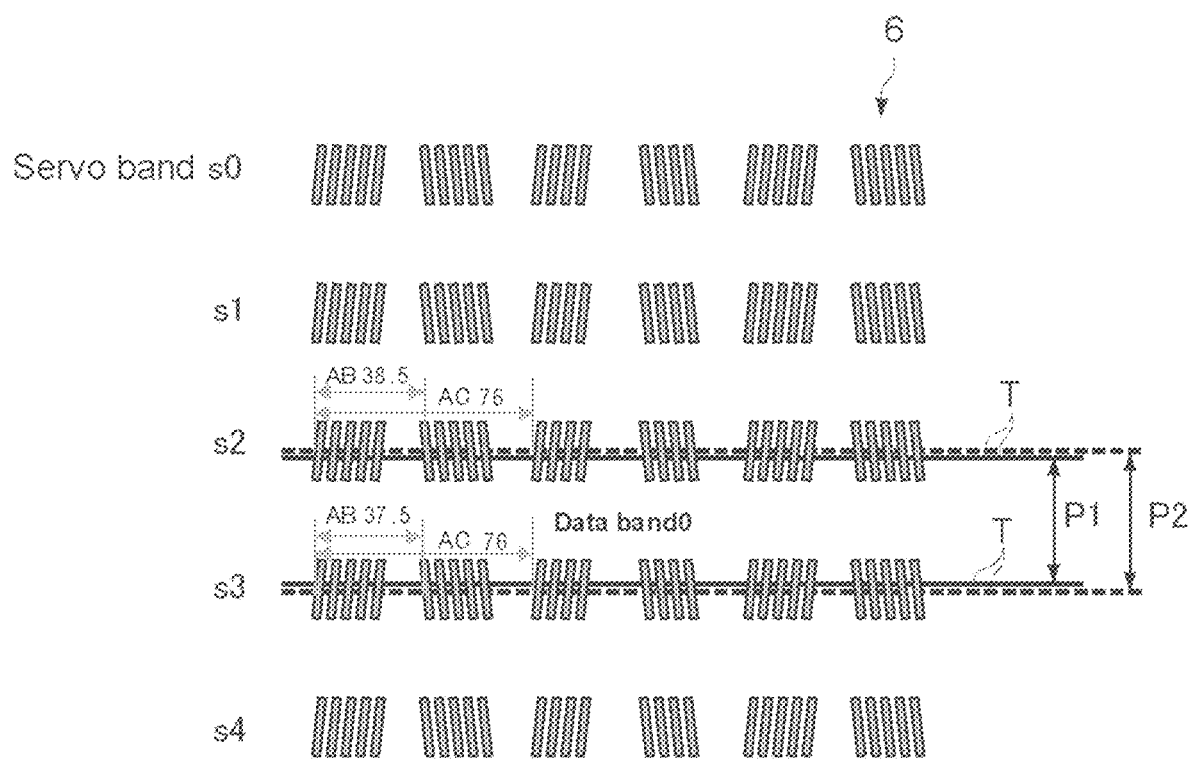
FIG. 12 is an explanatory diagram of a drive head tracking the data band.

In FIG. 12, the interval between the servo trace lines T indicated by solid lines indicates the servo band pitch (servo read head pitch P1 that is the arrangement interval between the two servo read heads 132 of the drive head 36) when the width of the magnetic tape 1 does not change. Further, in FIG. 12, the interval between the servo trace lines T indicated by broken lines corresponds to a servo band pitch (P2) when the width of the magnetic tape 1 is widened.

Figure 13:
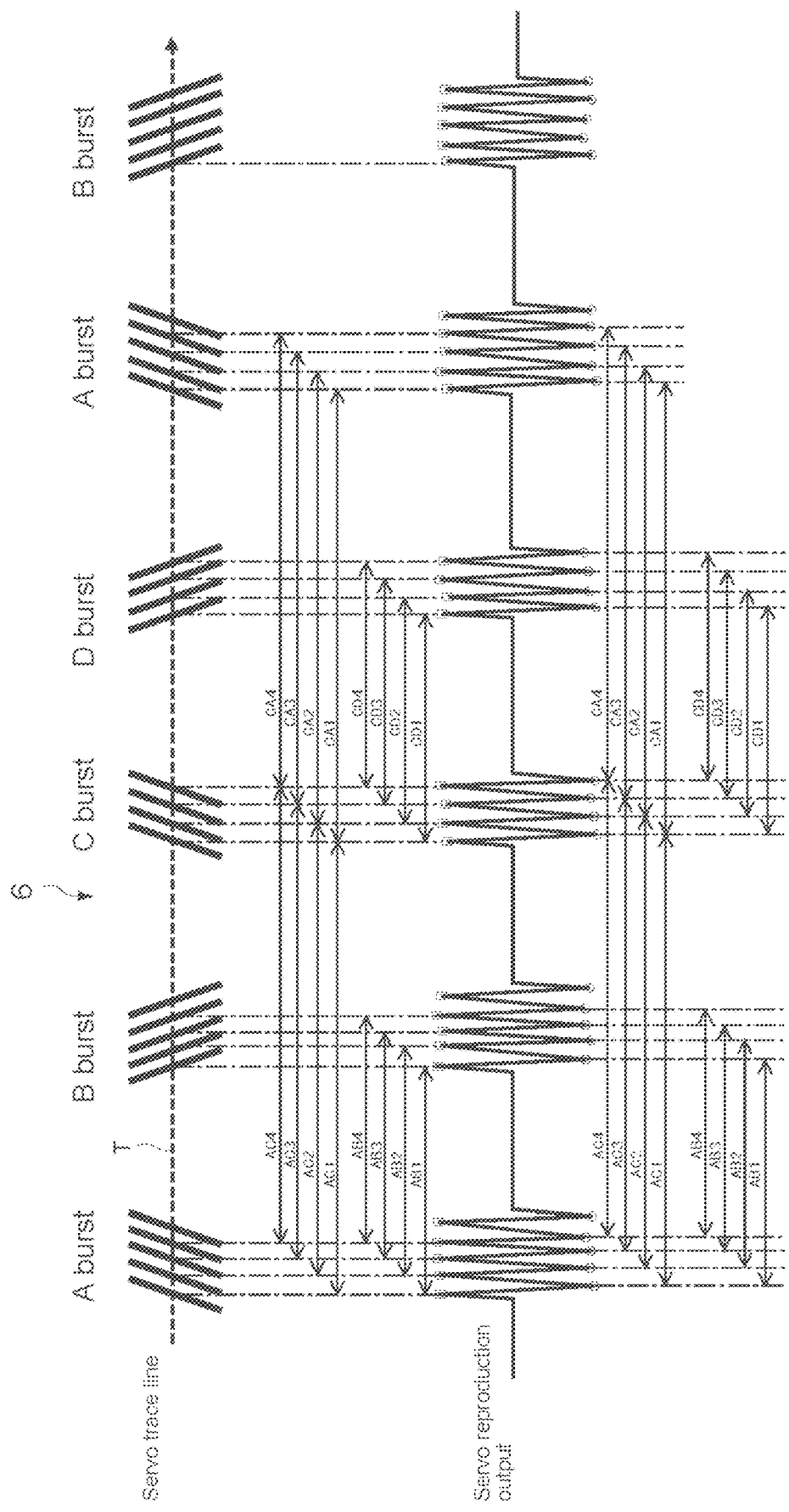
FIG. 13 is a diagram describing a method of measuring a servo trace line.

FIG. 13 is a diagram describing a measurement method of the servo trace line T. The tape drive device 30 outputs a servo reproduction signal of the waveform corresponding to the position of the servo trace line T with respect to the servo pattern 6 (see FIG. 11). Typically, a distance AC between the A burst and the C burst, which are arrays of inclined patterns of the same shape, and a distance AB between the A burst and the B burst, which are arrays of inclined patterns of different shapes, are calculated, and the position of the servo trace line T of each servo read head 132 is measured by the following formula [Math. 1]. Note that θ is an azimuth angle of each inclined pattern corresponding to the angle α in FIG. 5 and is 12° in this example.

$$\frac{\sum AB \text{ Time}}{\sum AC \text{ Time}} \times AC[um] \times \frac{1}{2\tan\theta} \quad \text{(Math. 1)}$$

Here, the distance AC may be a distance AC1 between first inclined portions of the A burst and the C burst, a distance AC2 between second inclined portions thereof, a distance AC3 between third inclined portions thereof, or a distance AC4 between fourth inclined portions thereof. These distances AC (AC1 to AC4) refer to the distances between the positions (upper peak positions) each indicating the maximum positive value of the amplitude in the servo reproduction waveform.

Similarly, the distance AB may be a distance AB1 between first inclined portions of the A burst and the B burst, a distance AB2 between second inclined portions thereof, a distance AB3 between third inclined portions thereof, or a distance AB4 between fourth inclined portions thereof. Typically, the distance AB1 is adopted in the case where the distance AC1 is adopted, the distance AB2 is adopted in the case where the distance AC2 is adopted, the distance AB3 is adopted in the case where the distance AC3 is adopted, and the distance AB4 is adopted in the case where the distance AC4 is adopted.

Then, the servo band pitch is obtained from the difference between the numerical values representing the positions of the respective servo trace lines T on the servo patterns, which are obtained from the ratio of the distance AB and the distance AC and calculated using the formula [Math. 1]. Here, the difference in the measured value of the servo band (servo band s2), of the two servo bands to be measured, on the tape center side from the measured value of the servo band (servo band s3) on the tape edge side is taken. The positive or negative of the value means the direction of change in the tape width. The positive value corresponds to narrowing of the servo band pitch and the negative value corresponds to widening of the servo band pitch. In the case where the difference described above is zero, it means that there is no fluctuation in tape width.

The servo band pitch is favorably obtained from the difference of many servo frames and may be, for example, the average value of the measured values calculated from the differences of 100 to 100000 servo frames. The tape tension during the measurement is set to the tension during recording of the servo pattern 6 (the reference tension, for example, 0.55 N), and the measurement is performed with a constant tension over the entire length of the magnetic tape 1.

Note that the measurement method of the servo trace line T is not limited to the example described above. For example, a distance CA between the C burst and the A burst and a distance CD between the C burst and the D burst may be calculated, and the position of the servo trace line T may be measured using the following formula [Math. 2].

$$\frac{\sum CD \text{ Time}}{\sum CA \text{ Time}} \times CA[um] \times \frac{1}{2\tan\theta} \quad \text{(Math. 2)}$$

Here, the distance CA may be a distance CA1 between first inclined portions of the C burst and the A burst, a distance CA2 between second inclined portions thereof, a distance CA3 between third inclined portions thereof, or a distance CA4 between fourth inclined portions thereof. These distances CA (CA1 to CA4) refer to the distances between the positions each indicating the maximum positive value of the amplitude in the servo reproduction waveform.

Similarly, the distance CD may be a distance CD1 between first inclined portions of the C burst and the D burst, a distance CD2 between second inclined portions thereof, a distance CD3 between third inclined portions thereof, or a distance CD4 between fourth inclined portions thereof. Typically, the distance CD1 is adopted in the case where the distance CA1 is adopted, the distance CD2 is adopted in the case where the distance CA2 is adopted, the distance CD3 is adopted in the case where the distance CA3 is adopted, and the distance CD4 is adopted in the case where the distance CA4 is adopted.

Further, the average value of the measured values using the formula [Math. 1] and the measured value using the formula [Math. 2] may be used to measure the servo band pitch.

Further, the distances between the positions (lower peak positions) indicating the maximum negative values of the amplitude in the servo reproduction waveform may be adopted as the distances AC and AB in the formula [Math. 1] and the distances CA and CD in the formula [Math. 2].

Alternatively, the average values of the distances between the positions (upper peak positions) indicating the maximum positive values of the amplitude in the servo reproduction waveform and the distances between the positions (lower peak positions) indicating the maximum negative values of the amplitude in the servo reproduction waveform may be used as the distances AC and AB in the formula [Math. 1] and the distances CA and CD in the formula [Math. 2].

As shown in FIG. 12, in the case where the servo trace lines T are located at the positions indicated by the broken lines, the distance AB is 38.5 μm and the distance AC is 76 μm in the servo band s2 and the distance AB is 37.5 μm and the distance AC is 76 μm in the servo band s3.

In the servo band s2, $$(38.5/76) \times (76/2 \tan 12°) = 90.5641 \, [\mu m]$$

In the servo band s3,
$(37.5/76) \times (76/2 \tan 12°) = 88.2118 [\mu m]$. The difference between these values is $$88.2118 - 90.5641 = -2.3523 [\mu m].$$

Therefore, a servo band pitch P2 in this case is obtained as a value wider than the servo read head pitch P1 by 2.3523 μm.

Note that in the case where the servo trace lines T are located at the positions indicated by the solid lines as shown in FIG. 12, the distance AB is 38 μm and the distance AC is 76 μm in both the servo band s2 and the servo band s3. In this case, in both the servo band s2 and the servo band s3, the servo band pitches are 89.3880 [μm] and the difference between them is 0 [μm]. That is, the servo band pitch in this case means the same as the servo read head pitch P1.

(Tension Control)

The tape drive device 30 controls, on the basis of the servo pattern pitch measured as described above, the tension of the magnetic tape 1 such that the measured servo pattern pitch is the same as the servo read head pitch P1.

In this embodiment, prior to recording of data on the magnetic tape 1 or reproduction of data from the magnetic tape 1, servo signals are read from two servo bands sandwiching one data band for recording or reproducing data, and whether the two servo band pitches are wider or narrower than the servo read head pitch P1 is determined from the read servo signals. The tension is increased in the case where the servo band pitch is wider than the servo read head pitch P1, and the tension is decreased in the case where the servo band pitch is narrower than the servo read head pitch P1. By adjusting the magnitude of the tension in accordance with the magnitude of the servo band pitch in this way, it is possible to stably perform desired tracking control for the data band.

The tape drive device 30 acquires a relationship between the servo band pitch and tension for one data band by one round trip of tape travelling, and records the obtained data on the cartridge memory 9. The tape drive device 30 applies the relationship between the servo band pitch and tension measured for the one data band when recording and reproducing data for another data band similarly.

[Servo Pattern Recording Apparatus]

Figure 14:
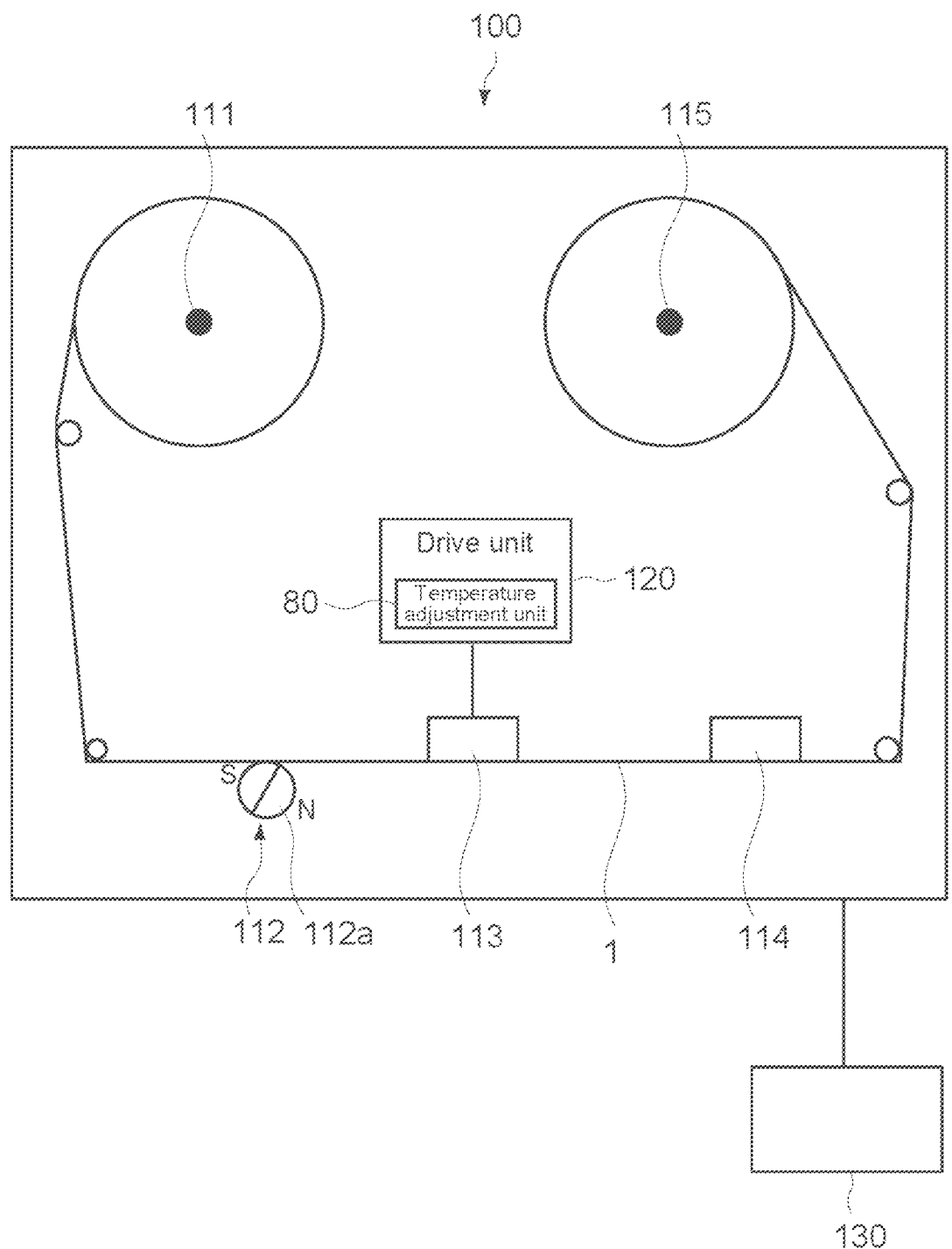
FIG. 14 is a schematic front view showing a servo pattern recording apparatus according to an embodiment of the present technology.
Figure 15:
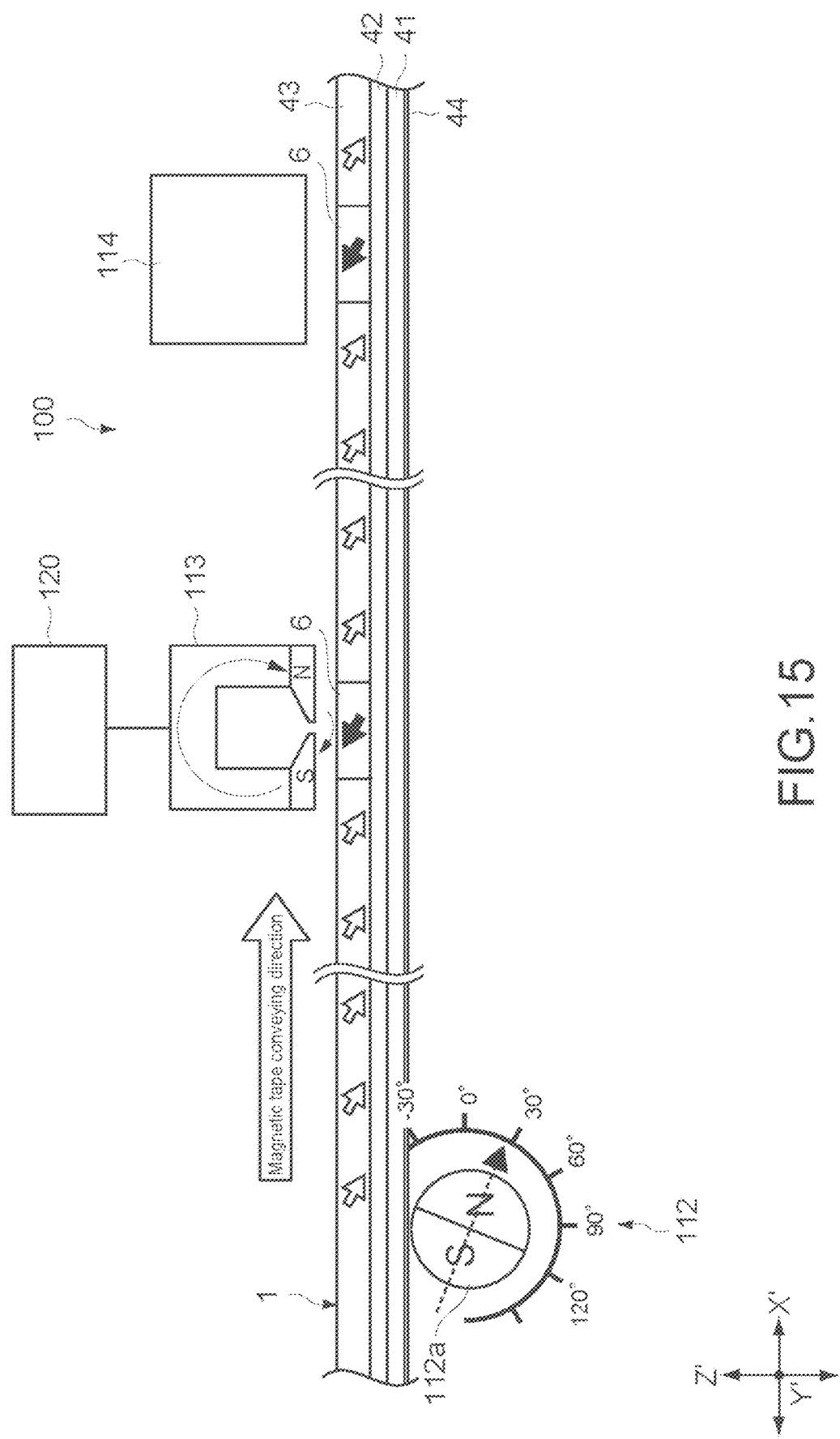
FIG. 15 is a partial enlarged view showing part of the servo pattern recording apparatus.

Subsequently, a configuration of a servo pattern recording apparatus that records the servo pattern 6 on the servo band s of the magnetic tape 1 will be described. FIG. 14 is a schematic front view showing the servo pattern recording apparatus 100 according to an embodiment of the present technology. FIG. 15 is a partial enlarged view showing part of the servo pattern recording apparatus 100.

The servo pattern recording apparatus 100 includes a feed roller 111, a preprocessing unit 112, a servo write head 113, a reproduction head unit 114, and a winding roller 115 in order from the upstream side in the conveying direction of the magnetic tape 1. The servo pattern recording apparatus 100 further includes a drive unit 120 and a controller 130. The controller 130 includes a control unit that integrally controls the respective units of the servo pattern recording apparatus 100, a storage unit in which various programs and data necessary for processing of the control unit, a display unit that displays data, an input unit that inputs data, and the like.

The feed roller 111 is capable of rotatably supporting the rolled magnetic tape 1 (before recording the servo pattern 6). The feed roller 111 is caused to rotate in accordance with driving of a drive source such as a motor, and feeds out the magnetic tape 1 toward the downstream side in accordance with rotation.

The winding roller 115 is capable of rotatably supporting the rolled magnetic tape 1 (after recording the servo pattern 6). The winding roller 115 rotates in synchronization with the feed roller 111 in accordance with driving of a drive source such as a motor, and winds up the magnetic tape 1 on which the servo pattern 6 is recorded in accordance with rotation. The feed roller 111 and the winding roller 115 are capable of causing the magnetic tape 1 to move at a constant speed on the conveying path.

The servo write head 113 is disposed, for example, above the magnetic tape 1 (on the side of the magnetic layer 43). The servo write head 113 may be disposed below the magnetic tape 1 (on the side of the base material 41). The servo write head 113 generates a magnetic field at a predetermined timing in accordance with a pulse signal of a square wave, and applies a magnetic field to part of the magnetic layer 43 (after preprocessing) of the magnetic tape 1.

In this way, the servo write head 113 magnetizes part of the magnetic layer 43 in the first direction to record the servo pattern 6 on the magnetic layer 43 (see a black arrow in FIG. 15 for the magnetization direction). The servo write head 113 is capable of recording, when the magnetic layer 43 passes below the servo write head 113, the servo pattern 6 in each of the five servo bands s0 to s4.

The first direction that is the magnetization direction of the servo pattern 6 includes a perpendicular component perpendicular to the upper surface of the magnetic layer 43. That is, in this embodiment, the magnetic layer 43 includes perpendicularly oriented or non-oriented magnetic powder, and thus, the servo pattern 6 to be recorded in the magnetic layer 43 includes a perpendicular magnetization component.

The preprocessing unit 112 is disposed, for example, below the magnetic tape 1 (on the side of the base material 41) on the upstream side of the servo write head 113. The preprocessing unit 112 may be disposed above the magnetic tape 1 (on the side of the magnetic layer 43). The preprocessing unit 112 includes a permanent magnet 112a that is rotatable with the Y'-axis direction (width direction of the tape 1) as a central axis of rotation in FIG. 15. The shape of the permanent magnet 112a is, for example, a columnar shape or a polygonal columnar shape, but is not limited thereto.

The permanent magnet 112a applies, before the servo write head 113 records the servo pattern 6, a magnetic field to the entire magnetic layer 43 using a CD magnetic field to demagnetize the entire magnetic layer 43. In this way, the permanent magnet 112a is capable of magnetizing the magnetic layer 43 in advance in the second direction opposite to the magnetization direction of the servo pattern 6 (see white arrows in FIG. 15). By making the two magnetization directions opposite to each other in this way, it is possible to make the reproduced waveform of the servo signal obtained by reading the servo pattern 6 symmetrical in the up-and-down direction (+).

Note that as the method of adjusting the above second direction, for example, the rotation angle of the permanent magnet 112a may be arbitrary, the servo pattern 6 may be recorded on the magnetic layer 43 after demagnetizing the entire magnetic layer 43, and the rotation angle of the permanent magnet 112a around the width direction of the magnetic tape 1 may be adjusted on the basis of the slope of the reproduced waveform.

The reproduction head unit 114 is disposed above the magnetic tape 1 (on the side of the magnetic layer 43) on the downstream side of the servo write head 113. The reproduction head unit 114 reads the above servo pattern 6 from the magnetic layer 43 of the magnetic tape 1 which is preprocessed by the preprocessing unit 112 and on which the servo pattern 6 is recorded by the servo write head 113. The reproduced waveform of the servo pattern 6 read by the reproduction head unit 114 is displayed on the screen of the display unit. Typically, the reproduction head unit 114 detects, when the magnetic layer 43 passes below the reproduction head unit 114, the magnetic flux generated from the surface of the servo band s. The magnetic flux detected at this time is the reproduced waveform of the servo pattern 6 as a servo signal.

Figure 16:
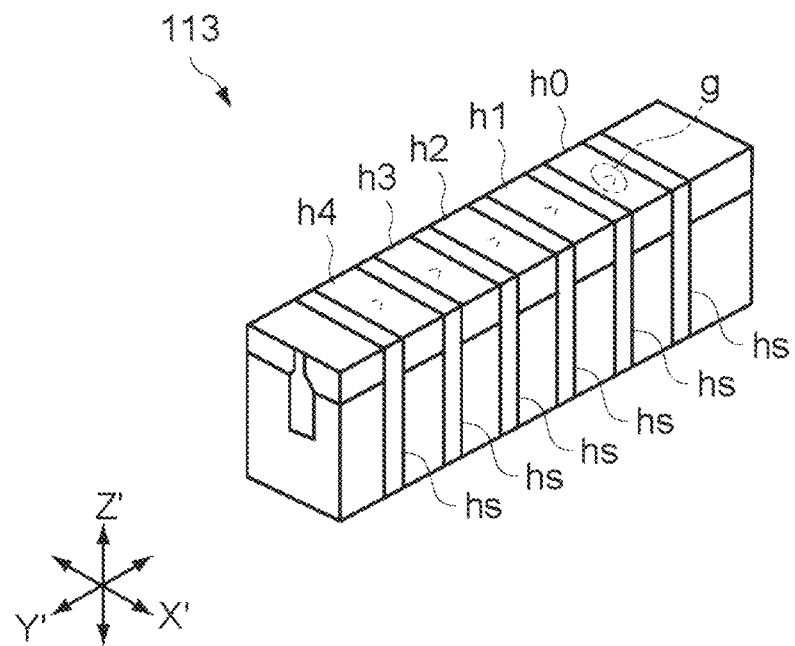
FIG. 16 is a perspective view schematically showing a configuration of a servo write head in the servo pattern recording apparatus.
Figure 17:
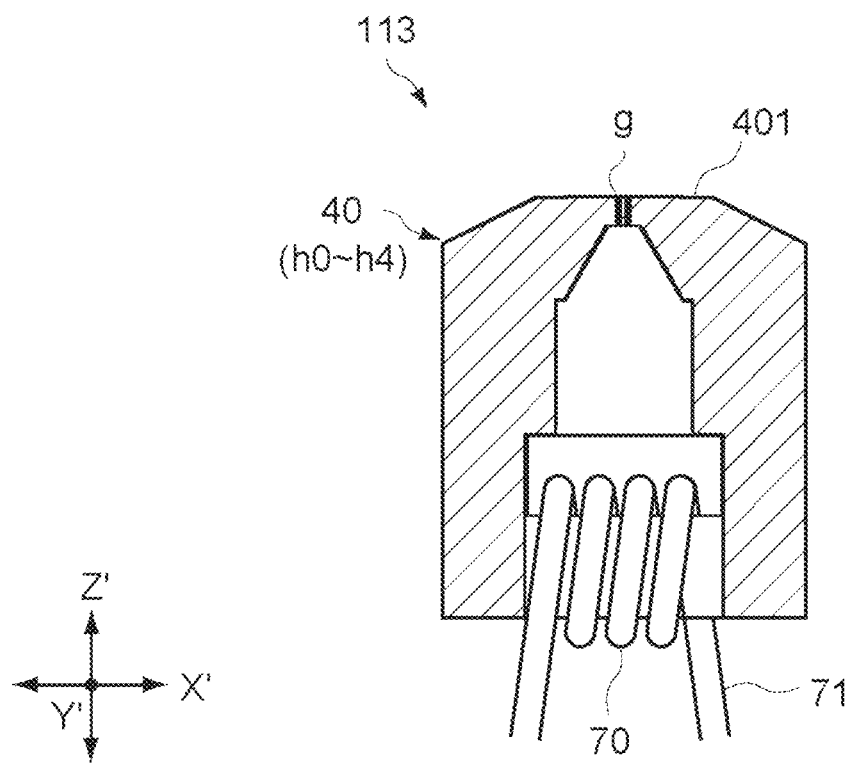
FIG. 17 is a schematic cross-sectional view of a main part of the servo write head.
Figure 18:
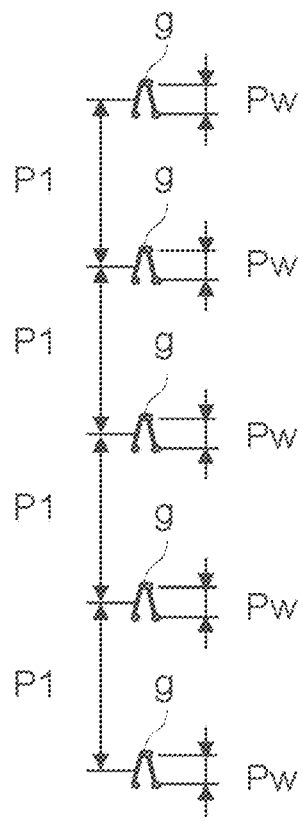
FIG. 18 is a schematic plan view of a main part of the servo write head.

FIG. 16 is a perspective view schematically showing a configuration of the servo write head 113, FIG. 17 is a schematic cross-sectional view of a main part of the servo write head 113, and FIG. 18 is a schematic plan view of a main part of the servo write head 113.

As shown in FIG. 16 and FIG. 17, the servo write head 113 includes a plurality of magnetic cores h0 to h4 for recording the servo pattern 6 in each of the servo bands s0 to s4 of the magnetic tape 1, and adhesive layers hs that join the magnetic cores h0 to h4 to each other.

Each of the magnetic cores h0 to h4 includes a head block 40 formed of a soft magnetic material such as sendust, permalloy, and ferrite, and a coil 70 wound around the head block 40. The magnetic cores h0 to h4 constitute recording units 401 arranged corresponding to the respective servo bands s0 to s4 of the magnetic tape 1 and include magnetic gaps g for recoding the servo pattern 6 in the respective servo bands s.

The magnetic gap g includes a pair of straight portions ("/" and "Y") inclined in direction opposite to each other. One linear portion "/" records the A burst 6a and the C burst 6c, and the other linear portion "Y" records the B burst 6b and the D burst 6d. The magnetic gaps g of the head blocks h1 to h5 are arranged so as to be aligned on an axis line parallel to the longitudinal direction (Y' direction) of the servo write head 113. The arrangement interval of the magnetic gaps g is the distance between the centers in a pattern width Pw in the longitudinal direction of the servo write head 113, and the magnitude thereof is the servo read head pitch P1. The magnetic cores h0 to h4 are magnetically separated from each other and are configured to be capable of recording different types of servo patterns 6 in two or more servo bands at the same time.

Figure 19:
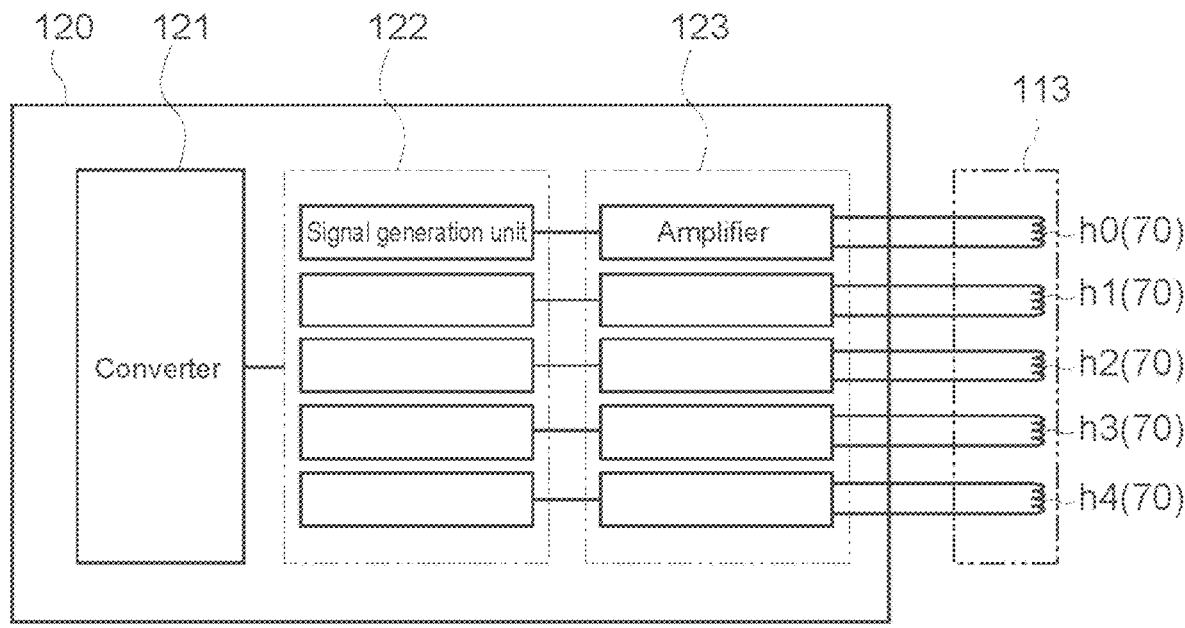
FIG. 19 is a block diagram showing a configuration of a drive unit in the servo pattern recording apparatus.

FIG. 19 is a block diagram showing a configuration of the drive unit 120. As shown in FIG. 19, the drive unit 120 includes a converter 121 that converts, on the basis of the output from the controller 130 (see FIG. 14), servo information into pulse information, a signal generation unit 122 that generates a pulse signal on the basis of the output of the converter 121, and an amplifier 123 that amplifies the generated pulse signal. The signal generation unit 122 and the amplifier 123 respectively include a plurality of signal generation units 122 and a plurality of amplifiers 123 provided corresponding to the respective magnetic cores h0 to h4, and are configured to be capable of outputting a unique pulse signal to the respective coils 70 wound around the magnetic cores h0 to h4.

The controller 130 includes a memory storing data regarding the position (servo bands s0, s1, and s4 in this example) of the servo band in which first servo band identification information is to be recorded and the position (servo bands s2 and s3 in this example) of the servo band in which second servo band identification information is to be recorded. The controller 130 controls the drive unit 120 on the basis of the data stored in the memory.

The converter 121 individually outputs information corresponding to the servo band identification information to be recorded in the respective servo bands s0 to s4 to the signal generation unit 122 corresponding to the magnetic cores h0 to h4. In this embodiment, the converter 121 outputs a first pulse signal PS1 for recording the first servo pattern 601 (Part (A) of FIG. 10) including the first servo band identification information to the magnetic cores h0, h1, and h4 corresponding to the servo bands s0, s1, and s4, and outputs a second pulse signal PS2 for recording the second servo pattern 602 (Part (B) of FIG. 10) including the second servo band identification information to the head blocks h2 and h3 corresponding to the servo bands s2 and s3.

Figure 20:
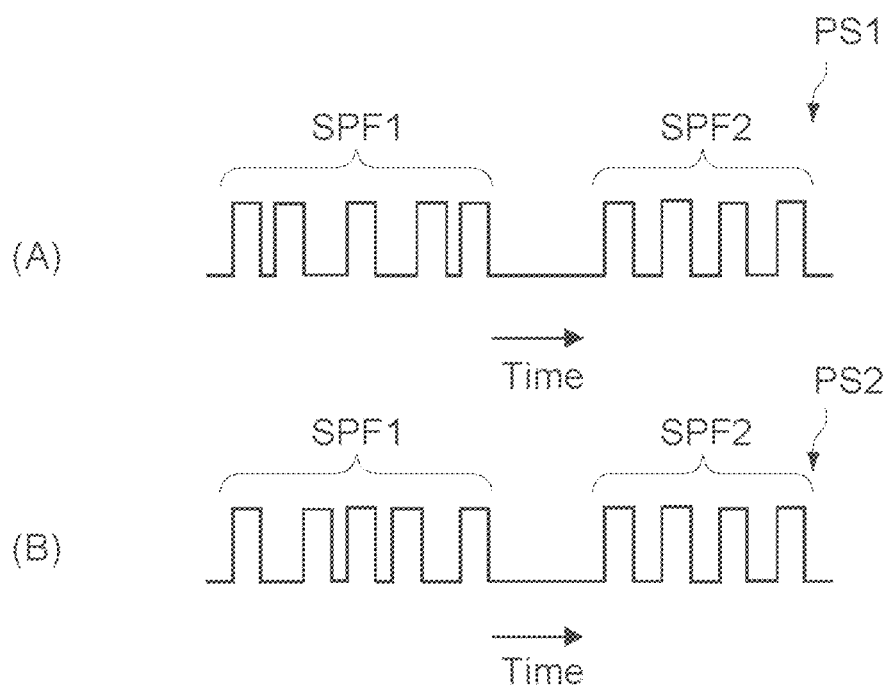
FIG. 20 is a schematic diagram showing a recording signal waveform of a first servo sub-frame in a first pulse signal (A) and a recording signal waveform of the first servo sub-frame in a second pulse signal (B).

Parts (A) and (B) of FIG. 20 schematically show recording signal waveforms of the first servo sub-frame SSF1 in the first pulse signal PS1 and the second pulse signal PS2, respectively. As shown in the figure, the first and second pulse signals PS1 and PS2 each include a first pulse group SPF1 including five pulse groups and a second pulse group SPF2 including four pulse groups. The first pulse group SPF1 is a signal for recording the respective inclined portions of the A burst 6a, and the second pulse group SPF2 is a signal for recording the respective inclined portions of the B burst 6b.

As shown in Parts (A) and (B) of FIG. 20, the second and fourth pulse rise times in the first pulse group SPF1 are different between the first pulse signal PS1 and the second pulse signal PS2. The second pulse rise time of the pulse signal PS2 is later than that of the pulse signal PS1, and the fourth pulse rise time of the pulse signal PS2 is earlier than that of the pulse signal PS1. As a result, the first servo sub-frames SSF1 in which some of the arrangement intervals of the inclined portions of the A bursts 6a are different from each other as shown in Parts (A) and (B) of FIG. 10 are formed.

Further, the first pulse signal PS1 and the second pulse signal PS2 are transmitted to the magnetic cores h0 to h4 at the same phase (same timing). As a result, in the respective magnetic cores h0 to h4, the first servo pattern 601 (first servo band identification information), and the second servo pattern 602 (second servo band identification information) are respectively recorded in the servo bands s0, s1, and s4 and the servo bands s2 and s3 in the same phase.

<Details of Present Technology>

The tape drive device 30 is configured to be capable of changing the tension to be applied during travelling of the magnetic tape 1 in order to adapt the change in the width dimension of the magnetic tape 1 as described above. Specifically, adjustments are made to increase the tension in the case where the width dimension of the magnetic tape 1 has changed in the direction of increasing and decrease the tension in the case where the width dimension of the magnetic tape 1 has changed in the direction of decreasing. By adjusting the magnitude of the tension in accordance with the change in the width dimension of the magnetic tape 1 in this way, it is possible to stably perform desired tracking control.

Then, fluctuations of the width dimension of the magnetic tape 1 occur uniformly with respect to the servo band pitch in each data band. Meanwhile, from the viewpoint of the tape travelling time in the tape drive device 30, it is advantageous to acquire a relationship between the servo band pitch of one data band of a plurality of data bands and the tension by one round trip of tape travelling, store it in the cartridge memory 9, and apply the acquired servo band pitch and tension as the reference to the remaining servo band pitches of other data bands similarly.

However, in the case where the difference between the servo band pitch used as the reference and the other remaining servo band pitches is large, the relationship between the tension and the servo band pitch acquired in advance differs for the other servo band pitches, and thus, it is difficult to ensure desired tracking control.

The cause of the difference in the servo band pitch of each data band is, first, the positional deviation of the magnetic gap g formed in each of the magnetic cores h0 to h4 of the servo write head 113. Although the magnetic gap g has relatively high dimensional accuracy because it is formed using a photolithography technology, dimensional errors on the order of submicron occur in some cases.

Figure 21:
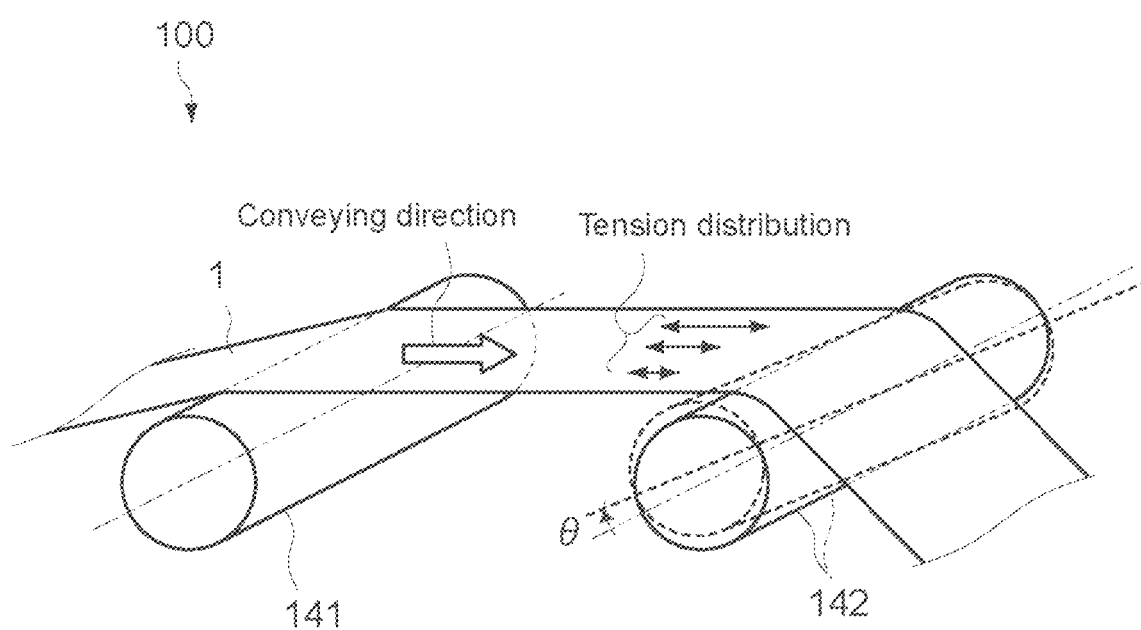
FIG. 21 is a perspective view schematically showing a pair of guide rollers that guide travelling of the magnetic tape in the servo pattern recording apparatus.

Further, another cause of the difference in the servo band pitch of each data band is a deviation in the parallelism of the guide roller that guides tape travelling during recording of a servo pattern. For example, FIG. 21 shows a pair of guide rollers 141 and 142 that guides travelling of the magnetic tape 1 in the servo pattern recording apparatus 100. Axial centers of the guide rollers 141 and 142 are arranged parallel to each other, so that uniform tension is applied to the magnetic tape 1 in the width direction. However, in the case where the axial center of the guide roller 142 is deviated in the up-and-down direction by an angle θ (misalignment angle) with respect to the axial center of the guide roller 141 as shown by a broken line in FIG. 21, tension distribution occurs in the width direction of the magnetic tape 1 in some cases even if the magnitude of the angle θ is 1 degree or less.

Figure 22:
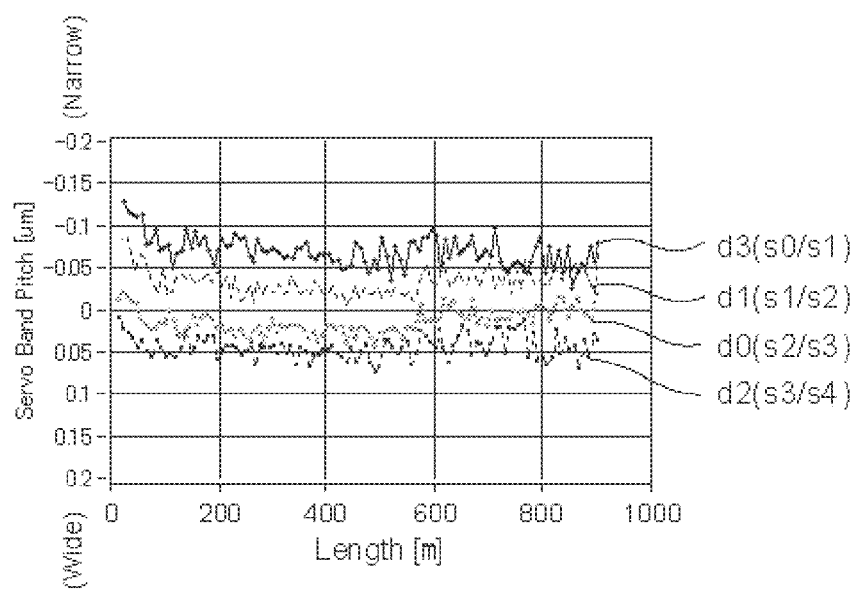
FIG. 22 is an experimental result showing servo band pitches of the respective data bands measured for the same magnetic tape in comparison with each other.

As an example, FIG. 22 shows the servo band pitches of the respective data bands measured for the same magnetic tape in comparison with each other. In the figure, the horizontal axis indicates the tape length and the vertical axis indicates the servo band pitch. Here, the servo band pitch indicated by the vertical axis is shown as a difference with the servo read head pitch P1 (2858.8 μm) as a reference value (Ref). The servo band pitch can be measured using the tape drive device 30 as described with reference to FIG. 12 and FIG. 13.

Note that in FIG. 22, do (s2/s3) means the interval between the two servo bands s2 and s3 adjacent to the data band do (the servo band pitch s2/s3) and d1 (s1/s2) means the interval between the two servo bands s1 and s2 adjacent to the data band d1 (the servo band pitch s1/s2).

Similarly, d2 (s3/s4) means the interval between the two servo bands s3 and s4 adjacent to the data band d2 (the servo band pitch s3/s4) and d3 (s0/s1) means the interval between the two servo bands s0 and s1 adjacent to the data band do (the servo band pitch s0/s1).

In the measurement example shown in FIG. 22, the servo band pitch spreads from the data band d3 to d2 and the maximum amount of change in the servo band pitch represented by the width (absolute value) of the maximum value—the minimum value in the same tape length was approximately 0.13 μm on average when the servo band pitch of the data band d3 (s0/s1) is the maximum value and the servo band pitch of the data band d2 (s3/s4) is the minimum value.

It is well known that the servo band pitch depends on the tape tension, and thus, there is a possibility that tension distribution of the magnetic tape in the width direction is related to variations in the servo band pitch in each data band. For example, assumption is made that the tension during recording of a servo pattern was lower near the data band d3 (the width is narrowed because tension is applied during reproduction) and higher near the data band d2 (the width is widened because tension loosens during reproduction) than the tension during reproduction due to the deviation in the parallelism of the guide rollers 141 and 142 shown in FIG. 21.

Non-uniformity of strain stress in the magnetic tape, a slight deviation in the parallelism of the guide roller located on the upstream side and the downstream side of the servo write head, and the like are presumably related to the tension distribution of the magnetic tape in the width direction. However, since it is difficult to directly measure or understand tension distribution in the magnetic tape, it is more favorable that variations in the servo band pitch can be reduced also by understanding and adjusting parameters that cause a change in the servo band pitch using a method other than tension.

When variations in the servo band pitch occur, the positioning accuracy of a recording/reproducing head for each data band decreases, making it difficult to achieve stable tracking control for each data band. In particular, in the magnetic tape 1 conforming to the LTO-8 standard in which the total number of recording tracks exceeds 6500, a track pitch Wd (see FIG. 4) is not only as small as 1.56 μm but also expected to be even narrower in the future. In this case, it is necessary to further improve the positioning accuracy of the recording/reproducing head with respect to the recording track. Specifically, considering the relationship between the track pitch Wd of each data band d and the width of the data read head 135 of the tape drive device 30, it is necessary to reduce the variations in the servo pattern pitch with an accuracy of ±100 nm (0.1 μm) in the track width direction in order to ensure the positioning margin of the data read head 135 with respect to the recording track.

[Details of Servo Pattern Recording Apparatus]

In order to solve such a problem, the servo pattern recording apparatus 100 according to this embodiment further includes a temperature adjustment unit 80 as shown in FIG. 14.

Application Example 1

The temperature adjustment unit 80 is configured to be capable of individually raising the temperatures of the magnetic cores h0 to h4 constituting the recording units 401 of the servo write head 113. In this embodiment, the temperature adjustment unit 80 is configured as part of the drive unit 120, and individually adjusts, on the basis of a command from the controller 130, the temperatures of the recording units 401 (magnetic cores h0 to h4) of the servo write head 113 within a predetermined temperature range. In this embodiment, the temperature adjustment unit 80 is configured to be capable of individually adjusting the temperatures of the recording units 401 such that the average value of the differences in the servo band pitch over the entire tape length is equal to or less than a predetermined value (e.g., 100 nm or less).

More specifically, for example, the temperature adjustment unit 80 includes a heating mechanism. The heating mechanism includes a power adjustment unit that is capable of individually adjusting electric power to be supplied to the coil 70 of each of the magnetic cores h0 to h4. The amplifier 123 (FIG. 19) that amplifies a pulse signal that is servo information to each coil 70 corresponds to this power adjustment unit.

The present inventors have focused on the recording current of the servo pattern 6 to be supplied to the coils 70 of the magnetic cores h0 to h4 of the servo write head 113 (electric power to be supplied to the coils 70) as a parameter for changing the servo band pitch, and then found that the servo band pitch changes by a little less than approximately 100 nm due to a change in the value of the recording current.

Figure 23:
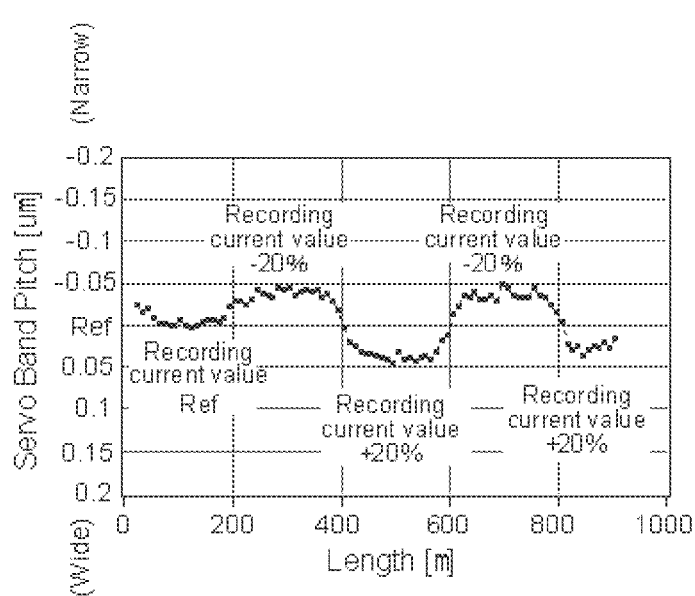
FIG. 23 is an experimental result showing a relationship between the magnitude of a recording current of the servo pattern and the servo band pitch.

FIG. 23 is an experimental result showing the relationship between the recording current value and the servo band pitch. Similarly to FIG. 22, the horizontal axis indicates the tape length and the vertical axis indicates the servo band pitch. As shown in the figure, the servo band pitch changes depending on the current value during recording of a servo pattern (the recording current value). Here, the servo band pitch was recorded by setting the recording current value to the reference value (Ref (1.8 A)) for the tape length of 0 to 200 m, setting the recording current value to a value 20% smaller than the reference value (−20%) for the tape length of 200 m to 400 m, setting the recording current value to a value 20% larger than the reference value (+20%) for the tape length of 400 m to 600 m, and alternately setting, after that, the recording current value to −20% and +20% for each 200 m.

As shown in FIG. 23, it was confirmed that the servo band pitch was narrowed by approximately 0.05 μm when the recording current value was 20% smaller than the reference value and the servo band pitch was widened by 0.05 μm when the recording current value was 20% larger than the reference value. The maximum amount of change in the servo band pitch, which is the difference between the maximum value and the minimum value, was approximately 100 nm.

The cause of the change in the servo band pitch includes thermal expansion of the head blocks 40 of the magnetic cores h0 to h4 constituting the servo write head 113 due to Joule heat of the coils 70. Due to thermal expansion of the head block 40, the arrangement interval of the magnetic gaps g between the head block 40 and another head block 40 adjacent thereto changes. Therefore, by adjusting the amount of thermal expansion of the head block 40, it is possible to adjust the arrangement interval between the adjacent magnetic gaps g, i.e., the servo band pitch, on the order of submicron.

In this embodiment, the magnetic cores h0 to h4 are formed of a ferrite material. In this case, when the linear expansion coefficient is $11.7\times10^{-6}$ [1/° C.], for example, it is calculated that a temperature change of 3° C. results in the dimensional change of 100 nm ($11.7\times10^{-6}\times3°$ C.×2.8588 mm). Note that when the reference value (Ref) of a recording current is 1.8 A, a temperature change of 7° C. or more was observed in the head block 40 of each of the magnetic cores h0 to h4. The difference from the result shown in FIG. 23 in which the maximum amount of change in the servo band pitch is approximately 100 nm is presumed to be due to the influence of cooling of the head block 40 due to contact with the travelling magnetic tape 1.

Figure 24:
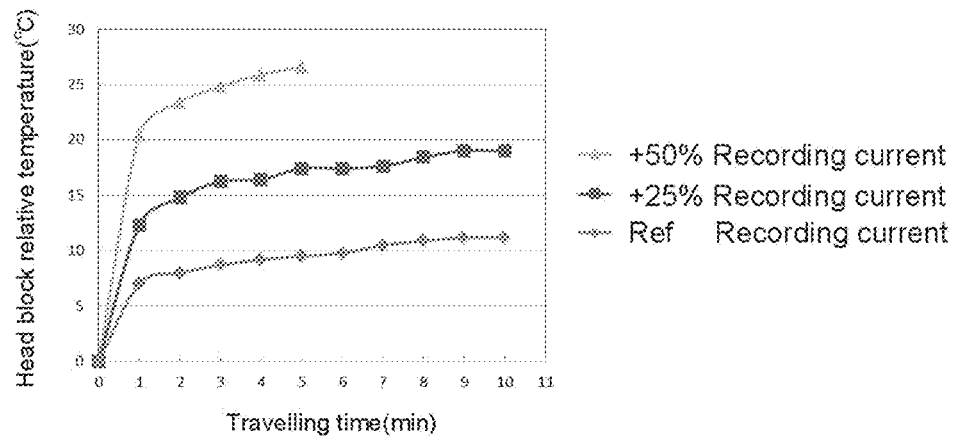
FIG. 24 is an experimental result showing a relationship between the magnitude of the recording current, the temperature change of the servo write head, and the travelling time of the magnetic tape.

From the result shown in FIG. 23, it can be seen that the servo band pitch changes depending on the magnitude of the recording current. The larger the recording current value, the larger the amount of change in the servo band pitch. For example, FIG. 24 shows an experimental result of the relationship between the magnitude of the recording current, the temperature change of the head block 40, and the travelling time of the magnetic tape. As shown in FIG. 24, for the same tape travelling time, as the recording current value increases, the amount of temperature rise in the head block increases. Further, the temperature of the head block tends to rise slightly as the tape travelling time increase.

From the above experimental results, it was confirmed that the recording current value was a parameter for a change in the servo band pitch. Subsequently, changes in the servo band pitch for the data bands d2 and d3 when the servo pattern 6 was recorded on the servo bands by changing the magnitude of the recording current between the pair of servo bands s0 and s1 and the pair of servo bands s3 and s4 were measured. The measurement results are shown in FIG. 25.

Figure 25:
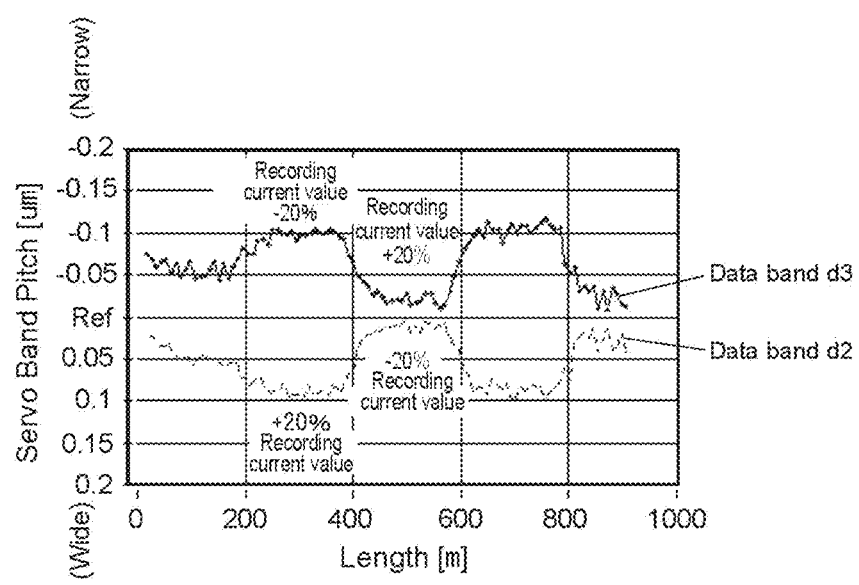
FIG. 25 is an experimental result showing a change in the servo band pitch when the recording current is alternately changed between the current value of −20% of a reference current and the current value of +20% of the recording current.

FIG. 25 shows changes in the servo band pitch for the data bands d2 and d3 when the recording current of the servo pattern 6 was alternately changed to a value smaller than the reference current value (−20%) and a value higher than the recording current value (+20%) in the tape length range of 200 m, similarly to the experiment in FIG. 23. The difference from the experiment in FIG. 23 is that the recording current value in the servo bands s3 and s4 is set to +20% of the reference current value when the recording current value in the servo bands s0 and s1 is −20% of the reference current value and the recording current value in the servo bands s3 and s4 is −20% of the reference current value when the recording current value in the servo bands s0 and s1 is +20% of the reference current value. Further, in the experiment, the magnetic tape from which the experimental result shown in FIG. 22 was obtained was used.

As a result, as shown in FIG. 25, there is a tape length region where the difference in the servo band pitch between the two data bands d2 and d3 is small. In the result shown in the figure, the servo band pitch between the data bands d2 and d3 can be minimized when the recording current value in the servo bands s0 and s1 is +20% of the reference current value and the recording current value in the servo bands s3 and s4 is −20% of the reference current value. This made it possible to make the difference in the servo band pitch between the data bands d2 and d3 smaller than that in the experimental result shown in FIG. 22, and the average value of the difference over the entire tape length was 100 nm or less.

Note that in this case, the recording current value in the data bands d1 and d4 other than the data bands d2 and d3 may be the reference current value. This allows the servo band pitch of the value shown in FIG. 22 to be obtained, and thus, it is possible to reduce the variations in the servo band pitch between the data bands d2 and d3. The present technology is not limited thereto, and the magnitude of the recording current may be optimized for the data bands d1 and d4 in order to further reduce the variations in the servo band pitch between the respective data bands. Optimizing the recording current includes making the recording current to be supplied to the coil 70 of at least one magnetic core of the magnetic cores h0 to h4 larger than the recording current to be supplied to the coil 70 of the other magnetic cores.

As described above, in accordance with the application example 1 of this embodiment, even in the case where tension distribution occurs such that the tension is lower on the side of the data band d3 than the side of the data band d2 when recording the servo pattern 6 as shown in FIG. 22, it is possible to reduce the variations in the servo band pitch between the data bands d3 and d2 by making the recording current value in the pair of servo bands s3 and s4 sandwiching the data band d2 larger than that in the pair of servo bands s0 and s1 sandwiching the data band d3 as shown in FIG. 25.

As a method of determining the recording current of the servo pattern 6 to be recorded in each servo band s, for example, the servo pattern 6 is recorded in each servo band s at a constant recording current value (e.g., the reference current value) over a predetermined tape length (e.g., 200 m or more), and then, the servo band pitch for each recorded data band is measured by the tape drive device 30. As a result, after checking variations in the servo pattern pitch for each data band as shown in FIG. 22, the recording current value to be supplied to the coil 70 is optimized for each of the magnetic cores h0 to h4 such that the servo band pitch between the data bands is minimized (e.g., 100 nm or less). The recording current value is set by adjusting the amplification factor of the amplifier 123 of the drive unit 120 in the servo pattern recording apparatus 100. After that, the servo pattern 6 is recorded in each servo band s of the magnetic tape 1 using the adjusted recording current value.

Application Example 2

The temperature adjustment unit 80 may include a cooling mechanism that is capable of individually cooling the magnetic cores h0 to h4 constituting the recording units 401 of the servo write head 113 instead of the above heating mechanism. As the cooling mechanism, an air blower unit 90 configured to be capable of individually cooling the coil 70 of each of the magnetic cores h0 to h4 or the head block 40 is provided.

Figure 26:
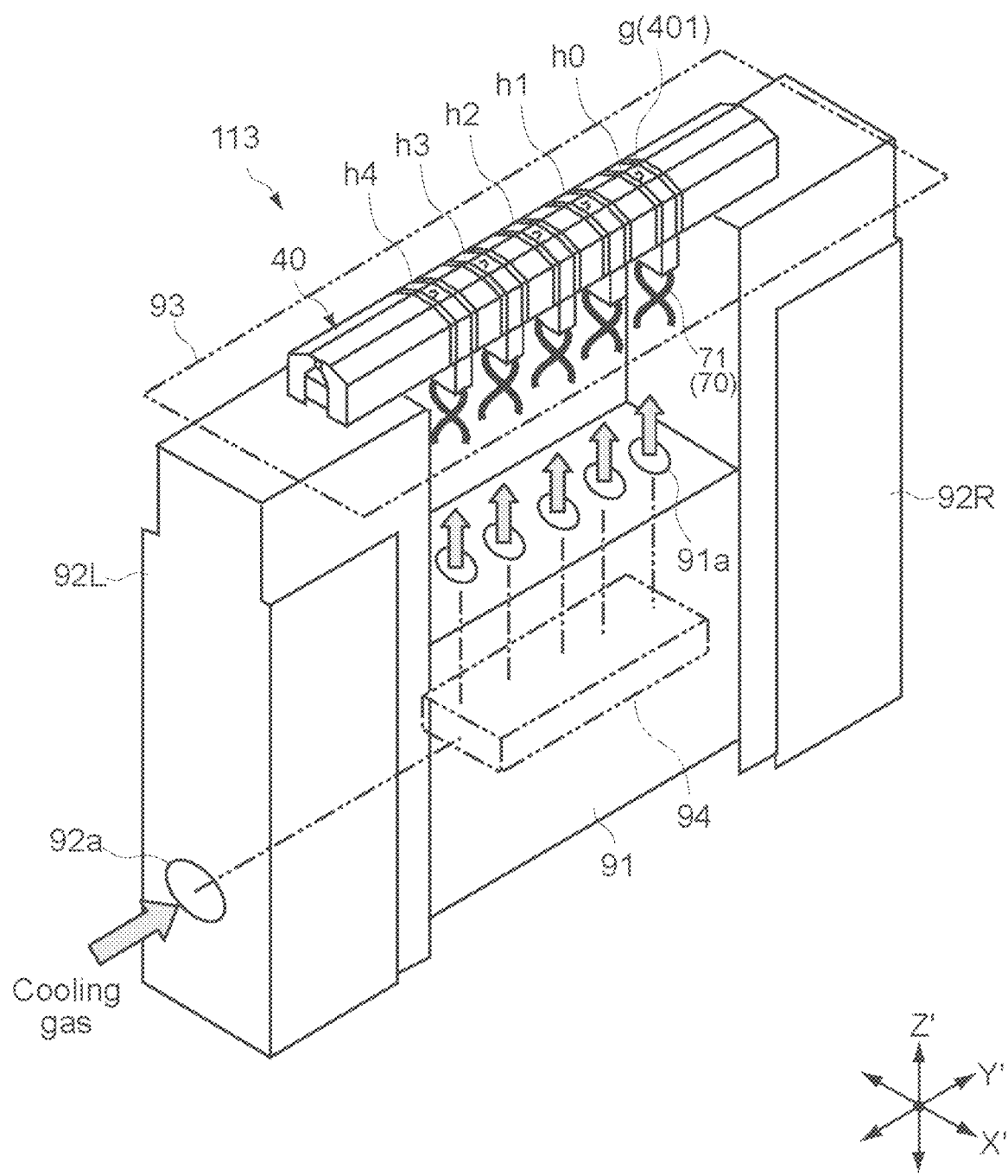
FIG. 26 is a schematic perspective view showing a configuration of a servo write head that includes an air blower unit.

FIG. 26 is a schematic perspective view showing a configuration of a servo write head 110 that includes the air blower unit 90.

The air blower unit 90 includes a blower block 91 disposed on the opposite side of the recording surface on which the magnetic gap g of the servo write head 110 is formed, and a pair of positioning blocks 92L and 92R that supports both ends of the servo write head 113 in the longitudinal direction (Y' direction) and position the blower block 91 relative to the servo write head 113.

A plurality of gas ejection ports 91a that faces the coil 70 of the respective magnetic cores h0 to h4 in the Z'-axis direction is provided in the blower block 91. One positioning block 92L of the pair of positioning blocks 92L and 92R is provided with a gas introduction port 92a that is capable of introducing cooling gas. The gas introduction port 92a communicates with the plurality of gas ejection ports 91a through the inside of the positioning block 92L and the inside of the blower block 92. As a result, the coil 70 of each of the magnetic cores h0 to h4 is cooled by cooling gas ejected from the gas ejection ports 92a, and thus, thermal expansion caused by the temperature rise of the head block 40 due to Joule heat of the coil 70 is suppressed.

The cooling gas is typically air, but a gas such as nitrogen may be used. The temperature of the cooling gas is typically room temperature, but a gas cooled below the room temperature may be used. Further, a nozzle having directivity in the gas ejection direction may be added to the gas ejection port 92a such that each gas ejection port 92a and each coil 70 correspond to each other. Further, in order to prevent the cooling gas ejected from the gas ejection port 92a from going around the head block 40 and being sprayed onto the magnetic tape 1 travelling on the recording surface 401 (see FIG. 26) of the servo write head 113, a shield plate 93 for wind protection may be disposed around the head block 40.

The air blower unit 90 may be configured to uniformly cool the coils 70 of the magnetic cores h0 to h4, but may be configured to be capable of individually adjusting the amount of gas to be ejected to each coil 70 such that each of the magnetic cores h0 to h4 has a temperature gradient. In this case, the air blower unit 90 further includes a valve mechanism 94 that is capable of individually adjusting the amount of cooling gas to be ejected from each gas ejection port 91a. The valve mechanism 94 is configured to be capable of dividing the cooling gas introduced from the gas introduction port 92a into individual streams to eject them from the gas ejection ports 92a and adjusting the amount of cooling gas to be ejected for each gas ejection port 91a. The adjustment of the amount of cooling gas to be ejected by the valve mechanism 94 is executed by the controller 130 of the servo pattern recording apparatus 100.

Figure 27:
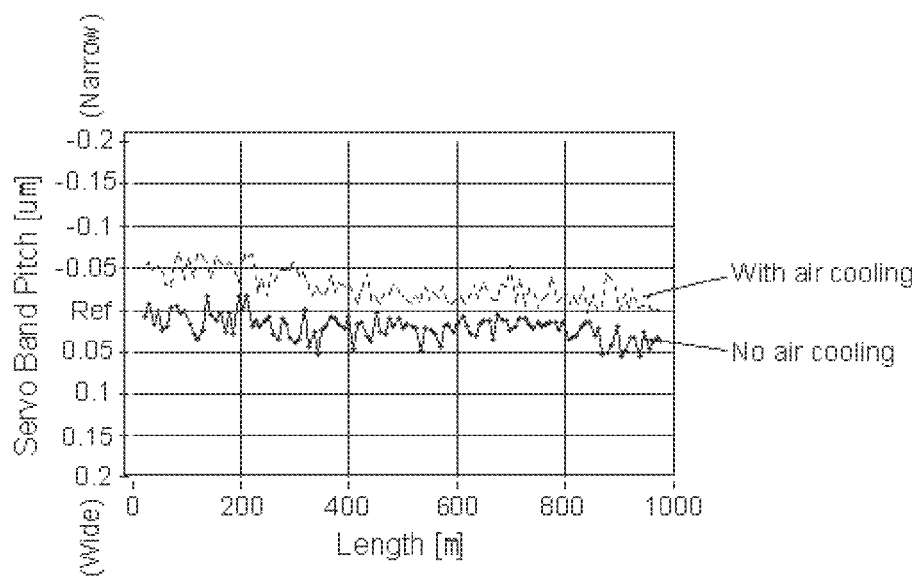
FIG. 27 is an experimental result showing how a servo pattern pitch changes due to whether or not cooling gas (air) is introduced.

FIG. 27 is an experimental result showing how a servo pattern pitch changes due to whether or not cooling gas (air) is introduced. The horizontal axis indicates the tape length, and the vertical axis indicates the amount of change in the servo band pitch from the reference value (P1: 2858.8 μm). Here, the servo band pitch between the two servo bands s3 and s4 adjacent to the data band d2 was measured.

As shown in FIG. 27, it was confirmed that the servo band pitch was narrowed by 0.05 μm (50 nm) in the case where cooling gas was introduced as compared with the case where cooling gas was not introduced. From this result, it is possible to reduce variations in the servo band pitch for each data band by adjusting the flow rate of cooling gas to be sprayed onto the coils 70 of the magnetic cores h0 to h4 that are heat sources to make the magnetic cores h0 to h4 have a temperature gradient. Adjusting the flow rate of cooling gas includes making the flow rate of cooling gas to be supplied to the coil 70 of at least one magnetic core of the magnetic cores h0 to h4 larger than the flow rate of cooling gas to be supplied to the coil 70 of the other magnetic cores.

Figure 28:
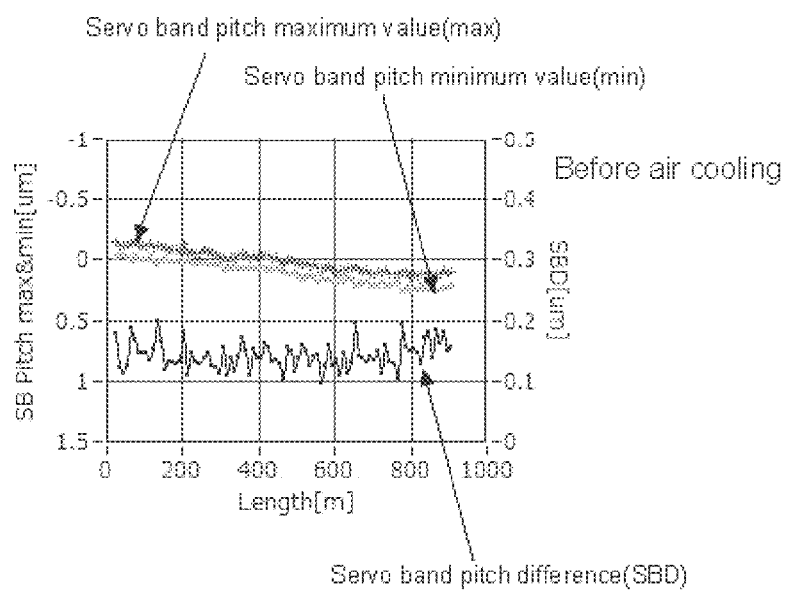
FIG. 28 is a diagram showing the maximum value (max) and the minimum value (min) of the servo band pitch that is an interval between two adjacent servo bands, and a difference (servo band pitch difference: SBD) between the maximum value and the minimum value, and is a result of an experiment conducted without cooling the servo write head.
Figure 29:
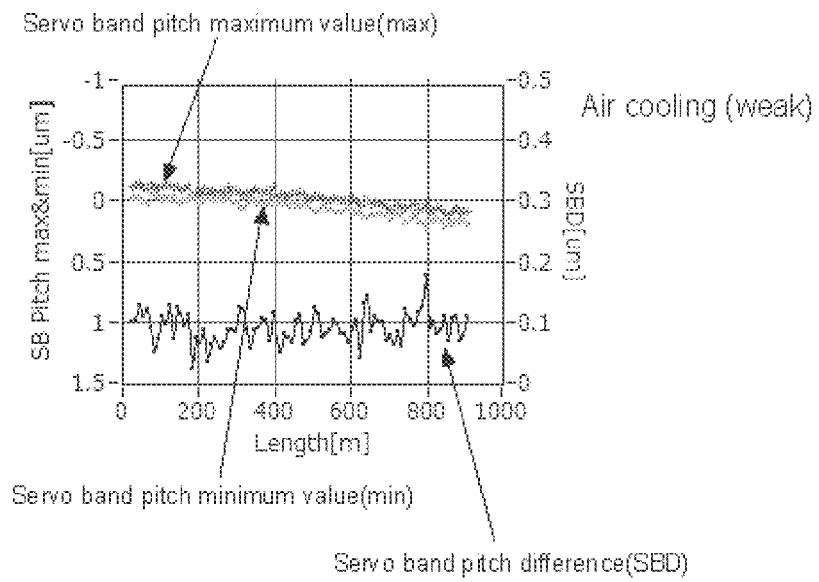
FIG. 29 is a diagram similar to FIG. 28, and is a result of an experiment conducted while cooling the servo write head.
Figure 30:
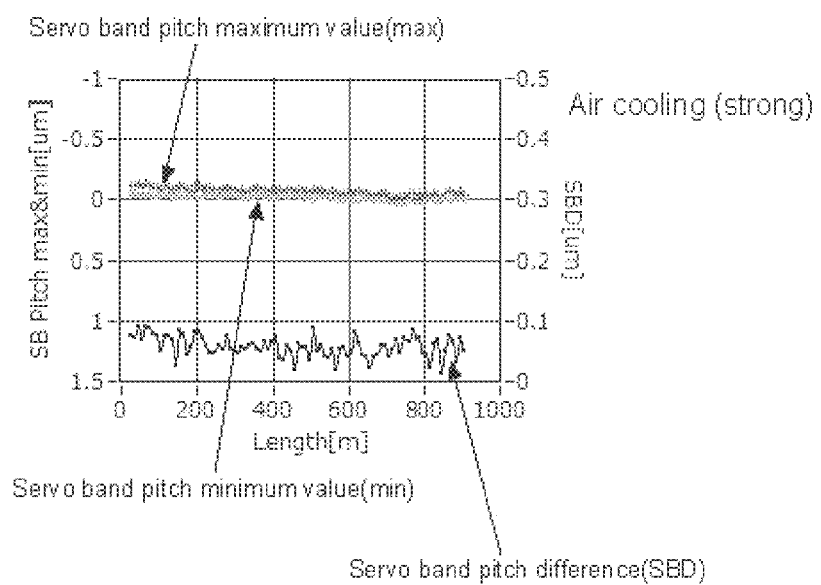
FIG. 30 is a diagram similar to FIG. 28, and is a result of another experiment conducted while cooling the servo write head.

FIG. 28 to FIG. 30 are each an experimental result showing the maximum value (max) and the minimum value (min) of the servo band pitch that is an interval between two adjacent servo bands, and a difference (servo band pitch difference: SBD) between the maximum value and the minimum value in the prepared magnetic tape 1 in which a constant recording current is supplied to the coil 70 of each of the magnetic cores h0 to h4 to record the servo pattern 6 in each servo band.

Here, FIG. 28 shows an experimental result when recording a servo pattern without cooling the servo write head 113 with cooling gas, and FIG. 29 shows an experimental result when recording a servo pattern while cooling the servo write head 113 with cooling gas at the flow rate of 3 L/min. Further, FIG. 30 shows an experimental result when recording a servo pattern while cooling the servo write head 113 with cooling gas at the flow rate of 10 L/min.

Note that in each figure, the horizontal axis indicates the tape length, and the vertical axis on the left side indicates the amount of change in the servo pattern pitch from the reference value (P1: 2858.8 μm) of the maximum value and the minimum value. Further, the vertical axis on the right side indicates the difference in the servo band pitch of the servo pattern pitch.

As a result of the experiment, the average value of the difference in the servo band pitch over the entire tape length when recording a servo pattern without cooling the servo write head 113 was 0.141 μm (FIG. 28). The cause of this difference in the servo band pitch includes the change in the distance between magnetic cores (magnetic gaps g) caused by linear expansion of the head block 40 due to Joule heat of the coil 70 generated when a recording current is caused to flow through the magnetic cores h0 to h4.

Meanwhile, the average value of the difference in the servo band pitch over the entire tape length when recording a servo pattern while cooling the servo write head 113 with cooling gas at the flow rate of 3 L/min was 0.090 μm (FIG. 29). Further, the average value of the difference in the servo band pitch over the entire tape length when recording a servo pattern while cooling the servo write head 113 with cooling gas at the flow rate of 10 L/min was 0.057 μm (FIG. 30).

By cooling the coils 70 of the magnetic cores h0 to h4 with cooling gas as described above, it is possible to suppress thermal expansion of the head block 40 due to Joule heat of the coil 70 and suppress the difference in the servo band pitch to 0.1 μm (100 nm) or less. Further, since the above effect becomes more pronounced as the flow rate of cooling gas increases, it is possible to optimize the flow rate of cooling gas by taking into account the difference in the servo band pitch before cooling.

Further, in accordance with this application example of this embodiment, it is also possible to improve the influence of tension distribution along the width direction of the magnetic tape during recording of a servo pattern. In this case, it is possible to adopt a method of suppressing the spread between the above servo bands during recording in the tape drive device 30 and reducing the difference in the servo band pitch by increasing the flow rate of cooling gas in the servo band region where tension is high to make the magnetic cores h0 to h4 have a temperature gradient.

In this case, as a method of determining the flow rate of cooling gas, for example, the servo pattern 6 is recorded in each servo band s over a predetermined tape length (e.g., 200 m or more) at a constant recording current value (e.g., the reference current value), and then, the servo band pitch for each recorded data band is measured by the tape drive device 30. As a result, after checking variations in the servo pattern pitch for each data band as shown in FIG. 22, the flow rate of cooling gas to be supplied to the coil 70 for each of the magnetic cores h0 to h4 such that the servo band pitch between the data bands is minimized (e.g., 100 nm or less). After that, the servo pattern 6 is recorded in each servo band s of the magnetic tape 1 while the amount of cooling gas ejected from each of the gas ejection ports 92a is adjusted by the valve mechanism 94 such that the set flow rate of cooling gas is achieved.

Figure 31:
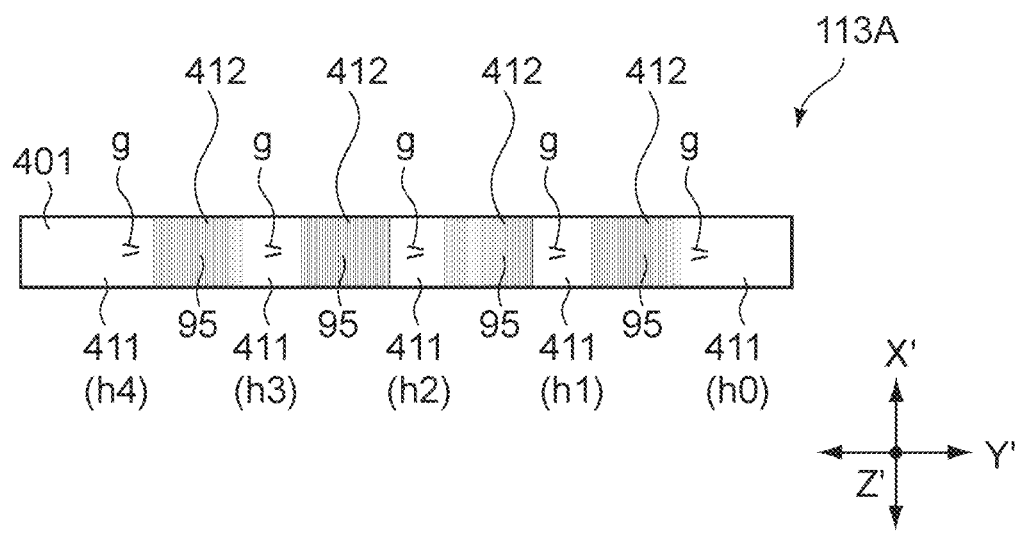
FIG. 31 is a schematic plan view of a servo write head that includes a plurality of groove portions.

In order to enhance the cooling effect of the servo write head 113 by the air blower unit 90, a plurality of groove portions may be provided in the recording surface 401 of the servo write head 113. FIG. 31 is a schematic plan view of a servo write head 113A that includes the above plurality of groove portions.

The servo write head 113A has the recording surface 401 for recording a servo pattern on the magnetic tape 1 by the magnetic gap g of each of the magnetic cores h0 to h4. The recording surface 401 has a first region 411 corresponding to the position where the magnetic gap g is provided in the length direction (Y' direction, the width direction of the magnetic tape 1) and a second region 412 corresponding to the position where the magnetic gap g is not provided in the above length direction. The second region 412 is provided with a plurality of groove portions 95 extending from one end in the width direction (X' direction, the length direction of the magnetic tape 1) perpendicular to the above length direction to the other end in the above width direction.

Figure 32:
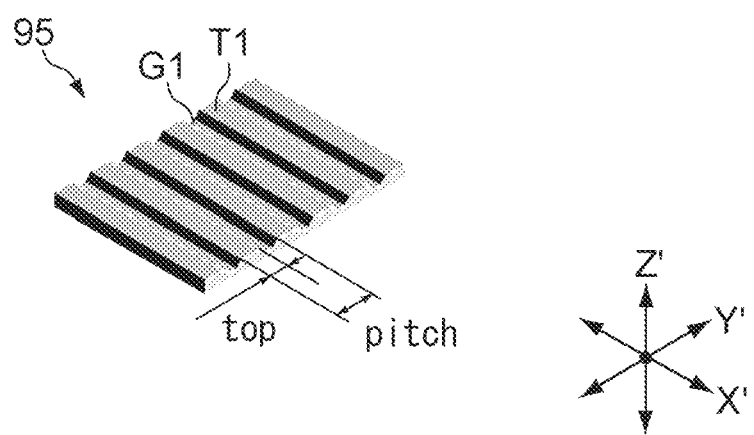
FIG. 32 is an enlarged perspective view showing details of the groove portions.

The second region 412 is located between the respective magnetic cores h0 to h4 having the first region 411, and the groove portion 95 is formed between the respective magnetic gaps g of the magnetic cores h0 to h4. FIG. 32 is an enlarged perspective view showing details of the groove portion 95.

In this embodiment, the plurality of groove portions 95 is arranged at intervals in the length direction (Y'-axis direction) of the recording surface 401 and linearly parallel to the width direction (X'-axis direction) of the recording surface 401. As shown in FIG. 32, the groove portion 95 is formed as square grooves G1 having a flat bottom portion. A flat apex T1 is formed between two square grooves G1 adjacent to each other. In this example, the depth of the square groove G1 is approximately 1 μm, the groove width of the bottom portion of the square groove G1 is approximately 5 μm, the width of the apex T1 (top) is approximately 5 μm, and the arrangement pitch of the square grooves G1 (pitch) is approximately 10 μm. Note that the size of each portion is not limited to the above example. For example, the groove width of the bottom portion of the square groove G1 and the arrangement pitch of the square grooves G1 can be appropriately set between 5 μm to 20 μm and 10 μm to 25 μm, respectively.

Since the plurality of groove portions 95 is provided in the second region 412, the servo write head 113A is capable of increasing the amount of air flowing through the second region 412 to cause the magnetic tape 1 to float from the second region 412 during travelling of the magnetic tape 1. As a result, the magnetic tape 1 can be caused to travel substantially without contact with the second region 412 while stably bringing the magnetic tape 1 into contact with the first region 411 having the magnetic gap g, and thus, it is possible to reduce the friction between the recording surface 401 and the magnetic tape 1 and improve the recording accuracy of the servo pattern 7.

Further, since the magnetic tape 1 can be caused to from the second region 412, the temperature rise in the servo write head 113A due to the heat of contact friction with the magnetic tape 1 can be suppressed. Further, since the cooling effect of the second region 412 is achieved by the air flowing between the plurality of groove portions 95, it is possible to achieve the heat dissipation effect of the first region 411 having the magnetic gap g. This makes it possible to reduce the variations in the servo band pitch.

Figure 33:
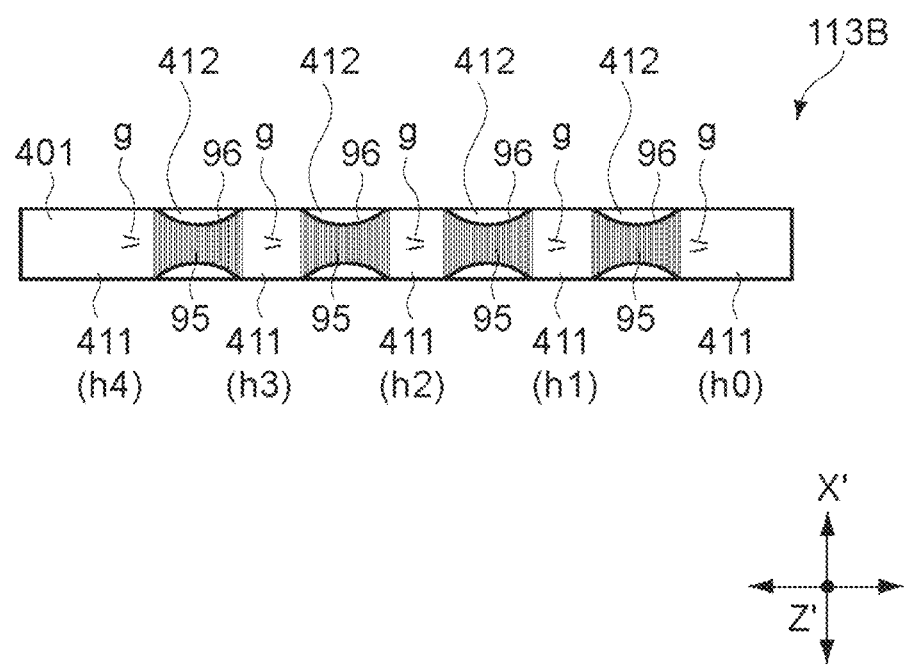
FIG. 33 is a schematic plan view showing a modified example of the configuration of the servo write head shown in FIG. 31.

FIG. 33 is a schematic plan view of a servo write head 113B showing a modified example of FIG. 31. This servo write head 113B is different from the servo write head 113A in FIG. 31 in that two notches 96 facing each other in the width direction (X'-axis direction) are provided in the second region 412.

Each of the notches 96 is formed by cutting out an end portion of the second region 412 in the width direction (X'-axis direction) in a circular arc shape. The shape of the notch 96 is not limited to the circular arc shape and may be a rectangular shape, a triangular shape, or the like. The plurality of groove portions 95 is formed in the surface of the second region 412 so as to be sandwiched between the notches 96 in the above width direction.

The dimension of the second region 412 in the above width direction is narrowed by the notches 96. In particular, since the notch 96 has a circular arc shape, the second region 412 is formed into a shape constricted at the center in the length direction (Y'-axis direction). This makes it easier for air to flow into the second region 412 from the notch 96 located on the upstream side in the tape travelling direction, which makes it easier for air to flow between the second region 412 and the magnetic tape 1. For this reason, the magnetic tape 1 easily floats from the second region 412, and it is possible to further enhance the cooling effect of the servo write head 113B.

[Details of Magnetic Tape]

Subsequently, details of the magnetic tape 1 will be described.

The magnetic tape 1 has a long tape shape and is caused to travel in the longitudinal direction during recording and reproduction. Note that the surface of the magnetic layer 43 is a surface on which a magnetic head included in a recording/reproduction apparatus (not shown) is caused to travel. The magnetic tape 1 is favorably used in a recording/reproduction apparatus including a ring-type head as a recording head. The magnetic tape 1 is favorably used in a recording/reproduction apparatus configured to be capable of recording data with a data track width of 1500 nm or less or 1000 nm or less.

(Base Material)

As shown in FIG. 2, the base material 41 is a non-magnetic support that supports the underlayer 42 and the magnetic layer 43. The base material 41 has a long film shape. The upper limit value of the average thickness of the base material 41 is favorably 4.2 μm or less, more favorably 4.0 μm or less, still more favorably 3.8 μm or less, and most favorably 3.4 μm or less. When the upper limit value of the average thickness of the base material 41 is 4.2 μm or less, it is possible to make the recording capacity of a single data cartridge larger than that of a general magnetic tape. The lower limit value of the average thickness of the base material 41 is favorably 3 μm or more, and more favorably 3.2 μm or more. When the lower limit value of the average thickness of the base material 41 is 3 μm or more, it is possible to suppress a decrease in the strength of the base material 41.

The average thickness of the base material 41 is obtained as follows. First, the magnetic tape 1 having a width of ½ inch is prepared and cut into a length of 250 mm to prepare a sample. Subsequently, the layers of the sample other than the base material 41 (i.e., the underlayer 42, the magnetic layer 43, and the back layer 44) are removed with a solvent such as MEK (methyl ethyl ketone) and dilute hydrochloric acid. Next, a Laser Hologage (LGH-110C) manufactured by Mitutoyo Corporation is used as a measuring apparatus to measure the thickness of the sample (base material 41) at five or more positions, and the measured values are simply averaged (arithmetically averaged) to calculate the average thickness of the base material 41. Note that the measurement positions are randomly selected from the sample.

The base material 41 favorably contains polyester. When the base material 41 contains polyester, the Young's modulus of the base material 41 in the longitudinal direction can be reduced. Therefore, it is possible to keep the width of the magnetic tape 1 constant or substantially constant by adjusting the tension of the magnetic tape 1 in the longitudinal direction during travelling by the recording/reproduction apparatus. The Young's modulus of the base material 41 in the longitudinal direction is, for example, 5 GPa or more and 10 GPa or less, favorably 2.5 GPa or more and 7.8 GPa or less, and more favorably 3.0 GPa or more and 7.0 GPa or less.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bisphenoxycarboxylate. In the case where the base material 41 contains two or more types of polyesters, the two or more types of polyesters may be mixed, may be copolymerized, or may be stacked. At least one of the terminal or the side chain of the polyester may be modified.

The fact that the base material 41 contains polyester can be confirmed, for example, as follows. First, the magnetic tape 1 is prepared and cut into a length of 250 mm to prepare a sample and then the layers of the sample other than the base material 41 are removed in a way similar to that in the measurement method of the average thickness of the base material 41. Next, the IR spectrum of the sample (base material 41) is acquired using the infrared absorption spectrometry (IR). On the basis of this IR spectrum, the fact that the base material 41 contains polyester can be confirmed.

The base material 41 may further contain, for example, at least one of polyamide, polyetheretherketone, polyimide, polyamideimide, or polyetheretherketone (PEEK) in addition to the polyester, or may further contain at least one of polyamide, polyimide, polyamideimide, polyolefins, a cellulose derivative, a vinyl resin, or another polymer resin. The polyamide may be aromatic polyamide (aramid). The polyimide may be aromatic polyimide. The polyamideimide may be aromatic polyamideimide.

In the case where the base material 41 contains a polymer resin other than polyester, the base material 41 favorably contains polyester as a main component. Here, the main component means the component with the highest content (mass ratio), of the polymer resins contained in the base material 41. In the case where the base material 41 contains a polymer resin other than polyester, the polyester and the polymer resin other than the polyester may be mixed or may be copolymerized.

The base material 41 may be biaxially stretched in the longitudinal direction and the width direction. The polymer resin contained in the base material 41 is favorably oriented in an oblique direction with respect to the width direction of the base material 41.

(Magnetic Layer)

The magnetic layer 43 is a recording layer for recording a signal with a magnetization pattern. The magnetic layer 43 may be a recording layer of a perpendicular recording type or may be a recording layer of a longitudinal recording type. The magnetic layer 43 contains, for example, a magnetic powder, a binder, and a lubricant. The magnetic layer 43 may further contain at least one additive of an antistatic agent, an abrasive, a curing agent, a rust inhibitor, a non-magnetic reinforcing particle, or the like, as necessary. The magnetic layer 43 does not necessarily need to include a coating film of a magnetic material and may include a sputtering film or a deposition film of a magnetic material.

An arithmetic average roughness Ra of the surface of the magnetic layer 43 is 2.0 nm or less, favorably 1.8 nm or less, and more favorably 1.6 nm or less. When the arithmetic average roughness Ra is 2.0 nm or less, since the output reduction due to spacing loss can be suppressed, excellent electromagnetic conversion characteristics can be achieved. The lower limit value of the arithmetic average roughness Ra of the surface of the magnetic layer 43 is favorably 1.0 nm or more, and more favorably 1.2 nm or more. When the lower limit value of the arithmetic average roughness Ra of the surface of the magnetic layer 43 is 1.0 nm or more, it is possible to suppress deterioration of the traveling property due to an increase in friction.

The arithmetic average roughness Ra can be obtained as follows. First, the surface of the magnetic layer 43 is observed by an atomic force microscope (AFM) to obtain an AFM image of 40 μm×40 μm. Nano Scope IIIa D3100 manufactured by Digital Instruments is used as the AFM, one formed of silicon single crystal is used as a cantilever (Note 1), and measurement is performed by turning at 200 to 400 Hz as the tapping frequency. Next, the AFM image is divided into 512×512 (=262, 144) measurement points, a height $Z(i)$ (i: measurement point numbers, i=1 to 262, 144) is measured at each measurement point, and the heights $Z(i)$ at the respective measurement points are simply averaged (arithmetically averaged) to obtain an average height (average surface) $Zave(=(Z(1)+Z(2)+ \ldots +Z(262, 144))/262, 144)$. Subsequently, a deviation $Z''(i)$ from an average center line at each measurement point $(=Z(i)-Zave)$ is obtained to calculate the arithmetic average roughness Ra [nm]$(=(Z''(1)+Z''(2)+ \ldots +Z''(262, 144))/262, 144)$. At this time, one that has been subjected to filtering by second-order Flatten and third-order planefit in XY as image processing is used as data.

(Note 1) SPM Probe NCH of a Normal Type, POINT-PROBE Manufactured by NanoWorld

L (cantilever length)=125 μm

The upper limit value of an average thickness $t_m$ of the magnetic layer 43 is 80 nm or less, favorably 70 nm or less, and more favorably 50 nm or less. When the upper limit value of the average thickness $t_m$ of the magnetic layer 43 is 80 nm or less, the influence of the demagnetizing field can be reduced in the case where a ring-type head is used as the recording head, and thus, more excellent electromagnetic conversion characteristics can be achieved.

The lower limit value of the average thickness $t_m$ of the magnetic layer 43 is favorably 35 nm or more. When the lower limit value of the average thickness $t_m$ of the magnetic layer 43 is 35 nm or more, the output can be ensured in the case where an MR-type head is used as the reproduction head, and thus, more excellent electromagnetic conversion characteristics can be achieved.

The average thickness $t_m$ of the magnetic layer 43 is obtained as follows. First, the magnetic tape 1 housed in the cartridge 10 is unwound, and the magnetic tape 1 is cut at three positions of 10 m, 30 m, and 50 m from one end thereof on the outermost periphery side to prepare three samples. Subsequently, each sample (the magnetic tape 1 to be measured) is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

The cross section described above of the obtained sliced sample is observed through a transmission electron microscope (TEM) under the following conditions to obtain a TEM image of each sliced sample. Note that the magnification and the acceleration voltage may be adjusted as appropriate in accordance with the type of apparatus.

Apparatus: TEM (H9000NAR manufactured by Hitachi, Ltd.)
Acceleration voltage: 300 kV
Magnification: 100,000 times Next, the thickness of the magnetic layer 43 is measured at at least ten or more positions of each sliced sample using the obtained TEM image of each sliced sample. Note that since the slicing is performed along the longitudinal direction of the magnetic tape 1 as described above, the 10 measurement positions of each sliced sample are randomly selected from the test piece such that they are different positions in the longitudinal direction of the magnetic tape 1. The average value obtained by simply averaging (arithmetically averaging) the obtained measured values of each sliced sample (thickness of the magnetic layer 43 at a total of 30 points) is used as the average thickness $t_m$ [nm] of the magnetic layer 43.

(Magnetic Powder)

The magnetic powder includes a plurality of magnetic particles. The magnetic particles are, for example, particles including hexagonal ferrite (hereinafter, referred to as "hexagonal ferrite particles"), particles including epsilon-iron oxide ($\varepsilon$-iron oxide) (hereinafter, referred to as "ε-iron oxide particles"), or particles including Co-containing spinel ferrite (hereinafter, referred to as "cobalt ferrite particles"). The magnetic powder is favorably crystal-oriented preferentially in the thickness direction of the magnetic tape 1 (perpendicular direction).

(Hexagonal Ferrite Particles)

Each of the hexagonal ferrite particles has a plate shape such as a hexagonal plate shape or a columnar shape such as a hexagonal columnar shape (where the thickness or height is smaller than the major axis of the plate surface or bottom surface). In this specification, the hexagonal plate shape includes a substantially hexagonal plate shape. The hexagonal ferrite contains favorably at least one of Ba, Sr, Pb, or Ca, and more favorably at least one of Ba or Sr. The hexagonal ferrite may specifically be barium ferrite or strontium ferrite, for example. The barium ferrite may further contain at least one of Sr, Pb, or Ca in addition to Ba. The strontium ferrite may further contain at least one of Ba, Pb, or Ca in addition to Sr.

More specifically, the hexagonal ferrite has an average composition represented by a general formula of $MFe_{12}O_{19}$. However, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the general formula described above, some Fes may be substituted by another metal element.

In the case where the magnetic powder includes a powder of the hexagonal ferrite particles, the average particle size of the magnetic powder is favorably 13 nm or more and 22 nm or less, more favorably 13 nm or more and 19 nm or less, still more favorably 13 nm or more and 18 nm or less, particularly favorably 14 nm or more and 17 nm or less, and most favorably 14 nm or more and 16 nm or less. When the average particle size of the magnetic powder is 22 nm or less, more excellent electromagnetic conversion characteristics (e.g., SNR) can be achieved in the magnetic tape 1 having high recording density. Meanwhile, when the average particle size of the magnetic powder is 13 nm or more, the dispersibility of the magnetic powder is further improved and further excellent electromagnetic conversion characteristics (e.g., SNR) can be achieved.

In the case where the magnetic powder includes a powder of the hexagonal ferrite particles, the average aspect ratio of the magnetic powder is favorably 1.0 or more and 3.0 or less, more favorably 1.5 or more and 2.8 or less, and still more favorably 1.8 or more and 2.7 or less. When the average aspect ratio of the magnetic powder is within a range of 1.0 or more and 3.0 or less, agglomeration of the magnetic powder can be suppressed. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes a powder of the hexagonal ferrite particles, the average particle size and the average aspect ratio of the magnetic powder are obtained as follows. First, the magnetic tape 1 to be measured is processed by an FIB method or the like to obtain a slice. In the case of using an FIB method, a carbon layer and a tungsten layer are formed as protective films as preprocessing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained sliced sample such that the entire magnetic layer 43 is included with respect to the thickness direction of the magnetic layer 43 at the acceleration voltage: 200 kV and the total magnification: 500,000 times to take a TEM photograph. The number of TEM photographs to be prepared is the number that 50 particles for which a plate diameter DB and a plate thickness DA (see FIG. 34) shown below can be measured can be extracted.

Figure 34:
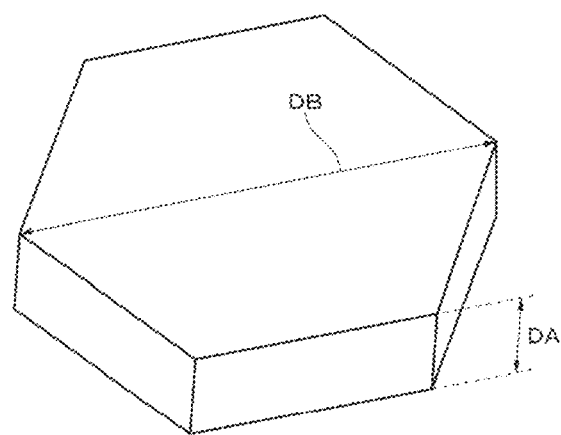
FIG. 34 is an explanatory diagram of the particle shape of hexagonal ferrite that is a magnetic powder.

In this specification, regarding the size of the hexagonal ferrite particles (hereinafter, referred to as a "particle size"), in the case where the shape of the particle observed in the TEM photograph described above is a plate shape or a columnar shape (where the thickness or height is smaller than the major axis of the plate surface or bottom surface) as shown in FIG. 34, the major axis of the plate surface or bottom surface is used as the value of the plate diameter DB. The thickness or height of the particle observed in the TEM photograph described above is used as the value of the plate thickness DA. In the case where the plate surface or bottom surface of the particle observed in the TEM photograph has a hexagonal shape, the major axis means the longest diagonal distance. In the case where the thickness or height of the particle is not constant in one particle, the maximum thickness or height of the particle is used as the plate thickness DA.

Next, 50 particles to be extracted from the taken TEM photograph are selected on the basis of the following criteria. Particles partially protruding outside the field of view of the TEM photograph are not measured, and particles with clear contours and present in isolation are measured. In the case where particles overlap, each of particles is measured as a single particle if the boundary between the particles is clear and the shape of the entire particle can be determined. However, particles whose boundaries are unclear and whose overall shape cannot be determined are not measured because the shape of the particle cannot be determined.

The plate thickness DA of each of the selected 50 particles is measured. The plate thicknesses DA obtained in this way are simply averaged (arithmetically averaged) to obtain an average plate thickness $DA_{ave}$. The average plate thickness $DA_{ave}$ is the average particle plate thickness. Subsequently, a plate diameter DB of each magnetic powder is measured. In order to measure the plate diameter DB of the particle, 50 particles whose plate diameter DB can be clearly observed are selected from the taken TEM photograph. The plate diameter DB of each of the selected 50 particles is measured. The plate diameters DB obtained in this way are simply averaged (arithmetically averaged) to obtain an average plate diameter $DB_{ave}$. The average plate diameter $DB_{ave}$ is the average particle size. Then, an average aspect ratio ($DB_{ave}/DA_{ave}$) Of the particles is obtained on the basis of the average plate thickness $DA_{ave}$ and the average plate diameter $DB_{ave}$.

In the case where the magnetic powder includes a powder of the hexagonal ferrite particles, the average particle volume of the magnetic powder is favorably 500 $nm^3$ or more and 2500 $nm^3$ or less, more favorably 500 $nm^3$ or more and 1600 $nm^3$ or less, still more favorably 500 $nm^3$ or more and 1500 $nm^3$ or less, particularly favorably 600 $nm^3$ or more and 1200 $nm^3$ or less, and most favorably 600 $nm^3$ or more and 1000 $nm^3$ or less. When the average particle volume of the magnetic powder is 2500 $nm^3$ or less, an effect similar to that in the case where the average particle size of the magnetic powder is 22 nm or less can be achieved. Meanwhile, when the average particle volume of the magnetic powder is 500 $nm^3$ or more, an effect similar to that in the case where the average particle size of the magnetic powder is 13 nm or more can be achieved.

The average particle volume of the magnetic powder is obtained as follows. First, as described above with respect to the method of calculating the average particle size of the magnetic powder, the average major-axis length $DA_{ave}$ and the average plate diameter $DB_{ave}$ are obtained. Next, an average volume V of the magnetic powder is obtained in accordance with the following formula.

$$V = \frac{3\sqrt{3}}{8} \times DA_{ave} \times DB_{ave} \times DB_{ave} \quad \text{[Math. 3]}$$

(ε-Iron Oxide Particles)

The ε-iron oxide particles are hard magnetic particles capable of achieving a high coercive force even as minute particles. The ε-iron oxide particles each have a spherical shape or a cubic shape. In this specification, the spherical shape includes a substantially spherical shape. Further, the cubic shape includes a substantially cubic shape. Since the ε-iron oxide particles have the shape as described above, it is possible to reduce the contact area of the particles in the thickness direction of the magnetic tape 1 and suppress agglomeration of the particles in the case where the ε-iron oxide particles are used as the magnetic particles, as compared with the case where barium ferrite particles having a hexagonal plate shape are used as the magnetic particles. Therefore, it is possible to enhance the dispersibility of the magnetic powder and achieve further excellent electromagnetic conversion characteristics (e.g., SNR).

Each of the ε-iron oxide particles has a core-shell structure. Specifically, the ε-iron oxide particle includes a core portion and a shell portion having a two-layer structure provided around the core portion. The shell portion having the two-layer structure may include a first shell portion provided on the core portion and a second shell portion provided on the first shell portion.

The core portion contains ε-iron oxide. The ε-iron oxide contained in the core portion is favorably one having $\varepsilon$—$Fe_2O_3$ crystals as the main phase, and more favorably one formed of single-phase $\varepsilon$—$Fe_2O_3$.

The first shell portion covers at least part of the periphery of the core portion. Specifically, the first shell portion may partially cover the periphery of the core portion or may entirely cover the periphery of the core portion. It is favorable that the first shell portion covers the entire surface of the core portion from the viewpoint of making the exchange coupling between the core portion and the first shell portion sufficient and improving the magnetic properties.

The first shell portion is a so-called soft magnetic layer and includes a soft magnetic material such as α-Fe, a Ni—Fe alloy, and an Fe—Si—Al alloy. The α-Fe may be obtained by reducing the ε-iron oxide contained in the core portion.

The second shell portion is an oxide film as an antioxidant layer. The second shell portion contains α-iron oxide, aluminum oxide, or silicon oxide. The α-iron oxide includes, for example, at least one iron oxide of $Fe_3O_4$, $Fe_2O_3$, or FeO. In the case where the first shell portion contains α-Fe (soft magnetic material), the α-iron oxide may be obtained by oxidizing α-Fe contained in the first shell portion.

Since the ε-iron oxide particle includes the first shell portion as described above, it is possible to adjust a coercive force Hc of the entire ε-iron oxide particles (core-shell particles) to the coercive force Hc suitable for recording while maintaining the coercive force Hc of the core portion alone at a large value for achieving thermal stability. Further, since the ε-iron oxide particle includes the second shell portion as described above, it is possible to suppress deterioration of the properties of the ε-iron oxide particles due to the ε-iron oxide particles being exposed to the air and the surfaces of the particles being rusted in the process of producing the magnetic tape 1 and before the process. Therefore, it is possible to suppress deterioration of the properties of the magnetic tape 1.

The ε-iron oxide particle may include a shell portion having a single-layer structure. In this case, the shell portion has a configuration similar to that of the first shell portion. However, from the viewpoint of suppressing deterioration of the properties of the ε-iron oxide particles, it is favorable that the ε-iron oxide particle includes the shell portion having a two-layer structure, as described above.

The ε-iron oxide particles may include an additive instead of the core-shell structure described above or may include an additive while having the core-shell structure. In this case, some Fes of the ε-iron oxide particles are substituted by the additive. Also with the ε-iron oxide particles including the additive, the coercive force Hc of the entire ε-iron oxide particles can be adjusted to the coercive force Hc suitable for recording, and thus, it is possible to improve the easiness of recording. The additive is a metal element other than iron, favorably a trivalent metal element, more favorably at least one of Al, Ga, or In, and sill more favorably at least one of Al or Ga.

Specifically, the ε-iron oxide including the additive is $\varepsilon$—$Fe_{2-x}M_xO_3$ crystals. The additive includes a metal element other than iron, more favorably at least one of Al (aluminum), Ga (gallium), In (indium), Co (cobalt), Mn (manganese), Zr (zirconium), Hf (hafnium), Cs (cesium) and Ti (titanium), Sm (samarium), Nd (neodymium), Pr (praseodymium), or Tb (terbium).

In the case where the magnetic powder includes the ε-iron oxide particles, the average particle size of the magnetic powder is favorably 10 nm or more and 20 nm or less, more favorably 10 nm or more and 18 nm or less, still more favorably 10 nm or more and 16 nm or less, particularly favorably 10 nm or more and 15 nm or less, and most favorably 10 nm or more and 14 nm or less. In the magnetic tape 1, a region having a size of ½ of the recording wavelength is an actual magnetized region. For this reason, by setting the average particle size of the magnetic powder to half or less of the shortest recording wavelength, it is possible to achieve more excellent electromagnetic conversion characteristics (e.g., SNR). Therefore, when the average particle size of the magnetic powder is 20 nm or less, it is possible to achieve more excellent electromagnetic conversion characteristics (e.g., SNR) in the magnetic tape 1 having high recording density (e.g., the magnetic tape 1 configured to be capable of recording a signal at the shortest recording wavelength of 40 nm or less). Meanwhile, when the average particle size of the magnetic powder is 10 nm or more, the dispersibility of the magnetic powder is further improved and it is possible to achieve more excellent electromagnetic conversion characteristics (e.g., SNR).

In the case where the magnetic powder includes the ε-iron oxide particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes a powder of the ε-iron oxide particles, the average particle size and the average aspect ratio of the magnetic powder are obtained as follows. First, the magnetic tape 1 to be measured is processed by an FIB (Focused Ion Beam) method or the like to obtain a slice. In the case of using an FIB method, a carbon layer and a tungsten layer are formed as protective layers as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained sliced sample such that the entire magnetic layer 43 is included with respect to the thickness direction of the magnetic layer 43 at the acceleration voltage: 200 kV and the total magnification: 500,000 times to take a TEM photograph. Next, 50 particles, which have the shape that can be clearly observed, are selected from the taken TEM photograph, and a major-axis length DL and a minor-axis length DS of each particle are measured. Here, the major-axis length DL means the maximum one (so-called maximum Feret diameter) of distances between two parallel lines drawn at any angle so as to be in contact with the outline of each particle. Meanwhile, the minor-axis length DS means the maximum one of particle lengths in a direction orthogonal to a long axis (DL) of the particle. Subsequently, the measured major-axis lengths DL of the 50 particles are simply averaged (arithmetically averaged) to obtain an average major-axis length $DL_{ave}$. The average major-axis length $DL_{ave}$ obtained in this way is used as the average particle size of the magnetic powder. Further, the measured minor-axis lengths DS of the 50 particles are simply averaged (arithmetically averaged) to obtain an average minor-axis length $DS_{ave}$. Then, an average aspect ratio ($DL_{ave}/DS_{ave}$) of the particles is obtained on the basis of the average major-axis length $DL_{ave}$ and the average minor-axis length $DS_{ave}$.

In the case where the magnetic powder includes the ε-iron oxide particles, the average particle volume of the magnetic powder is favorably 500 nm$^3$ or more and 4000 nm$^3$ or less, more favorably 500 nm$^3$ or more and 3000 nm$^3$ or less, still more favorably 500 nm$^3$ or more and 2000 nm$^3$ or less, particularly favorably 600 nm$^3$ or more and 1600 nm$^3$ or less, and most favorably 600 nm$^3$ or more and 1300 nm$^3$ or less. Since noise of the magnetic tape 1 is generally inversely proportional to the square root of the number of particles (i.e., proportional to the square root of the particle volume), it is possible to achieve more excellent electromagnetic conversion characteristics (e.g., SNR) by making the particle volume smaller. Therefore, when the average particle volume of the magnetic powder is 4000 nm$^3$ or less, it is possible to achieve more excellent electromagnetic conversion characteristics (e.g., SNR) as in the case where the average particle size of the magnetic powder is 20 nm or less. Meanwhile, when the average particle volume of the magnetic powder is 500 nm$^3$ or more, an effect similar to that in the case where the average particle size of the magnetic powder is 10 nm or more can be achieved.

In the case where the ε-iron oxide particles each have a spherical shape, the average particle volume of the magnetic powder is obtained as follows. First, the average major-axis length $DL_{ave}$ is obtained in a way similar to the method of calculating the average particle size of the magnetic powder described above. Next, the average volume V of the magnetic powder is obtained in accordance with the following formula.

$$V = (\pi/6) \times DL_{ave}^3$$

In the case where the ε-iron oxide particles each have a cubic shape, the average volume of the magnetic powder can be obtained as follows. The magnetic tape 1 is processed by an FIB (Focused Ion Beam) method or the like to obtain a slice. In the case of using an FIB method, a carbon film and a tungsten thin film are formed as protective films as pre-processing for observing a TEM image of a cross section described below. The carbon film is formed on each of the surfaces of the magnetic tape 1 on the side of the magnetic layer 43 and on the side of the back layer 44 by a vapor deposition method and the tungsten thin film is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section of the obtained sliced sample such that the entire magnetic layer 43 is included with respect to the thickness direction of the magnetic layer 43 at the acceleration voltage: 200 kV and the total magnification: 500,000 times to take a TEM photograph. Note that the magnification and the acceleration voltage may be adjusted as appropriate in accordance with the type of apparatus. Next, 50 particles, which have a clear shape, are selected from the taken TEM photograph, and a length DC of a side of each particle is measured. Subsequently, the measured lengths DC of the 50 particles are simply averaged (arithmetically averaged) to obtain an average side length $DC_{ave}$. Next, an average volume $V_{ave}$ (particle volume) of the magnetic powder is obtained on the basis of the following formula by using the average side length $DC_{ave}$.

$$V_{ave} = DC_{ave}^3$$

(Cobalt Ferrite Particles)

It is favorable that the cobalt ferrite particles each have uniaxial crystal anisotropy. Since the cobalt ferrite particle has uniaxial crystal anisotropy, it is possible to make the magnetic powder preferentially crystal-oriented in the thickness direction (perpendicular direction) of the magnetic tape 1. The cobalt ferrite particle has, for example, a cubic shape. In this specification, the cubic shape includes a substantially cubic shape. The Co-containing spinel ferrite may further contain at least one of Ni, Mn, Al, Cu, or Zn in addition to Co.

The Co-containing spinel ferrite has an average composition represented by the following formula, for example.

$Co_xM_yFe_2O_2$ (where M is, for example, at least one metal of Ni, Mn, Al, Cu, or Zn, x is a value in a range of $0.4 \leq x \leq 1.0$. y is a value in a range of $0 \leq y \leq 0.3$. However, x and y satisfy the relationship of $(x+y) \leq 1.0$. z is a value in a range of $3 \leq z \leq 4$. Some Fes may be substituted by another metal element.)

In the case where the magnetic powder includes a powder of the cobalt ferrite particles, the average particle size of the magnetic powder is favorably 8 nm or more and 16 nm or less, more favorably 8 nm or more and 13 nm or less, and still more favorably 8 nm or more and 10 nm or less. When the average particle size of the magnetic powder is 16 nm or less, it is possible to achieve more excellent electromagnetic conversion characteristics (e.g., SNR) in the magnetic tape 1 having high recording density. Meanwhile, when the average particle size of the magnetic powder is 8 nm or more, the dispersibility of the magnetic powder is further improved, and it is possible to achieve more excellent electromagnetic conversion characteristics (e.g., SNR). The method of calculating the average particle size of the magnetic powder is similar to the method of calculating the average particle size of the magnetic powder in the case where the magnetic powder includes a powder of the ¿-iron oxide particles.

In the case where the magnetic powder includes a powder of the cobalt ferrite particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder. The method of calculating the average aspect ratio of the magnetic powder is similar to the method of calculating the average aspect ratio of the magnetic powder in the case where the magnetic powder includes a powder of the ε-iron oxide particles.

In the case where the magnetic powder includes a powder of the cobalt ferrite particles, the average particle volume of the magnetic powder is favorably 500 $nm^3$ or more and 4000 $nm^3$ or less, more favorably 600 $nm^3$ or more and 2000 $nm^3$ or less, and still more favorably 600 $nm^3$ or more and 1000 $nm^3$ or less. When the average particle volume of the magnetic powder is 4000 $nm^3$ or less, an effect similar that in the case where the average particle size of the magnetic powder is 16 nm or less can be achieved. Meanwhile, when the average particle volume of the magnetic powder is 500 $nm^3$ or more, an effect similar to that in the case where the average particle size of the magnetic powder is 8 nm or more can be achieved. The method of calculating the average particle volume of the magnetic powder is similar to the method of calculating the average particle volume in the case where the ε-iron oxide particle has a cubic shape.

(Binder)

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenolic resin, an epoxy resin, a polyurethane curable resin, a urea resin, a melamine resin, an alkyd resin, a silicone resin, a polyamine resin, and a urea-formaldehyde resin.

For the purpose of improving the dispersibility of the magnetic powder, —$SO_3M$, —$OSO_3M$, —COOM, P=O $(OM)_2$ (where M represents a hydrogen atom or an alkali metal such as lithium, potassium, and sodium), a side chain amine having a terminal group represented by —NR1R2, —$NR1R2R3^+X^-$, a main chain amine represented by >$NR1R2^+X^-$ (where R1, R2, and R3 each represent a hydrogen atom or a hydrocarbon group, and $X^-$ represents a halogen element ion such as fluorine, chlorine, bromine, and iodine, an inorganic ion, or an organic ion), and a polar functional group such as —OH, —SH, —CN, and an epoxy group may be introduced into all the binders described above. The amount of the polar functional groups introduced into the binders is favorably $10^{-1}$ to $10^{-8}$ mol/g, and more favorably $10^{-2}$ to $10^{-6}$ mol/g.

(Lubricant)

The lubricant contains, for example, at least one of a fatty acid or a fatty acid ester, and favorably both a fatty acid and a fatty acid ester. Containing a lubricant in the magnetic layer 43, particularly, containing both a fatty acid and a fatty acid ester in the magnetic layer 43, contributes to improving the travelling stability of the magnetic tape 1. More particularly, when the magnetic layer 43 contains a lubricant and has a pore, favorable travelling stability can be achieved. It is conceivable that the improvement in the travelling stability can be achieved because the dynamic friction coefficient of the surface of the magnetic tape 1 on the side of the magnetic layer 43 is adjusted to the value suitable for travelling of the magnetic tape 1 by the lubricant described above.

The fatty acid may favorably be a compound represented by the following general formula (1) or (2). For example, one of the compound represented by the following general formula (1) and the compound represented by the general formula (2) may be contained as a fatty acid, or both of them may be contained.

Further, the fatty acid ester may favorably be a compound represented by the following general formula (3) or (4). For example, one of the compound represented by the following general formula (3) and the compound represented by the general formula (4) may be contained as the fatty acid ester, or both of them may be contained.

When the lubricant contains one or both of the compound represented by the general formula (1) and the compound represented by the general formula (2) and one or both of the compound represented by the general formula (3) and the compound represented by the general formula (4), it is possible to suppress an increase in dynamic friction coefficient due to repeated recording or reproduction of the magnetic tape 1.

$$CH_3(CH_2)_k COOH \qquad (1)$$

(However, in the general formula (1), k is an integer selected from a range of 14 or more and 22 or less, and more favorably a range of 14 or more and 18 or less.)

$$CH_3(CH_2)_nCH\!=\!CH(CH_2)_mCOOH \tag{2}$$

(However, in the general formula (2), the sum of n and m is an integer selected from a range of 12 or more and 20 or less, and more favorably a range of 14 or more and 18 or less.)

$$CH_3(CH_2)_pCOO(CH_2)_qCH_3 \tag{3}$$

(However, in the general formula (3), p is an integer selected from a range of 14 or more and 22 or less, and more favorably a range of 14 or more and 18 or less, and q is an integer selected from a range of 2 or more and 5 or less, and more favorably a range of 2 or more and 4 or less.)

$$CH_3(CH_2)_rCOO\!-\!(CH_2)_sCH(CH_3)_2 \tag{4}$$

(However, in the general formula (4), r is an integer selected from a range of 14 or more and 22 or less, and s is an integer selected from a range of 1 or more and 3 or less.)

(Antistatic Agent)

Examples of the antistatic agent include carbon black, natural surfactant, nonionic surfactant, and cationic surfactant.

(Abrasive)

Examples of the abrasive include α-alumina, β-alumina, and γ-alumina having an α-transformation rate of 90% or more, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating a raw material of magnetic iron oxide and performing annealing treatment thereon, and those obtained by performing surface treatment on them with aluminum and/or silica as necessary.

(Curing Agent)

Examples of the curing agent include a polyisocyanate. Examples of the polyisocyanate include an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound. The weight average molecular weight of the polyisocyanates is desirably in a range of 100 to 3000.

(Rust Inhibitor)

Examples of the rust inhibitor include phenols, naphthols, quinones, a heterocyclic compound containing a nitrogen atom, a heterocyclic compound containing an oxygen atom, and a heterocyclic compound containing a sulfur atom.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, and titanium oxide (rutile or anatase titanium oxide).

(Underlayer)

The underlayer 42 is for reducing the recesses and projections on the surface of the base material 41 and adjusting the recesses and projections on the surface of the magnetic layer 43. The underlayer 42 is a non-magnetic layer containing a non-magnetic powder, a binder, and a lubricant. The underlayer 42 supplies the lubricant to the surface of the magnetic layer 43. The underlayer 42 may further contain at least one additive of an antistatic agent, a curing agent, a rust inhibitor, or the like as necessary.

An average thickness $t_2$ of the underlayer 42 is favorably 0.3 μm or more and 1.2 μm or less, more favorably 0.3 μm or more and 0.9 μm or less, and 0.3 μm or more and 0.6 μm or less. Note that the average thickness $t_2$ of the underlayer 42 is obtained in a way similar to that for the average thickness $t_1$ of the magnetic layer 43. However, the magnification of the TEM image is adjusted as appropriate in accordance with the thickness of the underlayer 42. When the average thickness $t_2$ of the underlayer 42 is 1.2 μm or less, the stretchability of the magnetic tape 1 due to external force further increases, and thus, adjustment of the width of the magnetic tape 1 by tension adjustment becomes easier.

(Non-Magnetic Powder)

The non-magnetic powder includes, for example, at least one of an inorganic particle powder or an organic particle powder. Further, the non-magnetic powder may include a carbon powder such as carbon black. Note that one type of non-magnetic powder may be used alone or two or more types of non-magnetic powder may be used in combination. The inorganic particles contain, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

(Binder and Lubricant)

The binder and the lubricant are similar to those of the magnetic layer 43 described above.

(Additive)

The antistatic agent, the curing agent, and the rust inhibitor are similar to those of the magnetic layer 43 described above.

(Back Layer)

The back layer 44 contains a binder and a non-magnetic powder. The back layer 44 may further contain at least one additive of a lubricant, a curing agent, an antistatic agent, or the like as necessary. The binder and the non-magnetic powder are similar to those of the underlayer 42 described above.

The average particle size of the non-magnetic powder is favorably 10 nm or more and 150 nm or less, and more favorably 15 nm or more and 110 nm or less. The average particle size of the non-magnetic powder is obtained in a way similar to that for the average particle size of the magnetic powder described above. The non-magnetic powder may include a non-magnetic powder having two or more granularity distributions.

The upper limit value of the average thickness of the back layer 44 is favorably 0.6 μm or less. When the upper limit value of the average thickness of the back layer 44 is 0.6 μm or less, the underlayer 42 and the base material 41 can be kept thick even in the case where the average thickness of the magnetic tape 1 is 5.6 μm or less, and thus, it is possible to maintain the travelling stability of the magnetic tape 1 in the recording/reproduction apparatus. The lower limit value of the average thickness of the back layer 44 is not particularly limited, but is, for example, 0.2 μm or more.

An average thickness $t_b$ of the back layer 44 is obtained as follows. First, an average thickness $t_T$ of the magnetic tape 1 is measured. The measurement method of the average thickness $t_T$ is as described in the following "Average thickness of magnetic tape". Subsequently, the back layer 44 of the sample is removed with a solvent such as MEK (methyl ethyl ketone) and dilute hydrochloric acid. Next, a Laser Hologage (LGH-110C) manufactured by Mitutoyo Corporation is used to measure the thickness of the sample at five or more positions, and the measured values are simply averaged (arithmetically averaged) to calculate an average value $t_B$ [μm]. After that, the average thickness $t_b$ [μm] of the back layer 44 is obtained in accordance with the following formula. Note that the measurement positions are randomly selected from the sample.

$$t_b[\mu m] = t_T[\mu m] - t_B[\mu m]$$

The back layer 44 has a surface provided with numerous protruding portions. The numerous protruding portions are for forming numerous hole portions in the surface of the magnetic layer 43 under a state in which the magnetic tape 1 has been wound in a roll shape. The numerous hole portions are formed by numerous non-magnetic particles protruding from the surface of the back layer 44, for example.

(Average Thickness of Magnetic Tape)

The upper limit value of the average thickness (average total thickness) $t_T$ of the magnetic tape 1 is 5.6 μm or less, favorably 5.0 μm or less, more favorably 4.6 μm or less, and still more favorably 4.4 μm or less. When the average thickness $t_T$ of the magnetic tape 1 is 5.6 μm or less, it is possible to make the recording capacity of a single data cartridge larger than that of a general magnetic tape. The lower limit value of the average thickness $t_T$ of the magnetic tape 1 is not particularly limited, but is, for example, 3.5 μm or more.

The average thickness $t_T$ of the magnetic tape 1 is obtained as follows. First, the magnetic tape 1 having a width of ½ inch is prepared and cut into a length of 250 mm to prepare a sample. Next, a Laser Hologage (LGH-110C) manufactured by Mitutoyo Corporation is used as a measuring apparatus to measure the thickness of the sample at five or more positions, and the measured values are simply averaged (arithmetically averaged) to calculate an average value $t_T$ [μm]. Note that the measurement positions are randomly selected from the sample.

(Coercive Force Hc)

The upper limit value of a coercive force Hc2 of the magnetic layer 43 in the longitudinal direction of the magnetic tape 1 is favorably 2000 Oe or less, more favorably 1900 Oe or less, and still more favorably 1800 Oe or less. When the coercive force Hc2 of the magnetic layer 43 in the longitudinal direction is 2000 Oe or less, sufficient electromagnetic conversion characteristics can be provided even with high recording density.

The lower limit value of the coercive force Hc2 of the magnetic layer 43 measured in the longitudinal direction of the magnetic tape 1 is favorably 1000 Oe or more. When the coercive force Hc2 of the magnetic layer 43 measured in the longitudinal direction is 1000 Oe or more, it is possible to suppress demagnetization due to leakage flux from the recording head.

The coercive force Hc2 described above is obtained as follows. First, the magnetic tape 1 housed in the cartridge is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, a vibrating sample magnetometer (VSM) is used to measure the M-H loop of the measurement sample (the entire magnetic tape 1) corresponding to the longitudinal direction (travelling direction) of the magnetic tape 1. Next, acetone, ethanol, or the like is used to wipe off the coating film (the underlayer 42, the magnetic layer 43, the back layer 44, and the like) of the magnetic tape 1 cut as described above, leaving only the base material 41. Then, three obtained base materials 41 are superimposed with double sided tape, and then punched out with a punch of φ6.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 1) is measured using the VSM.

In the measurement of the M-H loop of the measurement sample (the entire magnetic tape 1) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 41) are obtained, the M-H loop of the correction sample (base material 41) is subtracted from the M-H loop of the measurement sample (the entire magnetic tape 1) to perform background correction, thereby obtaining the M-H loop after background correction. A measurement/analysis program attached to the "VSM-P7-15" is used for this calculation of background correction. The coercive force Hc2 is obtained on the basis of the obtained M-H loop after background correction. Note that the measurement/analysis program attached to the "VSM-P7-15" is used for this calculation. Note that the measurement of the M-H loop described above is performed at 25° C.±2° C. and 50% RH±5% RH. Further, the "demagnetizing field correction" in measuring the M-H loop in the longitudinal direction of the magnetic tape 1 is not performed.

(Squareness Ratio)

A squareness ratio S1 of the magnetic layer 43 in the perpendicular direction (thickness direction) of the magnetic tape 1 is favorably 65% or more, more favorably 70% or more, still more favorably 75% or more, particularly favorably 80% or more, and most favorably 85% or more. When the squareness ratio S1 is 65% or more, the perpendicular orientation property of the magnetic powder is sufficiently high, and thus, it is possible to achieve more excellent electromagnetic conversion characteristics (e.g., SNR).

The squareness ratio S1 in the perpendicular direction is obtained as follows. First, the magnetic tape 1 housed in the cartridge is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of 06.39 mm to prepare a measurement sample. At this time, marking is performed with arbitrary non-magnetic ink such that the longitudinal direction (travelling direction) of the magnetic tape 1 can be recognized. Then, the M-H loop of the measurement sample (the entire magnetic tape 1) corresponding to the longitudinal direction (travelling direction) of the magnetic tape 1 is measured using a vibrating sample magnetometer (VSM). Next, acetone, ethanol, or the like is used to wipe off the coating film (the underlayer 42, the magnetic layer 43, the back layer 44, and the like) of the magnetic tape 1 cut as described above, leaving only the base material 41. Then, three obtained base materials 41 are superimposed with double sided tape, and then punched out with a punch of 06.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 1) is measured using the VSM.

In the measurement of the M-H loop of the measurement sample (the entire magnetic tape 1) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 41) are obtained, the M-H loop of the correction sample (base material 41) is subtracted from the M-H loop of the measurement sample (the entire magnetic tape 1) to perform background correction, thereby obtaining the M-H loop after background correction. The measurement/analysis program attached to the "VSM-P7-15" is used for this calculation of background correction.

A saturation magnetization Ms (emu) and a residual magnetization Mr (emu) of the obtained M-H loop after background correction are substituted into the following formula to calculate the squareness ratio S1 (%). Note that the measurement of the M-H loop described above is performed at 25° C.±2° C. and 50% RH±5% RH. Further, the "demagnetizing field correction" in measuring the M-H loop in the perpendicular direction of the magnetic tape 1 is not performed. Note that the measurement/analysis program attached to the "VSM-P7-15" is used for this calculation.

Squareness ratio $S1(\%)=(Mr/Ms)\times 100$

A squareness ratio S2 of the magnetic layer 43 in the longitudinal direction (travelling direction) of the magnetic tape 1 is favorably 35% or less, more favorably 30% or less, still more favorably 25% or less, particularly favorably 20% or less, and most favorably 15% or less. When the squareness ratio S2 is 35% or less, the perpendicular orientation property of the magnetic powder is sufficiently high, and thus, it is possible to achieve more excellent electromagnetic conversion characteristics (e.g., SNR).

The squareness ratio S2 in the longitudinal direction is obtained in a way similar to that for the squareness ratio S1 except for measuring the M-H loop in the longitudinal direction (travelling direction) of the magnetic tape 1 and the base material 41.

(Surface Roughness $R_b$ of Back Surface)

A surface roughness $R_b$ of the back surface (surface roughness of the back layer 44) is favorably $R_b \leq 6.0$ [nm]. When the surface roughness $R_b$ of the back surface is within the range described above, it is possible to achieve more excellent electromagnetic conversion characteristics.

Modified Example

Although the azimuthal slope (azimuth angle) of the servo frame SF forming the servo pattern 6 has been 12° in the embodiment described above, the present technology is not limited thereto, and the azimuthal slope can be, for example, 11° or more and 36° or less, and favorably 11° or more and 26° or less. Further, although the azimuthal slopes have been of two types, "/" and "Y", an azimuthal slope with an inclination angle different therefrom may further be included in the servo pattern.

Further, although the air blower unit 90 has been adopted as a cooling mechanism in the embodiment described above, a thermoelectric element such as a Peltier element may be used in addition thereto. Further, although the magnetic tape conforming to the LTO standard has been exemplified as a tape-like magnetic recording medium, the present technology can also be applied to a magnetic tape of another standard, similarly.

It should be noted that the present technology may also take the following configurations.

(1) An apparatus that records a plurality of servo patterns adjacent to each other in a tape width direction on a magnetic layer of a magnetic tape, including:

a servo write head that includes a plurality of recording units arranged corresponding to a plurality of servo bands of the magnetic layer on which the plurality of servo patterns is recorded; and a temperature adjustment unit that is configured to be capable of individually adjusting temperatures of the plurality of recording units.

(2) The servo pattern recording apparatus according to (1) above, in which the temperature adjustment unit individually adjusts the temperatures of the plurality of recording units such that an average value of differences in a servo band pitch between two adjacent servo bands, of the plurality of servo bands, over an entire tape length is equal to or less than a predetermined value.

(3) The servo pattern recording apparatus according to (2) above, in which the predetermined value is 100 nm.

(4) The servo pattern recording apparatus according to any one of (1) to (3) above, in which the temperature adjustment unit includes a heating mechanism that is capable of individually raising the temperatures of the plurality of recording units.

(5) The servo pattern recording apparatus according to (4) above, in which the plurality of recording units includes a plurality of magnetic cores having a magnetic gap and a plurality of coils wound around the plurality of magnetic cores, and the heating mechanism includes a power adjustment unit that is capable of individually adjusting currents flowing through the plurality of coils.

(6) The servo pattern recording apparatus according to any one of (1) to (3) above, in which the temperature adjustment unit includes a cooling mechanism that is capable of individually cooling the plurality of recording units.

(7) The servo pattern recording apparatus according to (6) above, in which the plurality of recording units includes a plurality of magnetic cores having a magnetic gap and a plurality of coils wound around the plurality of magnetic cores, and the cooling mechanism includes an air blower unit that is capable of individually supplying cooling gas to the plurality of coils.

(8) The servo pattern recording apparatus according to (6) or (7) above, in which the servo write head has a recording surface that has a first region and a second region and records the servo pattern on the magnetic tape by the magnetic gap, the first region corresponding to a position where the magnetic gap is provided in a length direction, the second region corresponding to a position where the magnetic gap is not provided in the length direction, a plurality of groove portions being provided in the second region, the plurality of groove portions extending across from one end in a width direction perpendicular to the length direction to the other end in the width direction.

(9) A method of recording a plurality of servo patterns adjacent to each other in a tape width direction on a magnetic layer of a magnetic tape, including:
 causing the magnetic tape to travel;
 individually adjusting temperatures of a plurality of recording units of a servo write head; and
 recording the plurality of servo patterns on the magnetic layer by the plurality of recording units.

(10) The servo pattern recording method according to (9) above, further including
 individually adjusting the temperatures of the plurality of recording units such that an average value of differences in a servo band pitch between two adjacent servo bands, of a plurality of servo bands of the magnetic layer on which the plurality of servo patterns is recorded, over an entire tape length is equal to or less than a predetermined value.

(11) The servo pattern recording method according to (9) or (10) above, in which
 the plurality of recording units includes a plurality of magnetic cores having a magnetic gap and a plurality of coils wound around the plurality of magnetic cores, and
 the step of individually adjusting temperatures of a plurality of recording units includes making electric power to be supplied to at least one coil of the plurality of coils larger than electric power to be supplied to the other coils.

(12) The servo pattern recording method according to (9) or (10) above, in which
 the plurality of recording units includes a plurality of magnetic cores having a magnetic gap and a plurality of coils wound around the plurality of magnetic cores, and
 the step of individually adjusting temperatures of a plurality of recording units includes supplying cooling gas to at least one coil of the plurality of coils at a flow rate larger than those of the other coils.

(13) A method of producing a magnetic tape in which a plurality of servo patterns adjacent to each other in a tape width direction is recorded on a magnetic layer of the magnetic tape, including:
 causing the magnetic tape to travel;
 individually adjusting temperatures of a plurality of recording units of a servo write head; and
 recording the plurality of servo patterns on the magnetic layer by the plurality of recording units.

(14) A magnetic tape in which a plurality of servo patterns adjacent to each other in a tape width direction is recorded on a magnetic layer of the magnetic tape, in which
 an average value of differences in a servo band pitch between two adjacent servo bands, of the plurality of servo bands, over an entire tape length, is 100 nm or less.

(15) The magnetic tape according to (14) above, in which the magnetic tape has a Young's modulus of 8 GPa or less.

REFERENCE SIGNS LIST 1 magnetic tape
6, 601, 602 servo pattern
10 tape cartridge
30 tape drive device
80 temperature adjustment unit
90 air blower unit
43 magnetic layer
100 servo pattern recording apparatus
113, 113A, 113B servo write head

The invention claimed is:

1. An apparatus that records a plurality of servo patterns adjacent to each other in a tape width direction on a magnetic layer of a magnetic tape, comprising:
 a servo write head that includes a plurality of recording units arranged corresponding to a plurality of servo bands of the magnetic layer on which the plurality of servo patterns is recorded; and
 a temperature adjustment unit that is configured to be capable of individually adjusting temperatures of the plurality of recording units.

2. The servo pattern recording apparatus according to claim 1, wherein
 the temperature adjustment unit individually adjusts the temperatures of the plurality of recording units such that an average value of differences in a servo band pitch between two adjacent servo bands, of the plurality of servo bands, over an entire tape length is equal to or less than a predetermined value.

3. The servo pattern recording apparatus according to claim 2, wherein
 the predetermined value is 100 nm.

4. The servo pattern recording apparatus according to claim 1, wherein
 the temperature adjustment unit includes a heating mechanism that is capable of individually raising the temperatures of the plurality of recording units.

5. The servo pattern recording apparatus according to claim 4, wherein
 the plurality of recording units includes a plurality of magnetic cores having a magnetic gap and a plurality of coils wound around the plurality of magnetic cores, and
 the heating mechanism includes a power adjustment unit that is capable of individually adjusting currents flowing through the plurality of coils.

6. The servo pattern recording apparatus according to claim 1, wherein
 the temperature adjustment unit includes a cooling mechanism that is capable of individually cooling the plurality of recording units.

7. The servo pattern recording apparatus according to claim 6, wherein
 the plurality of recording units includes a plurality of magnetic cores having a magnetic gap and a plurality of coils wound around the plurality of magnetic cores, and
 the cooling mechanism includes an air blower unit that is capable of individually supplying cooling gas to the plurality of coils.

8. The servo pattern recording apparatus according to claim 6, wherein
 the servo write head has a recording surface that has a first region and a second region and records the servo pattern on the magnetic tape by the magnetic gap, the first region corresponding to a position where the magnetic gap is provided in a length direction, the second region corresponding to a position where the magnetic gap is not provided in the length direction, a plurality of groove portions being provided in the second region, the plurality of groove portions extending across from one end in a width direction perpendicular to the length direction to the other end in the width direction.

9. A method of recording a plurality of servo patterns adjacent to each other in a tape width direction on a magnetic layer of a magnetic tape, comprising:
    causing the magnetic tape to travel;
    individually adjusting temperatures of a plurality of recording units of a servo write head; and
    recording the plurality of servo patterns on the magnetic layer by the plurality of recording units.

10. The servo pattern recording method according to claim 9, further comprising
    individually adjusting the temperatures of the plurality of recording units such that an average value of differences in a servo band pitch between two adjacent servo bands, of a plurality of servo bands of the magnetic layer on which the plurality of servo patterns is recorded, over an entire tape length is equal to or less than a predetermined value.

11. The servo pattern recording method according to claim 9, wherein
    the plurality of recording units includes a plurality of magnetic cores having a magnetic gap and a plurality of coils wound around the plurality of magnetic cores, and
    the step of individually adjusting temperatures of a plurality of recording units includes making electric power to be supplied to at least one coil of the plurality of coils larger than electric power to be supplied to the other coils.

12. The servo pattern recording method according to claim 9, wherein
    the plurality of recording units includes a plurality of magnetic cores having a magnetic gap and a plurality of coils wound around the plurality of magnetic cores, and
    the step of individually adjusting temperatures of a plurality of recording units includes supplying cooling gas to at least one coil of the plurality of coils at a flow rate larger than those of the other coils.

13. A method of producing a magnetic tape in which a plurality of servo patterns adjacent to each other in a tape width direction is recorded on a magnetic layer of the magnetic tape, comprising:
    causing the magnetic tape to travel;
    individually adjusting temperatures of a plurality of recording units of a servo write head; and
    recording the plurality of servo patterns on the magnetic layer by the plurality of recording units.

* * * * *